(12) United States Patent
Park et al.

(10) Patent No.: US 11,822,095 B2
(45) Date of Patent: Nov. 21, 2023

(54) CAMERA MODULE INCLUDING LIQUID LENS, OPTICAL DEVICE INCLUDING THE MODULE, AND METHOD FOR DRIVING THE LIQUID LENS

(71) Applicant: LG INNOTEK CO., LTD., Seoul (KR)

(72) Inventors: Seung Ryong Park, Seoul (KR); Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 165 days.

(21) Appl. No.: 16/467,433

(22) PCT Filed: Dec. 8, 2017

(86) PCT No.: PCT/KR2017/014418
§ 371 (c)(1),
(2) Date: Jun. 6, 2019

(87) PCT Pub. No.: WO2018/106073
PCT Pub. Date: Jun. 14, 2018

(65) Prior Publication Data
US 2019/0310490 A1 Oct. 10, 2019

(30) Foreign Application Priority Data

Dec. 9, 2016 (KR) .................. 10-2016-0167473
Apr. 11, 2017 (KR) .................. 10-2017-0047022

(51) Int. Cl.
*G02B 27/64* (2006.01)
*G02B 3/14* (2006.01)
(Continued)

(52) U.S. Cl.
CPC .............. *G02B 27/64* (2013.01); *G02B 3/14* (2013.01); *G02B 7/02* (2013.01); *G03B 13/32* (2013.01);
(Continued)

(58) Field of Classification Search
CPC . G02B 27/64; G02B 3/14; G02B 7/02; G02B 26/005; G03B 13/32; G03B 17/12;
(Continued)

(56) References Cited

U.S. PATENT DOCUMENTS 8,908,077 B2 * 12/2014 Fujinawa ............. H04N 9/3176
348/333.01
2003/0227561 A1 12/2003 Sakata et al.
(Continued)

FOREIGN PATENT DOCUMENTS

CN 101052897 A 10/2007
CN 101349810 A 1/2009
(Continued)

OTHER PUBLICATIONS

Office Action dated Oct. 10, 2020 in Chinese Application No. 201780084420.4.
(Continued)

*Primary Examiner* — Balram T Parbadia
*Assistant Examiner* — Gabriel A Sanz
(74) *Attorney, Agent, or Firm* — Saliwanchik, Lloyd & Eisenschenk

(57) ABSTRACT

Provided is a camera module, and a camera module including a core plate having a cavity for accommodating a conductive liquid and a nonconductive liquid; an electrode unit disposed on the core plate and electrically connected to the conductive liquid; an insulating unit disposed in the electrode portion and blocking contact of the nonconductive liquid; and a control unit for controlling voltages applied to the electrode unit, wherein the electrode unit includes a first electrode and a second electrode that change the interface between the conductive liquid and the nonconductive liquid by electromagnetic interaction, the first electrode includes a plurality of electrode sectors arranged sequentially along a
(Continued)

circumferential direction about an optical axis, and the control unit sequentially controls voltages applied to the plurality of electrode sectors.

14 Claims, 25 Drawing Sheets

(51) Int. Cl.
| | |
|---|---|
| *G02B 7/02* | (2021.01) |
| *G03B 17/12* | (2021.01) |
| *G03B 13/32* | (2021.01) |
| *H04N 23/00* | (2023.01) |
| *H04N 23/55* | (2023.01) |
| *H04N 23/67* | (2023.01) |

(52) U.S. Cl.
CPC ............. *G03B 17/12* (2013.01); *H04N 23/00* (2023.01); *H04N 23/55* (2023.01); *H04N 23/67* (2023.01)

(58) Field of Classification Search
CPC ... H04N 5/225; H04N 5/2254; H04N 5/23212
See application file for complete search history.

(56) References Cited

U.S. PATENT DOCUMENTS

| | | | | |
|---|---|---|---|---|
| 2006/0250543 | A1* | 11/2006 | Sugimoto | ................. G02F 1/29 349/62 |
| 2007/0279497 | A1* | 12/2007 | Wada | ................. H04N 5/23248 348/208.99 |
| 2008/0100922 | A1* | 5/2008 | Choi | ................... G02B 26/005 359/665 |
| 2008/0144186 | A1* | 6/2008 | Feng | ................. H01L 27/14625 359/666 |
| 2008/0267603 | A1* | 10/2008 | Jung | ..................... G02B 7/021 396/111 |
| 2010/0014167 | A1 | 1/2010 | Immink et al. | |
| 2010/0295987 | A1* | 11/2010 | Berge | ................. H04N 5/23212 348/360 |
| 2011/0075257 | A1* | 3/2011 | Hua | ..................... H04N 13/322 359/464 |
| 2014/0267876 | A1 | 9/2014 | Chen | |
| 2015/0268333 | A1* | 9/2015 | Schneider | ............ G02B 26/005 356/5.01 |

FOREIGN PATENT DOCUMENTS

| | | |
|---|---|---|
| CN | 101806929 A | 8/2010 |
| CN | 101990747 A | 3/2011 |
| CN | 103140779 A | 6/2013 |
| CN | 103487926 A | 1/2014 |
| CN | 104597533 A | 5/2015 |
| CN | 104865621 A | 8/2015 |
| CN | 205193304 U | 4/2016 |
| EP | 1 906 213 A1 | 4/2008 |
| EP | 2 071 367 A1 | 6/2009 |
| JP | 2007-121821 A | 5/2007 |
| JP | 2008-276228 A | 11/2008 |
| JP | 2010-113029 A | 5/2010 |
| KR | 10-2009-0018965 A | 2/2009 |
| WO | WO-2007/068761 A1 | 6/2007 |
| WO | WO-2009/074684 A1 | 6/2009 |

OTHER PUBLICATIONS

International Search Report in International Application No. PCT/KR2017/014418, filed Dec. 8, 2017.
Supplementary European Search Report dated Jun. 5, 2020 in European Application No. 17878775.0.
Office Action dated Jul. 6, 2021 in Chinese Application No. 201780084420.4.
Office Action dated Jun. 14, 2021 in Korean Application No. 10-2017-0047022.
Office Action dated Nov. 2, 2021 in Japanese Application No. 2019-530835.

* cited by examiner

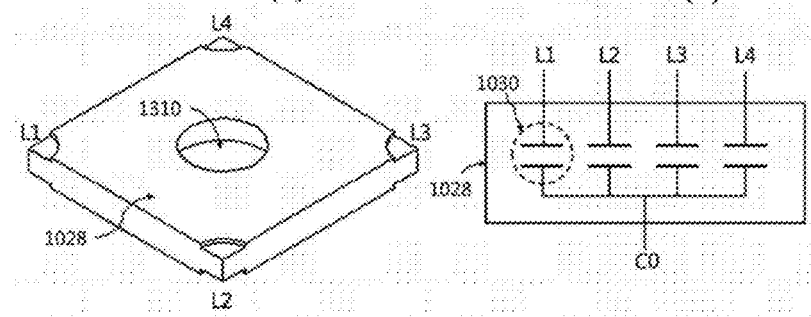
FIG. 19(a)   FIG. 19(b)
FIG. 20
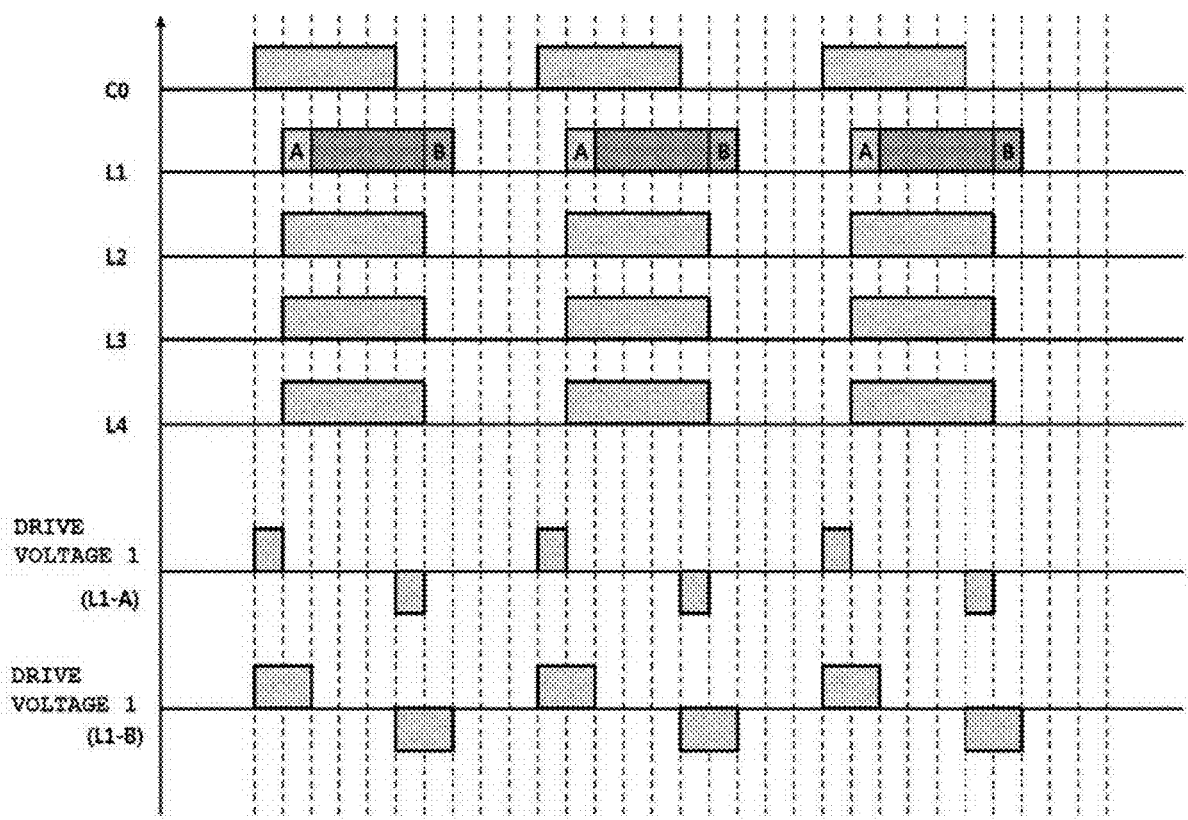

| FIRST DRIVE VOLTAGE CODE (10 bit) | SECOND DRIVE VOLTAGE CODE (12 bit) |
|---|---|
| 0 | 0 |
| 1 | 6 |
| 2 | 12 |
| 3 | 19 |
| 4 | 25 |
| 5 | 31 |
| ⋮ | ⋮ |
| 1018 | 4075 |
| 1019 | 4078 |
| 1020 | 4081 |
| 1021 | 4085 |
| 1022 | 4088 |
| 1023 | 4092 |

| FIRST DRIVE VOLTAGE CODE (10 bit) | DRIVE VOLTAGE CODE (L1) | DRIVE VOLTAGE CODE (L2) | DRIVE VOLTAGE CODE (L3) | DRIVE VOLTAGE CODE (L4) |
|---|---|---|---|---|
| 0 | 0 | 0 | 0 | 0 |
| 1 | 2 | 2 | 1 | 1 |
| 2 | 3 | 3 | 3 | 3 |
| 3 | 5 | 5 | 5 | 4 |
| 4 | 9 | 8 | 8 | 8 |
| 5 | 8 | 8 | 8 | 7 |
| ⋮ | ⋮ | ⋮ | ⋮ | ⋮ |
| 1018 | 1019 | 1019 | 1019 | 1018 |
| 1019 | 1020 | 1020 | 1019 | 1019 |
| 1020 | 1021 | 1020 | 1020 | 1020 |
| 1021 | 1022 | 1021 | 1021 | 1021 |
| 1022 | 1022 | 1022 | 1022 | 1022 |
| 1023 | 1023 | 1023 | 1023 | 1023 |

# CAMERA MODULE INCLUDING LIQUID LENS, OPTICAL DEVICE INCLUDING THE MODULE, AND METHOD FOR DRIVING THE LIQUID LENS

CROSS-REFERENCE TO RELATED APPLICATIONS

This application is the U.S. national stage application of International Patent Application No. PCT/KR2017/014418, filed Dec. 8, 2017, which claims the benefit under 35 U.S.C. § 119 of Korean Application Nos. 10-2016-0167473, filed Dec. 9, 2016; and 10-2017-0047022, filed Apr. 11, 2017; the disclosures of each of which are incorporated herein by reference in their entirety.

TECHNICAL FIELD

Embodiments relate to a camera module including a liquid lens, an optical device, and a method for driving the liquid lens. More particularly, embodiments relate to a camera module including a liquid lens, the optical device, and the method for driving the liquid lens, the focal distance of which is adjustable using electrical energy.

BACKGROUND ART

In this section, the following description merely provides information regarding the background of the embodiments, and does not constitute the conventional art.

People who use portable devices demand optical devices that have high resolution, are small, and have various photography functions, such as an optical zoom-in/zoom-out function, an auto-focusing (AF) function, and a handshake compensation or optical image stabilization (OIS) function. Such photography functions may be realized by directly moving a plurality of lenses that are used together. In the case in which the number of lenses is increased, however, the size of the optical devices may be increased.

A camera module is a module of a camera that takes pictures or video of a subject. An example of such a camera module is an AF camera module having an auto-focusing (AF) function, which is a function of automatically adjusting a focus depending on the distance from a subject.

The auto-focusing and handshake compensation functions are performed by moving or tilting a lens module including a plurality of lenses, which are fixed to a lens holder in the state in which the optical axes of the lens are aligned, along the optical axis or in a direction perpendicular to the optical axis. A separate lens moving apparatus is used in order to move the lens module.

The auto-focusing function is performed by moving a lens module including a plurality of lenses in the optical-axis direction using a lens moving apparatus.

However, the lens moving apparatus has high power consumption, and in order to protect the lens moving apparatus, it is necessary to add a cover glass, in addition to the camera module. As a result, the overall thickness of the camera mode is increased. Therefore, research has been conducted on a liquid lens, configured such that the curvature of the interface between two kinds of liquids is electrically adjusted to perform the auto-focusing and handshake compensation functions.

Meanwhile, in a conventional liquid lens, voltage is applied to all electrodes of an electrode unit (a batch-type electrode driving scheme) to change the curvature of a liquid interface, thereby performing an auto-focusing function. In the batch-type electrode driving scheme, the unit voltage applied to the electrode unit is changed to adjust a focus step (focus degree).

In the case in which other control factors are added in order to subdivide the focus step of the liquid lens, in addition to the change in the unit voltage of the conventional liquid lens, it is possible to more accurately perform the auto-focusing function.

DISCLOSURE

Technical Problem

Embodiments provide a camera module including a liquid lens, an optical device including the module, and a method for driving the liquid lens, the focus step of which is adjustable through other control factors without reducing a unit voltage.

Embodiments provide a liquid lens, the linearity of which is securable without using a higher-resolution voltage driver, a camera module, an optical device, and a method for driving the liquid lens.

The technical objects that can be achieved through the embodiments are not limited to what has been particularly described hereinabove, and other technical objects not described herein will be more clearly understood by those skilled in the art from the following detailed description.

Technical Solution

In one embodiment, a liquid lens may include a core plate having a cavity for receiving a conductive liquid and a nonconductive liquid formed therein, an electrode unit disposed at the core plate, the electrode unit being connected to the conductive liquid, an insulation unit disposed at the electrode unit for inhibiting contact between the electrode unit and the nonconductive liquid, and a control unit for controlling the voltage applied to the electrode unit, wherein the electrode unit includes a first electrode and a second electrode electromagnetically interacting with each other to change the interface between the conductive liquid and the nonconductive liquid, the first electrode includes a plurality of electrode sectors sequentially disposed about an optical axis in a circumferential direction, and the control unit sequentially controls the voltages applied to the electrode sectors.

The first electrode may include first, second, third, and fourth electrode sectors sequentially disposed in the circumferential direction, and the control unit may control the voltages of the first and third electrode sectors and then control the voltages of the second and fourth electrode sectors.

The control unit may simultaneously control the voltages of the first and third electrode sectors, and may simultaneously control the voltages of the second and fourth electrode sectors.

In another embodiment, a liquid lens may include a core plate having a cavity for receiving a conductive liquid and a nonconductive liquid formed therein, an electrode unit disposed at the core plate, the electrode unit being connected to the conductive liquid, an insulation unit disposed at the electrode unit for inhibiting contact between the electrode unit and the nonconductive liquid, and a control unit for controlling the voltage applied to the electrode unit, wherein the electrode unit includes a first electrode and a second electrode electromagnetically interacting with each other to change the interface between the conductive liquid and the nonconductive liquid, the first electrode includes a first electrode sector, a third electrode sector disposed in a direction in which the third electrode sector and the first electrode sector are symmetric with respect to an optical axis, a second electrode sector disposed between the first and third electrode sectors in a circumferential direction, and a fourth electrode sector disposed in a direction in which the fourth electrode sector and the second electrode sector are symmetric with respect to the optical axis, and the control unit sequentially controls the voltages applied to the first, second, third, and fourth electrode sectors.

The control unit may control the voltages of the first and third electrode sectors, and may then control the voltages of the second and fourth electrode sectors.

The control unit may simultaneously control the voltages of the first and third electrode sectors, and may simultaneously control the voltages of the second and fourth electrode sectors.

The second electrode may be a common electrode.

The first electrode may be disposed at the upper surface of the core plate so as to be connected to the conductive liquid, and the second electrode may be disposed at the upper surface and the lower surface of the core plate and at the inner surface of the cavity, contact between the second electrode and the nonconductive liquid being inhibited by the insulation unit.

The liquid lens may further include an upper cover plate and a lower cover plate disposed respectively above and under the cavity for closing the cavity.

The liquid lens may further include a first board disposed above the upper cover plate, the first board being connected to the first electrode, and a second board disposed under the lower cover plate, the second board being connected to the second electrode.

In another embodiment, a camera module may include a case, a lens holder received in the case, a lens module received in the lens holder, the lens module including at least one lens, a liquid lens disposed above or under the lens module or in the middle of the lens module, and a main board electrically connected to the liquid lens, the main board having a control unit mounted thereon, wherein the liquid lens includes a core plate having a cavity for receiving a conductive liquid and a nonconductive liquid formed therein, an electrode unit disposed at the core plate, the electrode unit being electrically connected to the conductive liquid, and an insulation unit disposed at the electrode unit for inhibiting contact with the nonconductive liquid, and a control unit for controlling the voltage applied to the electrode unit, the electrode unit includes a first electrode and a second electrode electromagnetically interacting with each other to change the interface between the conductive liquid and the nonconductive liquid, the first electrode includes a plurality of electrode sectors sequentially disposed about an optical axis in a circumferential direction, and the control unit sequentially controls the voltages applied to the electrode sectors.

In another embodiment, a method of controlling a liquid lens, configured such that an interface between a conductive liquid and a nonconductive liquid in a cavity is changed through electromagnetic interaction between first and second electrodes, as a liquid lens moving method according to a first embodiment, the first electrode including first, second, third, and fourth electrode sectors sequentially disposed in a circumferential direction, may include a step of controlling the voltages of the first and third electrode sectors in a randomized sequence and a step of controlling the voltages of the second and fourth electrode sectors in a randomized sequence.

The voltages of the first and third electrode sectors may be simultaneously controlled, and the voltages of the second and fourth electrode sectors may be simultaneously controlled.

In another embodiment, a method of controlling a liquid lens, configured such that an interface between a conductive liquid and a nonconductive liquid in a cavity is changed through electromagnetic interaction between first and second electrodes, as a liquid lens moving method according to a second embodiment, the first electrode including a first electrode sector, a third electrode sector disposed in a direction in which the third electrode sector and the first electrode sector are symmetric with respect to an optical axis, a second electrode sector disposed between the first and third electrode sectors in a circumferential direction, and a fourth electrode sector disposed in a direction in which the fourth electrode sector and the second electrode sector are symmetric with respect to the optical axis, includes a step of controlling the voltages of the first and third electrode sectors in a randomized sequence and a step of controlling the voltages of the second and fourth electrode sectors in a randomized sequence.

The voltages of the first and third electrode sectors may be simultaneously controlled, and the voltages of the second and fourth electrode sectors may be simultaneously controlled.

In another embodiment, a liquid lens may include a cavity, a conductive liquid and a nonconductive liquid received in the cavity, n individual electrodes (n being an integer of 2 or more), and a common electrode, wherein an interface is formed between the conductive liquid and the nonconductive liquid, the variation of average drive voltage within a first range of first drive voltage code is greater than the variation of average drive voltage within a second range of the first drive voltage code, the average drive voltage is the average of the drive voltages applied between the common electrode and the n individual electrodes, the lower limit value of the second range is greater than the upper limit value of the first range, and the first drive voltage code is a value corresponding to the average drive voltage.

In another embodiment, a camera module may include a liquid lens, which includes a cavity, a conductive liquid and a nonconductive liquid received in the cavity, n individual electrodes (n being an integer of 2 or more), and a common electrode, an interface being formed between the conductive liquid and the nonconductive liquid, and a control circuit for generating drive voltage applied between the common electrode and one of the n individual electrodes of the liquid lens, wherein the variation of average drive voltage within a first range of first drive voltage code is greater than the variation of average drive voltage within a second range of the first drive voltage code, the average drive voltage is the average of the drive voltages applied between the common electrode and the n individual electrodes, the lower limit value of the second range is greater than the upper limit value of the first range, and the first drive voltage code is a value corresponding to the average drive voltage.

In some embodiments, the control circuit may include a code conversion unit for receiving the first drive voltage code and converting the first drive voltage code into second drive voltage code having higher resolution than the first drive voltage code and a code conversion information provision unit having a conversion table or a conversion algorithm for converting the first drive voltage code into the second drive voltage code.

In some embodiments, the control circuit may further include a voltage driver for generating the drive voltage based on the converted second drive voltage code.

In some embodiments, the conversion table may be a table in which the first drive voltage code and the second drive voltage code are matched with each other in order to perform compensation such that the first drive voltage code and the diopter of the interface have a linear relationship therebetween.

In some embodiments, the control circuit may further include a drive voltage code determination unit for determining drive voltage code for each electrode corresponding to each of the first to n-th drive electrodes according to the second drive voltage code.

In some embodiments, the conversion table may be a table in which the first drive voltage code and drive voltage code for each electrode corresponding to each of the n drive electrodes are matched with each other in order to perform compensation such that the first drive voltage code and the diopter of the interface have a linear relationship therebetween.

In some embodiments, the conversion algorithm may be a conversion function between the first drive voltage code and the second drive voltage code to perform compensation such that the first drive voltage code and the diopter of the interface have a linear relationship therebetween.

In some embodiments, at least two drive voltage codes for respective electrodes, among drive voltage codes for respective electrodes corresponding to n individual electrodes, may be different from each other.

In some embodiments, the conversion table or the conversion algorithm may be set from the relationship between the first drive voltage code and the diopter of the interface such that the first drive voltage code and the diopter of the interface have a linear relationship therebetween using at least one of normalization, scale conversion, or inverse function conversion.

In another embodiment, a liquid lens may include a cavity, a conductive liquid and a nonconductive liquid received in the cavity, n individual electrodes (n being an integer of 2 or more), and a common electrode, wherein an interface is formed between the conductive liquid and the nonconductive liquid, first drive voltage code, which determines average drive voltage, and the diopter of the interface have a linear relationship therebetween, the average drive voltage is changed irregularly as the first drive voltage code is sequentially changed, and the average drive voltage is the average of the drive voltages applied between the common electrode and the n individual electrodes.

In a further embodiment, an optical device may include a camera module, a display unit for outputting an image, a battery for supplying power to the camera module, and a housing in which the camera module, the display unit, and the battery are mounted.

The above aspects of the disclosure are merely some of the preferred embodiments, and various embodiments in which the technical features are incorporated may be derived and understood by those skilled in the art from the detailed description which follows.

Advantageous Effects

Embodiments provide a liquid lens configured such that an electrode unit is divided into electrode sectors, and voltages are sequentially applied to the electrode sectors resulting from division of the electrode unit (an individual-type electrode driving scheme), whereby focus step is adjustable without reducing unit voltage. In addition, the electrode sectors are disposed about a cavity for receiving liquids in the circumferential direction, and voltages are sequentially applied to the electrode sectors resulting from division of the electrode unit in a symmetrical fashion. Consequently, it is possible to inhibit deterioration of photograph quality due to the change of an optical path that occurs as the interface of the liquid lens is inclined. Furthermore, embodiments provide a camera module including the liquid lens and a method of moving the liquid lens.

In a liquid lens, a camera module, and an optical device according to an embodiment, drive voltage code may be converted using drive voltage code having higher resolution, whereby the linear relationship between the drive voltage code and the diopter of the interface of the liquid lens may be secured.

It should be noted that the effects of the disclosure are not limited to the effects mentioned above, and other unmentioned effects will be clearly understood by those skilled in the art from the above description of the present invention.

DESCRIPTION OF DRAWINGS

FIGS. 19(*a*) and 19(*b*) illustrate a liquid lens, and the interface of which is adjusted in response to drive voltage;

FIG. 20 is a view illustrating an embodiment of voltage supplied to both ends of the liquid lens;

BEST MODE

Figure 1:
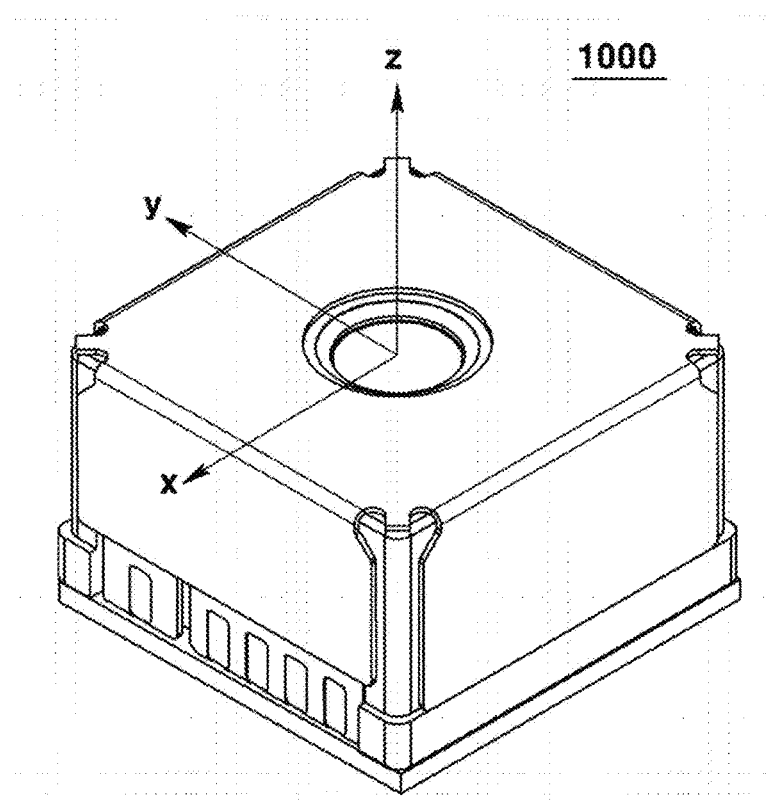
FIG. 1 is a perspective view showing a camera module according to the present embodiment.

A liquid lens according to an embodiment includes a core plate having a cavity for receiving a conductive liquid and a nonconductive liquid formed therein, an electrode unit disposed at the core plate, the electrode unit being connected to the conductive liquid, an insulation unit disposed at the electrode unit for inhibiting contact between the electrode unit and the nonconductive liquid, and a control unit for controlling the voltage applied to the electrode unit, wherein the electrode unit includes a first electrode and a second electrode electromagnetically interacting with each other to change the interface between the conductive liquid and the nonconductive liquid, the first electrode includes a plurality of electrode sectors sequentially disposed about an optical axis in a circumferential direction, and the control unit sequentially controls the voltages applied to the electrode sectors.

MODE FOR INVENTION

Hereinafter, embodiments will be described with reference to the accompanying drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear.

Also, in describing the components of the disclosure, terms such as "first," "second," "A," "B," "(a)," and "(b)" may be used. These terms are used only for the purpose of distinguishing one constituent from another, and the terms do not limit the nature, order or sequence of the components. When one component is said to be "connected," "coupled" or "linked" to another, it should be understood that this means that the one component may be directly connected or linked to the other one, or that yet another component may be interposed between the components.

While the disclosure is subject to various modifications and alternative forms, specific embodiments thereof are shown by way of example in the drawings. However, the disclosure should not be construed as being limited to the embodiments set forth herein, but on the contrary, the disclosure is intended to cover all modifications, equivalents, and alternatives falling within the spirit and scope of the embodiments.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

In the following description of the embodiments, it will be understood that, when each element is referred to as being "on" or "under" another element, it can be "directly" on or under another element, or can be "indirectly" disposed in relation thereto such that an intervening element is present therebetween. In addition, when an element is referred to as being "on" or "under," "under the element" as well as "on the element" can be included based on the element.

In addition, relational terms, such as "on/upper portion/above" and "under/lower portion/below," are used only to distinguish between one subject or element and another subject or element without necessarily requiring or involving any physical or logical relationship or sequence between such subjects or elements.

The term "optical-axis direction" used herein is defined as the optical-axis direction of a lens module. Meanwhile, the "optical-axis direction" may also be referred to as an upward-downward direction or a z-axis direction.

The term "upward-downward direction" used herein may be the z-axis direction shown in the drawings. In this case, the z-axis arrow direction may indicate the "upward direction." In addition, the term "forward-rearward direction" may be the x-axis direction shown in the drawings. In this case, the x-axis arrow direction may indicate the "forward direction." In addition, the term "leftward-rightward direction" may be the y-axis direction shown in the drawings. In this case, the y-axis arrow direction may indicate the "rightward direction."

The term "auto focus" used herein is defined as a function of changing the curvature of the interface of a liquid lens 400 of a camera module 1000 to focus on a subject according to the movement of the liquid lens. Herein, the term "auto focus" may be used interchangeably with "AF".

Hereinafter, an optical device according to the present embodiment will be described.

The optical device may be a cellular phone, a mobile phone, a smartphone, a portable smart device, a digital camera, a laptop computer, a digital broadcasting terminal, a personal digital assistant (PDA), a portable multimedia player (PMP), or a navigator. However, the disclosure is not limited thereto. Any device that takes video or still images may be used.

The optical device may include a main body (not shown), a display unit (not shown), and a camera module 1000.

The main body may define the external appearance of the optical device. In an example, the main body may be formed in the shape of a rectangular cube. However, the disclosure is not limited thereto. In a modification, at least a portion of the main body may be round. The main body may receive the camera module 1000. The display unit may be disposed at one surface of the main body.

The camera module 1000 may be disposed at the main body. The camera module 1000 may be disposed at one surface of the main body. At least a portion of the camera module 1000 may be received in the main body. The camera module 1000 may take images of a subject.

The display unit may be disposed at the main body. The display unit may be disposed at one surface of the main body. That is, the display unit may be disposed at the same surface as the camera module 1000. Alternatively, the display unit may be disposed at a surface different from the one surface of the main body. The display unit may be disposed at the surface that is opposite the surface at which the camera module 1000 is disposed. The display unit may output images or video taken by the camera module 1000.

Figure 2:
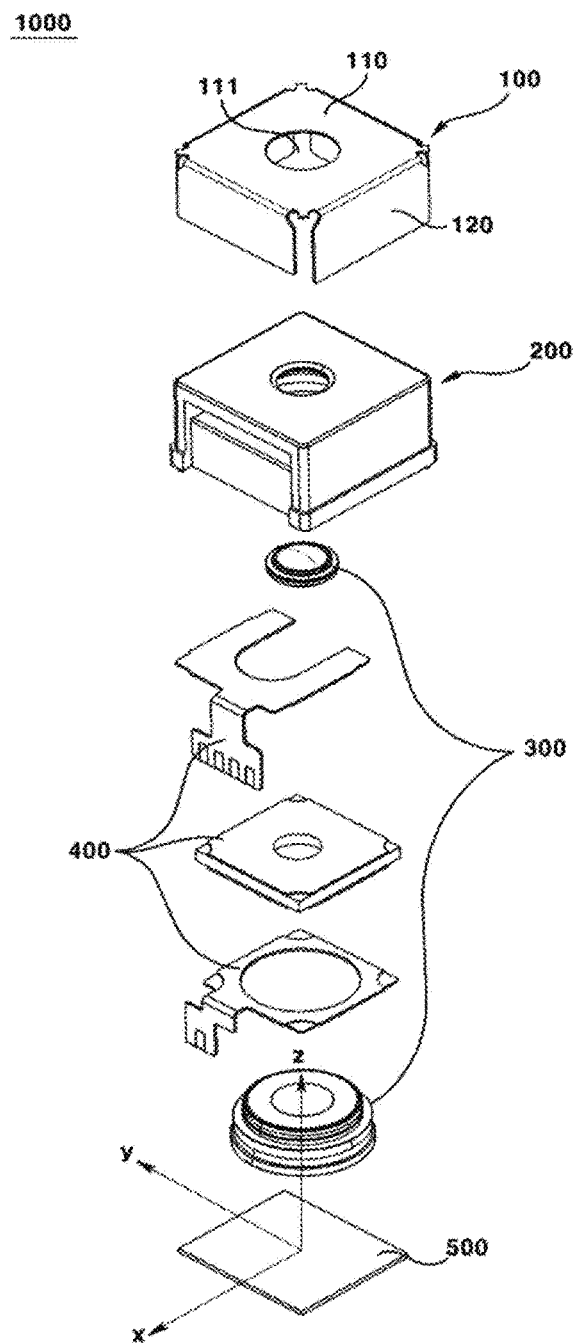
FIG. 2 is an exploded perspective view showing the camera module according to the present embodiment.
Figure 3:
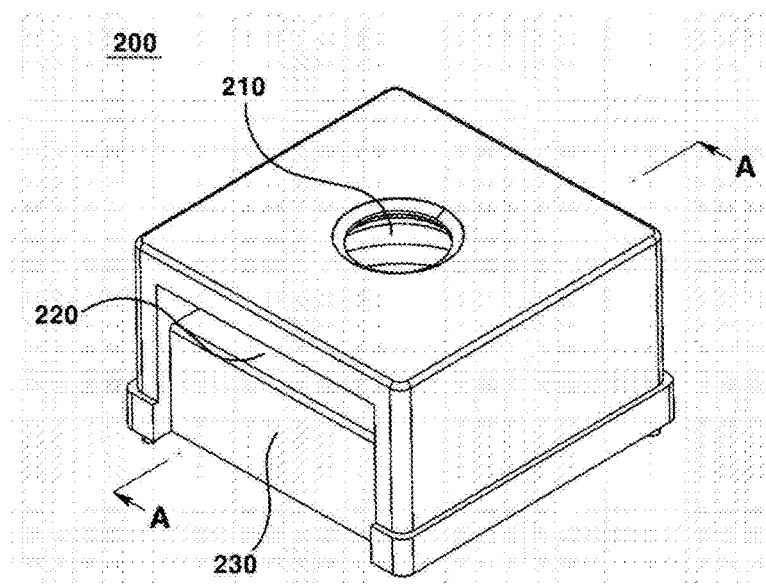
FIG. 3 is a perspective view showing a lens holder according to the present embodiment.
Figure 4:
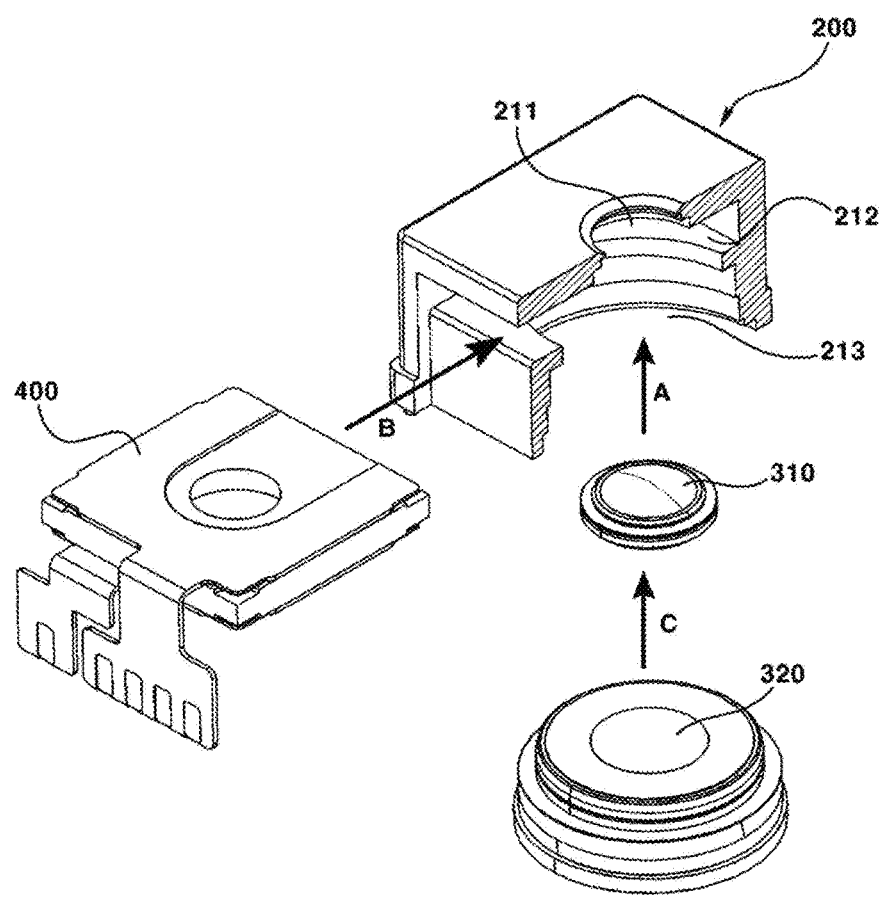
FIG. 4 is a conceptual view showing that a lens module is received in the lens holder according to the present embodiment.
Figure 5:
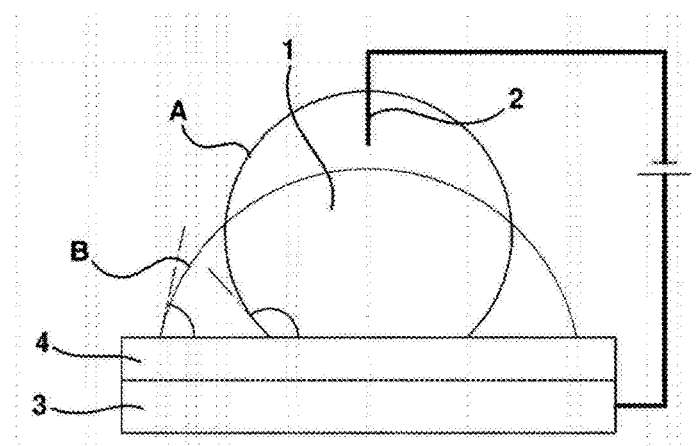
FIG. 5 is a conceptual view showing an electrowetting phenomenon.
Figure 6:
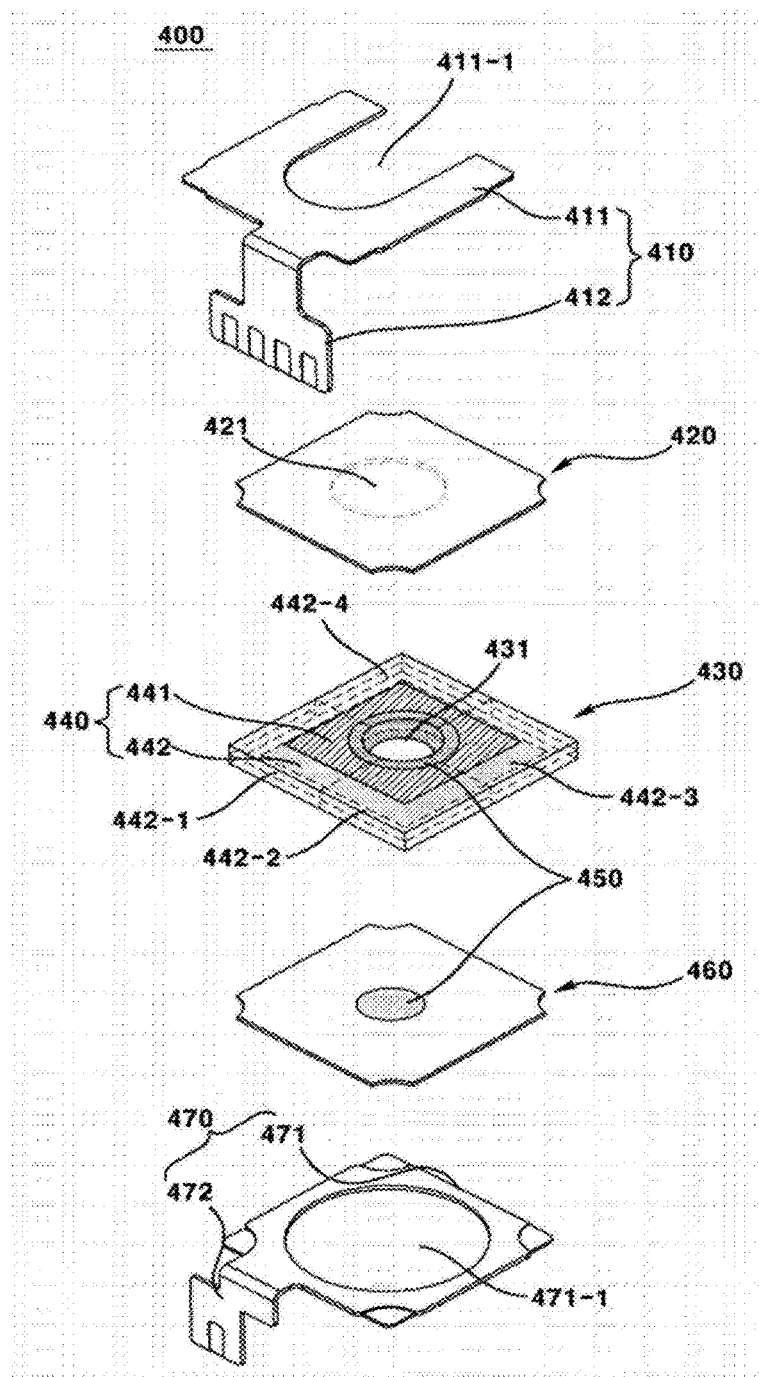
FIG. 6 is an exploded perspective view showing a liquid lens according to the present embodiment.
Figure 7:
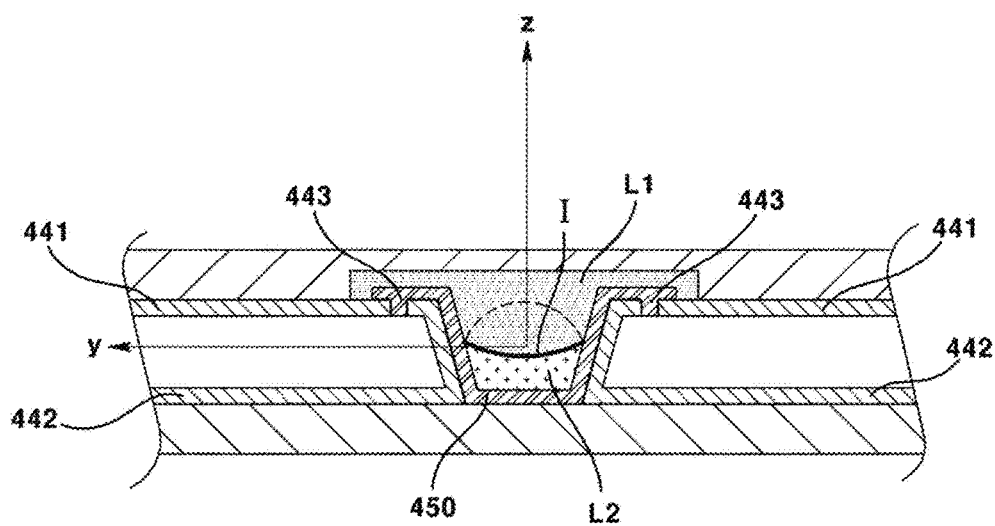
FIG. 7 is a sectional view showing the liquid lens according to the present embodiment with the exception of first and second boards.

Hereinafter, the construction of a camera module 1000 according to the present embodiment will be described with reference to the drawings. FIG. 1 is a perspective view showing a camera module according to the present embodiment, FIG. 2 is an exploded perspective view showing the camera module according to the present embodiment, FIG. 3 is a perspective view showing a lens holder according to the present embodiment, FIG. 4 is a conceptual view showing that a lens module is received in the lens holder according to the present embodiment, FIG. 5 is a conceptual view showing an electrowetting phenomenon, FIG. 6 is an exploded perspective view showing a liquid lens according to the present embodiment, and FIG. 7 is a sectional view showing the liquid lens according to the present embodiment with the exception of first and second boards.

The camera module 1000 according to the present embodiment may be a camera module for AF. Consequently, the camera module 1000 may be referred to as an "AF camera module."

The camera module 1000 may include a case 100, a lens holder 200, a lens module 300, a liquid lens 400, a main board 500, an image sensor, an infrared filter (not shown), and a control unit (not shown). However, one or more selected from among the case 100, the lens holder 200, the lens module 300, the main board 500, the image sensor, the infrared filter (not shown), and the control unit (not shown) may be omitted from the camera module 1000, or may be changed. In addition, the control unit may be included in the liquid lens 400 or the camera module 1000.

The case 100 may define the external appearance of the camera module 1000. The case 100 may be formed in the shape of a hexahedron having an open lower portion. However, the disclosure is not limited thereto. The case 100 may be a nonmagnetic body, and may protect electronic parts therein from external impact. Alternatively, the case 100 may be made of a metal sheet. In this case, the case 100 may block electromagnetic interference (EMI). Because of this characteristic of the case 100, the case 100 may be referred to as an "EMI shield can." That is, the case 100 may inhibit electromagnetic waves generated outside the camera module 1000 from being introduced into the inside of the case 100. In addition, the case 100 may inhibit electromagnetic waves generated inside the case 100 from being discharged to the outside of the case 100. However, the material for the case 100 is not limited to the metal sheet.

The case 100 may include an upper plate 110 and a plurality of side plates 120. The case 100 may include an upper plate 110 and a plurality of side plates 120 extending downwards from respective sides of the upper plate 110. The upper plate 110 and the side plates 120 of the case 100 may be integrally formed. The lens holder 200 may be received in the case 100. In this case, the inner surface of the case 100 may be coupled to the outer surface of the lens holder 200 by adhesion. In addition, the lower portions of the side plates 120 of the case 100 may be supported by a stair portion formed at the lower portion of the lens holder 200.

The upper plate 110 of the case 100 may be formed in the shape of a plate. The side plates 120 may extend downwards from the respective sides of the upper plate 110. The upper plate 110 may be provided in the center thereof with a transmission window 111. The transmission window 111 may be a circular hole formed in the center of the upper plate 110. The transmission window 111 may be disposed so as to be aligned with the optical axis. Consequently, external light reflected by a subject may be irradiated to the lens module 300 through the transmission window 111.

The lens holder 200 may be received in the case 100. The lens holder 200 may be a block-shaped plastic molded item. The lens holder 200 may be manufactured by hole molding. Consequently, the lens holder 200 may be provided in the center thereof with a reception hole 210. The reception hole 210 may be formed through the lens holder 200. Consequently, the upper portion and the lower portion of the lens holder 200 may be open. The reception hole 210 may be formed in the optical-axis direction. The reception hole 210 may be aligned with the optical axis. As a result, both the transmission window 111 and the reception hole 210 may be disposed so as to be aligned with the optical axis. Both the lens module 300 and the liquid lens 400 may be received in the reception hole 210. Consequently, the external light that has passed through the transmission window 111 may be irradiated to the lens module 300 and the liquid lens 400. The light that has been irradiated to the lens module 300 and the liquid lens 400 may be transmitted through the lens module 300 and the liquid lens 400. As will be described below, the lens module 300 may include a plurality of lenses. In this case, the liquid lens 400 may be located above the uppermost one of the lenses (add-on type), may be located between middle ones of the lenses (add-in type), or may be located below the lowermost one of the lenses (add-below type). In the present embodiment, the case in which the liquid lens 400 is located between middle ones of the lenses of the lens module 300 (add-in type) will be described by way of example. As a result, the reception hole 210 may be divided into an upper hole 211, a middle hole 212, and a lower hole 213 depending on the position thereof. The lenses of the lens module 300 may be received in the upper hole 211 and the lower hole 213, and the liquid lens 400 may be received in the middle hole 212.

The lens holder 200 may be provided in the front thereof with an insertion hole 220, through which the liquid lens 400 is inserted. The insertion hole 220 may extend from the front to the middle of the lens holder 200. Consequently, the insertion hole 220 may be connected to the middle hole 212. As a result, the liquid lens 400 may be inserted through the insertion hole 220 so as to be located in the middle hole 212. In addition, the lens holder 200 may be provided in the front thereof with a guide hole 230 for receiving a first connection board 412 and a second connection board 472 of the liquid lens 400, a description of which will follow. The guide hole 230 may extend downwards from the front end of the insertion hole 220. The guide hole 230 may extend to the lower end of the lens holder 200. The first and second connection boards 412 and 472 may be guided through the guide hole 230. Consequently, the first and second connection boards 412 and 472 may extend from the middle hole 212 to the lower end of the lens holder 200. As a result, the first and second connection boards 412 and 472 may be connected to the main board 500, which is disposed under the lens holder 200, to supply electricity to the liquid lens 400.

As shown in FIG. 4, an upper lens group 310 of the lens module 300 may be located in the upper hole 211 through the lower opening of the reception hole 210. That is, the upper lens group 310 may sequentially pass through the lower hole 213 and the middle hole 212, and may then be located in the upper hole 211. After the upper lens group 310 is in place, the liquid lens 400 may be inserted into the lens holder 200 through the insertion hole 220. In this case, the liquid lens 400 may be inserted from the front to the rear of the lens holder 200, and may then be located in the middle hole 212. After the liquid lens 400 is in place, the upper lens group 310 of the lens module 300 may be located in the lower hole 213 through the lower opening of the reception hole 210. The upper lens group 310, the liquid lens 400, and a lower lens group 320 may be received in the lens holder 200 through the above process.

The reason that the liquid lens 400 is inserted laterally is that the horizontal sectional area of the liquid lens 400 is greater than the horizontal sectional area of each of the upper and lower lens groups 310 and 320. In order for the liquid lens 400 to be located in the middle hole 212 through the lower opening of the reception hole 210, therefore, the horizontal sectional area of the lower hole 213 must be greater than the horizontal sectional area of the liquid lens 400. As a result, the lower lens group 320, the horizontal sectional area of which is less than the horizontal sectional area of the liquid lens 400, cannot be received in the lower hole 213. In this case, in order to receive the lower lens group 320 in the lower hole 213, the lower lens group 320 must be received in a separate lens holder, and the separate lens holder must be inserted into the lower hole 213. In this assembly process, however, the number of parts is increased, whereby manufacturing costs are increased, the process is complicated, and the defect rate is increased. In particular, the optical axes of the upper lens group 310 and the liquid lens 400, which are received in the original lens holder 200, and the optical axis of the lower lens group 320, which is received in the separate lens holder, may be misaligned with each other. In contrast, in the structure in which the liquid lens 400 is inserted laterally according to the present embodiment, all of the upper and lower lens groups 310 and 320 and the liquid lens 400 are received in the single lens holder 200, thereby avoiding the above problem.

The lens module 300 may be received in the lens holder 200. The light that has passed through the transmission window 111 may be transmitted through the lens module 300. The light that has been transmitted through the lens module 300 may be irradiated to the image sensor. The lens module 300 may include one or more lenses. The lens module 300 may include a plurality of lenses. In this case, the optical axes of the lenses constituting the lens module 300 may be aligned with each other. The lens module 300 may have a single optical axis. The lens module 300 may include an upper lens group 310 and a lower lens group 320. The upper lens group 310 may include one or more lenses. The upper lens group 310 may include a plurality of lenses. The upper lens group 310 may be received in the upper hole 211. The lenses of the upper lens group 310 may be screw-coupled or bonded to the upper hole 211. The upper lens group 310 may be disposed above the liquid lens 400. In this case, the lower surface of the lowermost lens of the upper lens group 310 may abut the upper surface of the liquid lens 400. The lower lens group 320 may include a plurality of lenses. The lower lens group 320 may be received in the lower hole 213. The lenses of the lower lens group 320 may be screw-coupled or bonded to the lower hole 213. The lower lens group 320 may be disposed under the liquid lens 400. In this case, the upper surface of the uppermost lens of the lower lens group 320 may abut the lower surface of the liquid lens 400.

The liquid lens 400 may be received in the lens holder 200. The liquid lens 400 may be received in the middle hole 212. The liquid lens 400 may be bonded to the middle hole 212 in the state of being received in the middle hole 212. The liquid lens 400 may be inserted between the upper lens group 310 and the lower lens group 320 (add-in type). In this case, the liquid lens 400 may be inserted laterally into the front of the lens holder 200 through the insertion hole 220. That is, the liquid lens 400 may be inserted from the front to the rear of the lens holder 200, and may then be received in the middle hole 212. Consequently, external light may be sequentially transmitted through the upper lens group 310, the liquid lens 400, and the lower lens group 320. However, the disposition of the liquid lens 400 is not limited thereto. As described above, the liquid lens may be disposed above the lens module 300 (add-on type), or may be disposed under the lens module 300 (add-below type) depending on the optical design. The liquid lens 400 may constitute a lens group of the camera module 1000 together with the lens module 300. Consequently, the optical axis of the liquid lens 400 may be aligned with the optical axis of the lens module 300. The liquid lens 400 may be connected to the main board 500. The liquid lens 400 may be connected to a control unit mounted on the main board 500. Consequently, the control unit may be a component of the liquid lens 400. The control unit may control the voltage that is applied to the liquid lens 400. The control unit may control the magnitude of "unit voltage" that is applied to the liquid lens 400 and electrode sectors to which the "unit voltage" is applied.

The liquid lens 400 may be moved according to an electrowetting phenomenon. Hereinafter, the electrowetting phenomenon will be described with reference to FIG. 5. When a conductive liquid drop 1 is dropped onto a dielectric plate 4, the conductive liquid drop has a spherical shape, as indicated by a solid line A. Subsequently, when voltages are applied to a first electrode 3, which is disposed under the dielectric plate 4, and to a second electrode 2, which is connected to the conductive liquid drop 4, a phenomenon in which the contact angle between the conductive liquid drop 1 and the upper surface of the dielectric plate 4 is changed occurs, as indicated by a solid line B. This phenomenon is called an electrowetting phenomenon. It should be noted that, if the conductive liquid drop 1 is connected to the first electrode 3 without the intervention of the dielectric plate 4, the conductive liquid drop 1 may be decomposed according to the electrowetting phenomenon. In the liquid lens 400, the curvature or inclination of the interface between a conductive liquid and a nonconductive liquid is changed according to the electrowetting phenomenon. Furthermore, the camera module according to the present embodiment may change the curvature of the interface according to the electrowetting phenomenon of the liquid lens 400, thereby performing the AF function.

The liquid lens 400 may be configured such that boards and plates are deposited in the state of being stacked, as shown in FIG. 6. The liquid lens 400 may include a first board 410, an upper cover plate 420, a core plate 430, an electrode unit 440, an insulation unit 450, a lower cover plate 460, and a second board 470.

The first board 410 may be disposed at the uppermost portion of the liquid lens 400. The first board 410 may be disposed above the upper cover plate 420. The first board 410 may be connected to a first electrode 441, a description of which will follow. The first board 410 may be connected to the main board 500. The first board 410 may be connected to the control unit mounted on the main board 500. That is, the first board 410 may connect the first electrode 441 and the control unit to each other. As a result, the first electrode 441 may be electrically controlled by the control unit. The first board 410 may include a first electrode board 411 and a first connection board 412.

The first electrode board 411 may be a printed circuit board (PCB). The first electrode board 411 may be formed in the shape of a plate. The first electrode board 411 may be disposed above the upper cover plate 420. In this case, the lower surface of the first electrode board 411 and the upper surface of the upper cover plate 420 may abut each other. Four corners of the first electrode board 411 may be connected respectively to first, second, third, and fourth electrode sectors 441-1, 441-2, 441-3, and 441-4 of the first electrode 441, a description of which will follow, via recesses formed in four corners of the upper cover plate 420 corresponding thereto. To this end, conductive epoxy or electrode pads may be interposed between the first electrode board 411 and the first, second, third, and fourth electrode sectors 441-1, 441-2, 441-3, and 441-4. The front portion of the first electrode board 411 may be connected to the first connection board 412. In this case, the first electrode board 411 and the first connection board 412 may be soldered to each other. The first electrode board 411 may be connected to the main board 500 via the first connection board 412. In this case, the first electrode board 411 may be connected to the control unit mounted on the main board 500. Consequently, the control unit may apply "unit voltage" to each of the first, second, third, and fourth electrode sectors 441-1, 441-2, 441-3, and 441-4 through the first electrode board 411. That is, the control unit controls the voltage that is applied to each of the first, second, third, and fourth electrode sectors 441-1, 441-2, 441-3, and 441-4. The first electrode board 411 may be provided in the center thereof (the point thereof that is aligned with the optical axis of the lens module) with a first board hole 411-1, which extends in the direction in which the liquid lens 400 is inserted (from the front to the rear). Consequently, the light that has been transmitted through the upper lens group 310 may be irradiated to the upper cover plate 420 through the first board hole 411-1. Furthermore, since the first board hole 411-1 extends in the direction in which the liquid lens 400 is inserted, friction between the first electrode board 411 and the lower portion of the upper lens group 310 may be avoided when the liquid lens 400 is inserted.

The first connection board 412 may be a flexible printed circuit board (FPCB). The first connection board 412 may extend downwards from the front portion of the first electrode board 411. In this case, the first connection board 412 may be received in the guide hole 230 in the lens holder 200 in the state of extending downwards. As a result, the junction between the first connection board 412 and the first electrode board 411 may be round. The lower portion of the first connection board 412 may be connected to the main board 500. In this case, the lower portion of the first connection board 412 may be soldered to the main board 500. In addition, the lower portion of the first connection board 412 may be connected to the control unit.

The upper cover plate 420 may be disposed between the first electrode board 411 and the core plate 430. That is, the upper cover plate 420 may be disposed under the first electrode board 411, or may be disposed above the core plate 430. In this case, the upper surface of the upper cover plate 420 may abut the lower surface of the first electrode board 411. In addition, the lower surface of the upper cover plate 420 may abut the upper surface of the core plate 430. As a result, the upper cover plate 420 may close the upper portion of a cavity 431 formed in the core plate 430, a description of which will follow. The upper cover plate 420 may be an insulative transparent board. In an example, the upper cover plate 420 may be a glass board. Consequently, the light that has been transmitted through the first board hole 411-1 may be transmitted through the upper cover plate 420. The upper cover plate 420 may be provided in four corners thereof with recesses, which are cut inwards. The four corners of the first electrode board 411 may be connected respectively to the first, second, third, and fourth electrode sectors 441-1, 441-2, 441-3, and 441-4 via the recesses formed in the four corners of the upper cover plate 420. In order to connect the four corners of the first electrode board 411 respectively to the first, second, third, and fourth electrode sectors 441-1, 441-2, 441-3, and 441-4, conductive epoxy or electrode pads may be disposed in the recesses formed in the four corners of the upper cover plate 420. The upper cover plate 420 may be provided in the center of the lower surface thereof with a cover plate recess 421. Consequently, a portion of a conductive liquid L1 received in the upper portion of the cavity 431 in the core plate 430 may be received in the cover plate recess 421.

The core plate 430 may be disposed between the upper cover plate 420 and the lower cover plate 460. That is, the core plate 430 may be disposed under the upper cover plate 420, and may be disposed above the lower cover plate 460. In this case, the upper surface of the core plate 430 may abut the lower surface of the upper cover plate 420. In addition, the upper surface of the core plate 430 may abut the upper surface of the lower cover plate 460. The core plate 430 may be provided in the center thereof (the point thereof that is aligned with the optical axis of the lens module) with a cavity 431, which is open at the upper and lower portions thereof and receives the conductive liquid L1 and a nonconductive liquid L2. The cavity 431 may be formed in a hollow cylindrical shape having a vertical sectional area that is gradually increased upwards. That is, the cavity 431 may be formed in a tapered shape having a vertical sectional area that is gradually increased upwards. The central axis of the cavity 431 may be aligned with the optical axis of the lens module 300. The upper opening of the cavity 431 may be closed by the upper cover plate 420. The lower opening of the cavity 431 may be closed by the lower cover plate 460. Consequently, the conductive liquid L1 and the nonconductive liquid L2 may be received in the cavity 431.

The electrode unit 440 may be disposed at the core plate 430. The electrode unit 440 may be coated on the surface of the core plate 430. The electrode unit 440 may be a pattern electrode patterned on the surface of the core plate 430. The electrode unit 440 may abut the conductive liquid L1. Consequently, the electrode unit 440 may electrically act on the conductive liquid L1. The insulation unit 450 may be interposed between the electrode unit 440 and the nonconductive liquid L2. As a result, contact between the electrode unit 440 and the nonconductive liquid L2 may be inhibited. The electrode unit 440 may be connected to the control unit of the main board 500 via first and second electrode boards 411 and 471. In this case, the control unit may control the voltage that is applied to the electrode unit 440.

The electrode unit 440 may include a first electrode 441 and a second electrode 442, which electromagnetically interact with each other to change the interface I between the conductive liquid L1 and the nonconductive liquid L2. The first electrode 441 and the second electrode 442 may be spaced apart from each other. That is, the first electrode 441 and the second electrode 442 may be coated on the core plate 430 in the state of being separated from each other. In this case, the first electrode 441 may be disposed at the upper surface of the core plate 430. More specifically, the first electrode 441 may be disposed at the outside of the upper surface of the core plate 430. The second electrode 442 may be disposed at the upper surface and the lower surface of the core plate 430 and at the inner surface of the cavity 431. More specifically, the second electrode 442 may be disposed at the inside of the upper surface of the core plate 430. In addition, the second electrode 442 may be disposed at the inner surface of the cavity 431. In addition, the second electrode 442 may be disposed at the lower surface of the core plate 430. In this case, the portions of the second electrode 442 disposed at the upper surface and the lower surface of the core plate 430 and in the cavity 431 may be integrally connected to each other. A separation unit 443 for separating the first and second electrodes 441 and 442 from each other may be formed at the upper surface of the core plate 430. The separation unit 443 may be ring-shaped, may be concentric with the cavity 431 at the upper surface of the core plate 430, and may be disposed outside the cavity 431 in the radial direction. At the upper surface of the core plate 430, the first electrode 441 may be disposed outside the separation unit 443, and the second electrode 442 may be disposed inside the separation unit 443.

The first electrode 441 may include a plurality of electrode sectors. In the present embodiment, the case in which the first electrode 441 includes four electrode sectors will be described by way of example. The first electrode 441 may include first, second, third, and fourth electrode sectors 441-1, 441-2, 441-3, and 441-4. The first electrode 441 may include first, second, third, and fourth electrode sectors 441-1, 441-2, 441-3, and 441-4, which are sequentially disposed about the optical axis of the lens module 300 in the circumferential direction. For example, the first electrode 441 may include a first electrode sector 441-1, a second electrode sector 441-2, a third electrode sector 441-3, and a fourth electrode sector 441-4, which are sequentially disposed about the central axis of the cavity 431 in the counterclockwise direction from the front right side. That is, when the core plate 430 is divided into four quadrants, the first electrode sector 441-1 may be disposed at the front right side, the second electrode sector 441-2 may be disposed at the front left side, the third electrode sector 441-3 may be disposed at the rear left side, and the fourth electrode sector 441-4 may be disposed at the rear right side. In other words, the first electrode sector 441-1 may be disposed at the front right side of the core plate 430, the third electrode sector 441-3 may be disposed in the direction in which the third electrode sector 441-3 and the first electrode sector 441-1 are symmetric with respect to the optical axis, the second electrode sector 441-2 may be disposed between the first and third electrode sectors 441-1 and 441-3 in the circumferential direction, and the fourth electrode sector 441-4 may be disposed in the direction in which the fourth electrode sector 441-4 and the second electrode sector 441-2 are symmetric with respect to the optical axis.

The first electrode sector 441-1 may be disposed so as to correspond to a fifth electrode sector 442-1 of the second electrode 442, a description of which will follow. The first electrode sector 441-1 may electromagnetically interact with the fifth electrode sector 442-1. The second electrode sector 441-2 may be disposed so as to correspond to a sixth electrode sector 442-2 of the second electrode 442, a description of which will follow. The second electrode sector 441-2 may electromagnetically interact with the sixth electrode sector 442-2. The third electrode sector 441-3 may be disposed so as to correspond to a seventh electrode sector 442-3 of the second electrode 442, a description of which will follow. The third electrode sector 441-3 may electromagnetically interact with the seventh electrode sector 442-3. The fourth electrode sector 441-4 may be disposed so as to correspond to an eighth electrode sector 442-4 of the second electrode 442, a description of which will follow. The fourth electrode sector 441-4 may electromagnetically interact with the eighth electrode sector 442-4.

The first electrode sector 441-1 may be connected to the front right corner of the first electrode board 411 via the recess formed in the front right corner of the upper cover plate 420. The second electrode sector 441-2 may be connected to the front left corner of the first electrode board 411 via the recess formed in the front left corner of the upper cover plate 420. The third electrode sector 441-3 may be connected to the rear left corner of the first electrode board 411 via the recess formed in the rear left corner of the upper cover plate 420. The fourth electrode sector 441-4 may be connected to the rear right corner of the first electrode board 411 via the recess formed in the rear right corner of the upper cover plate 420. In order to connect the first, second, third, and fourth electrode sectors 441-1, 441-2, 441-3, and 441-4 to the first electrode board 411, conductive epoxy or electrode pads may be used. The control unit may individually control the voltages that are applied to the first, second, third, and fourth electrode sectors 441-1, 441-2, 441-3, and 441-4 through the first connection board 412 and the first electrode board 411.

The second electrode 442 may include a plurality of electrode sectors. In the present embodiment, the case in which the second electrode 442 includes four electrode sectors will be described by way of example. The second electrode 442 may include fifth, sixth, seventh, and eighth electrode sectors 442-1, 442-2, 442-3, and 442-4. The second electrode 442 may include fifth, sixth, seventh, and eighth electrode sectors 442-1, 442-2, 442-3, and 442-4, which are sequentially disposed about the optical axis of the lens module 300 in the circumferential direction. For example, the second electrode 442 may include a fifth electrode sector 442-1, a sixth electrode sector 442-2, a seventh electrode sector 442-3, and an eighth electrode sector 442-4, which are sequentially disposed about the central axis of the cavity 431 in the counterclockwise direction from the front right side. That is, when the core plate 430 is divided into four quadrants, the fifth electrode sector 442-1 may be disposed at the front right side, the sixth electrode sector 442-2 may be disposed at the front left side, the seventh electrode sector 442-3 may be disposed at the rear left side, and the eighth electrode sector 442-4 may be disposed at the rear right side. In other words, the fifth electrode sector 442-1 may be disposed at the front right side of the core plate 430, the seventh electrode sector 442-3 may be disposed in the direction in which the seventh electrode sector 442-3 and the fifth electrode sector 442-1 are symmetric with respect to the optical axis, the sixth electrode sector 442-2 may be disposed between the fifth and seventh electrode sectors 442-1 and 442-3 in the circumferential direction, and the eighth electrode sector 442-4 may be disposed in the direction in which the eighth electrode sector 442-4 and the sixth electrode sector 442-2 are symmetric with respect to the optical axis.

The fifth electrode sector 442-1 may be disposed so as to correspond to the first electrode sector 441-1 of the first electrode 441. The fifth electrode sector 442-1 may electromagnetically interact with the first electrode sector 441-1. The sixth electrode sector 442-2 may be disposed so as to correspond to the second electrode sector 441-2 of the first electrode 441. The sixth electrode sector 442-2 may electromagnetically interact with the second electrode sector 441-2. The seventh electrode sector 442-3 may be disposed so as to correspond to the third electrode sector 441-3 of the first electrode 441. The seventh electrode sector 442-3 may electromagnetically interact with the third electrode sector 441-3. The eighth electrode sector 442-4 may be disposed so as to correspond to the fourth electrode sector 441-4 of the first electrode 441. The eighth electrode sector 442-4 may electromagnetically interact with the fourth electrode sector 441-4.

The fifth electrode sector 442-1 may be connected to the front right corner of the second electrode board 471, a description of which will follow, via a recess formed in the front right corner of the lower cover plate 460, a description of which will follow. The sixth electrode sector 442-2 may be connected to the front left corner of the second electrode board 471 via a recess formed in the front left corner of the lower cover plate 460, a description of which will follow. The seventh electrode sector 442-3 may be connected to the rear left corner of the second electrode board 471 via a recess formed in the rear left corner of the lower cover plate 460, a description of which will follow. The eighth electrode sector 442-4 may be connected to the rear right corner of the second electrode board 471 via a recess formed in the rear right corner of the lower cover plate 460, a description of which will follow. In order to connect the fifth, sixth, seventh, and eighth electrode sectors 442-1, 442-2, 442-3, and 442-4 to the second electrode board 471, conductive epoxy or electrode pads may be used. The control unit may individually control the voltages that are applied to the fifth, sixth, seventh, and eighth electrode sectors 442-1, 442-2, 442-3, and 442-4 through a second connection board 472 and a second electrode board 471, a description of which will follow.

The insulation unit 450 may be disposed at the electrode unit 440. The insulation unit 450 may be coated on the electrode unit 440 so as to be stacked. The insulation unit 450 may be disposed at the point thereof corresponding to the inside of the upper surface of the core plate 430 in the state of being stacked. In this case, the insulation unit 450 may extend over the separation unit 443. Consequently, a portion of the insulation unit 450 may be received in the separation unit 443. In addition, the insulation unit 450 may be disposed at the point thereof corresponding to the inner surface of the cavity 431 in the state of being stacked. The insulation unit 450 may be disposed in the center of the upper surface of the lower cover plate 460 (the portion that is aligned with the optical axis), a description of which will follow, in a circular shape. The insulation unit 450 disposed at the electrode unit 440 and the insulation unit 450 disposed at the lower cover plate 460 may be connected to each other so as to be integrally formed. Contact between the nonconductive liquid L2 and the second electrode 442 may be inhibited by the insulation unit 450. That is, the insulation unit 450 may be interposed between the nonconductive liquid L2 and the second electrode 442. However, contact between the first electrode 441 and the conductive liquid L1 may not be inhibited by the insulation unit 450. The reason for this is that the sectional area of the cover plate recess 421 in the upper cover plate 420 is greater than the sectional area of the insulation unit 450 disposed at the point thereof corresponding to the inside of the upper surface of the core plate 430 in the state of being stacked on the electrode unit 440. Consequently, the conductive liquid L1 received in the cover plate recess 421 of the upper cover plate 420 may abut the first electrode 441. As a result, the first electrode 441 and the conductive liquid L1 may be connected to each other.

The conductive liquid L1 may be received in the upper portion of the cavity 431. Furthermore, the conductive liquid L1 may be received in the cover plate recess 421 of the upper cover plate 420. The conductive liquid L1 received in the cavity 431 and the conductive liquid L1 received in the cover plate recess 421 may be connected to each other so as to be integrally formed. The nonconductive liquid L2 may be disposed in the lower portion of the cavity 431. The nonconductive liquid L2 may abut the conductive liquid L1 to form the interface I therebetween. That is, in the cavity 431, the conductive liquid L1 may be disposed in the upper portion, and the nonconductive liquid L2 may be disposed in the lower portion. In an example, the conductive liquid L1 may be water. In an example, the nonconductive liquid L2 may be epoxy. Consequently, the conductive liquid L1 and the nonconductive liquid L2 may not be mixed with each other or chemically coupled to each other but may be separated from each other to form the interface I therebetween. A curvature may be formed at the interface I between the conductive liquid L1 and the nonconductive liquid L2. In this case, the interface I may be convex upwards (convex lens; positive power), or may be convex downwards (concave lens; negative power) depending on the optical design conditions. In the present embodiment, the case in which the interface I is convex downwards will be described by way of example. The interface I may have a curvature, and thus may perform the same function as a lens. The conductive liquid L1 and the nonconductive liquid L2 may have similar specific gravities. Even when the posture of the liquid lens 400 is changed due to the inclination of the camera module 1000, therefore, the interface I may not move, that is, may behave as if it were fixed. The reason for this is that the surface tensions of the conductive liquid L1 and the nonconductive liquid L2 are more dominant in the liquid lens 400 than the specific gravities of the conductive liquid L1 and the nonconductive liquid L2.

The conductive liquid L1 may abut the electrode unit 440 so as to be connected to the electrode unit. More specifically, the portion of the conductive liquid L1 that is received in the cover plate recess 421 may abut the first electrode 441 so as to be connected to the first electrode. The nonconductive liquid L2 may be isolated from the electrode unit 440. More specifically, contact between the nonconductive liquid L2 and the electrode unit 440 may be inhibited by the insulation unit 450 disposed at the inner wall of the cavity 431.

In consideration of the above description, when voltages are applied to the first and second electrodes 441 and 442, which electromagnetically interact with each other to form an electromagnetic system, an electrowetting phenomenon may occur in the conductive liquid L1, whereby the curvature of the interface I may be changed. Consequently, the camera module according to the present embodiment may perform the auto-focusing function. When voltages are applied in a biased (asymmetric) manner to the first, second, third, fourth, fifth, sixth, seventh, and eighth electrode sectors 441-1, 441-2, 441-3, 441-4, 442-1, 442-2, 442-3, and 442-4, however, a partial electrowetting phenomenon may occur in the conductive liquid L1, whereby the inclination of the interface I may be changed.

The lower cover plate 460 may be disposed between the second electrode board 471, a description of which will follow, and the core plate 430. The lower cover plate 460 may be disposed above the second electrode board 471, or may be disposed under the core plate 430. In this case, the lower surface of the lower cover plate 460 may abut the upper surface of the second electrode board 471. In addition, the upper surface of the lower cover plate 460 may abut the lower surface of the core plate 430. As a result, the lower cover plate 460 may close the lower portion of the cavity 431. The lower cover plate 460 may be an insulative transparent board. In an example, the lower cover plate 460 may be a glass board. Consequently, the light that has been transmitted through the interface I1 may be transmitted through the lower cover plate 460. The lower cover plate 460 may be provided in four corners thereof with recesses, which are cut inwards. The four corners of the second electrode board 471 may be connected respectively to the fifth, sixth, seventh, and eighth electrode sectors 442-1, 442-2, 442-3, and 442-4 via the recesses formed in the four corners of the lower cover plate 460. In order to connect the four corners of the second electrode board 471 respectively to the fifth, sixth, seventh, and eighth electrode sectors 442-1, 442-2, 442-3, and 442-4, conductive epoxy or electrode pads may be disposed in the recesses formed in the four corners of the lower cover plate 460. An insulation unit 450 may be disposed at the center of the upper surface of the lower cover plate 460. The insulation unit 450 disposed at the center of the upper surface of the lower cover plate 460 may be formed in the shape of a circle, the center of which is aligned with the optical axis.

The second board 470 may be disposed at the lowermost portion of the liquid lens 400. The second board 470 may be disposed under the lower cover plate 460. The second board 470 may be connected to the second electrode 442. The second board 470 may be connected to the main board 500. The second board 470 may be connected to the control unit mounted on the main board 500. That is, the second board 470 may connect the second electrode 442 and the control unit to each other. As a result, the second electrode 442 may be electrically controlled by the control unit. The second board 470 may include a second electrode board 471 and a second connection board 472.

The second electrode board 471 may be a printed circuit board (PCB). The second electrode board 471 may be formed in the shape of a plate. The second electrode board 471 may be disposed under the lower cover plate 460. In this case, the upper surface of the second electrode board 471 and the lower surface of the lower cover plate 460 may abut each other. The four corners of the second electrode board 471 may be connected respectively to the fifth, sixth, seventh, and eighth electrode sectors 442-1, 442-2, 442-3, and 442-4 of the second electrode 442 via recesses formed in the four corners of the lower cover plate 460 corresponding thereto. To this end, four conductive epoxy or electrode pads may be interposed between the second electrode board 471 and the fifth, sixth, seventh, and eighth electrode sectors 442-1, 442-2, 442-3, and 442-4. The front portion of the second electrode board 471 may be connected to the second connection board 472. In this case, the second electrode board 471 and the second connection board 472 may be soldered to each other. The second electrode board 471 may be connected to the main board 500 via the second connection board 472. In this case, the second electrode board 471 may be connected to the control unit mounted on the main board 500. Consequently, the control unit may apply a "unit voltage" to each of the fifth, sixth, seventh, and eighth electrode sectors 442-1, 442-2, 442-3, and 442-4 through the second electrode board 471. That is, the control unit control the voltage that is applied to each of the fifth, sixth, seventh, and eighth electrode sectors 442-1, 442-2, 442-3, and 442-4. The second electrode board 471 may be provided in the center thereof (the point thereof that is aligned with the optical axis of the lens module) with a circular second board hole 471-1. Consequently, the light that has been transmitted through the lower cover plate 460 may be irradiated to the image sensor through the second board hole 471-1.

The second connection board 472 may be a flexible printed circuit board (FPCB). The second connection board 472 may extend downwards from the front portion of the second electrode board 471. In this case, the second connection board 472 may be received in the guide hole 230 in the lens holder 200 in the state of extending downwards. As a result, the junction between the second connection board 472 and the second electrode board 471 may be round. The lower portion of the second connection board 472 may be connected to the main board 500. In this case, the lower portion of the second connection board 472 may be soldered to the main board 500.

The main board 500 may be a printed circuit board (PCB). The main board 500 may support the lens holder 200. The image sensor may be mounted on the main board 500. In an example, the image sensor may be located inside the upper surface of the main board 500, and the lens holder 200 may be located outside the upper surface of the main board 500. In this structure, the light that has been transmitted through the lens module 300 and the liquid lens 400 may be irradiated to the image sensor mounted on the main board 500. The control unit may be mounted on the main board 500. The main board 500 may be connected to the liquid lens 400. In this case, the main board 500 may be connected to the liquid lens 400 via the first and second boards 410 and 470. The main board 500 may apply the voltage controlled by the control unit to the liquid lens 400.

The image sensor may be mounted on the main board 500. The image sensor may be located so as to be aligned with the optical axis of the lens module 300. Consequently, the light that has been transmitted through the lens module 300 and the liquid lens 400 may be irradiated to the image sensor. The image sensor may output the irradiated light as images or video. The image sensor may be a charge-coupled device (CCD), metal oxide semiconductor (MOS), CPD, or CID. However, the kind of image sensor is not limited thereto.

The infrared filter may inhibit infrared light from being incident on the image sensor. The infrared filter may be located between the lens module 300 and the main board 500. The infrared filter may be located between the lens module 300 and the image sensor. The infrared filter may be made of a film material or a glass material. The infrared filter may be formed by coating a flat-shaped optical filter, such as a cover glass for protecting an image plane, with an infrared cutoff material. The infrared filter may perform an infrared cutoff function or an infrared absorption function.

The control unit may be connected to the main board 500. The control unit may be mounted on the main board 500. The control unit may be connected to the first, second, third, fourth, fifth, sixth, seventh, and eighth electrode sectors 441-1, 441-2, 441-3, 441-4, 442-1, 442-2, 442-3, and 442-4. The control unit may control whether to apply voltage to each of the first, second, third, fourth, fifth, sixth, seventh, and eighth electrode sectors 441-1, 441-2, 441-3, 441-4, 442-1, 442-2, 442-3, and 442-4, and may control the magnitude of the voltage that is applied. The control unit may control the liquid lens 400 to change the curvature of the interface I of the liquid lens 400 such that the liquid lens performs the AF function. The detailed function of the control unit will be described in connection with liquid lens moving methods according to the first and second embodiments, a description of which will follow. Although the control unit is described as a separate construction, the control unit may be a "component" of the liquid lens 400.

Figure 8:
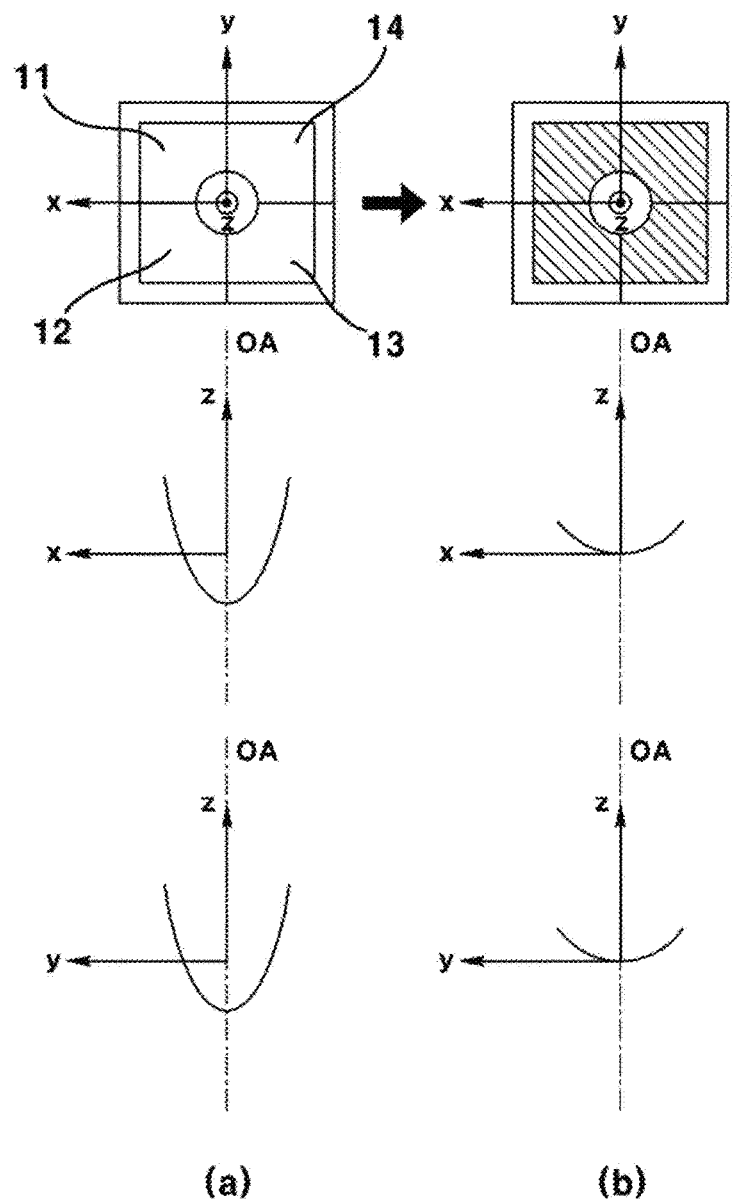
FIG. 8 is a conceptual view showing AF operation according to a comparative example.
Figure 9:
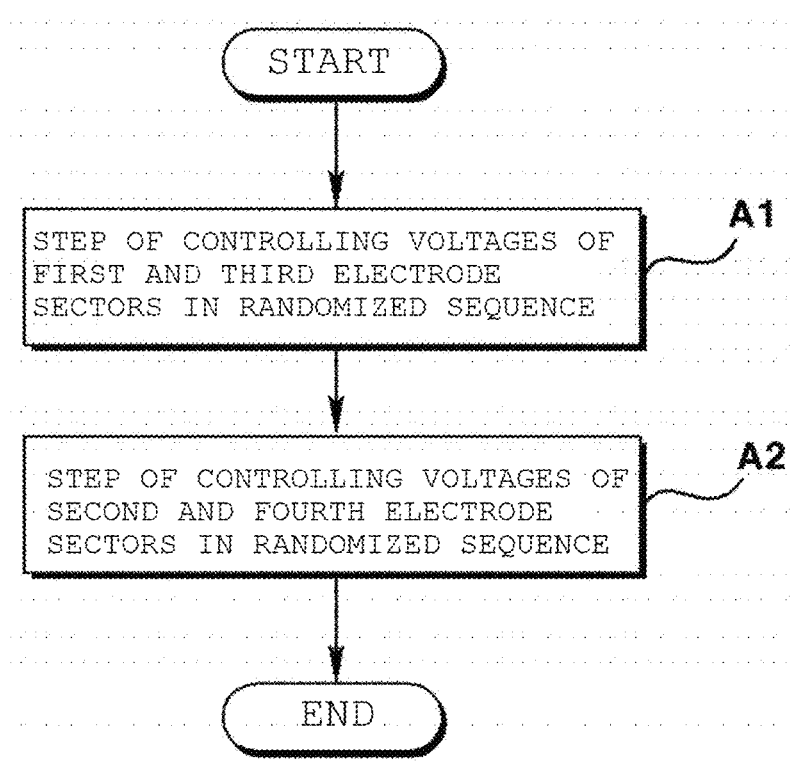
FIG. 9 is a flowchart showing a liquid lens moving method according to a first embodiment.
Figure 10:
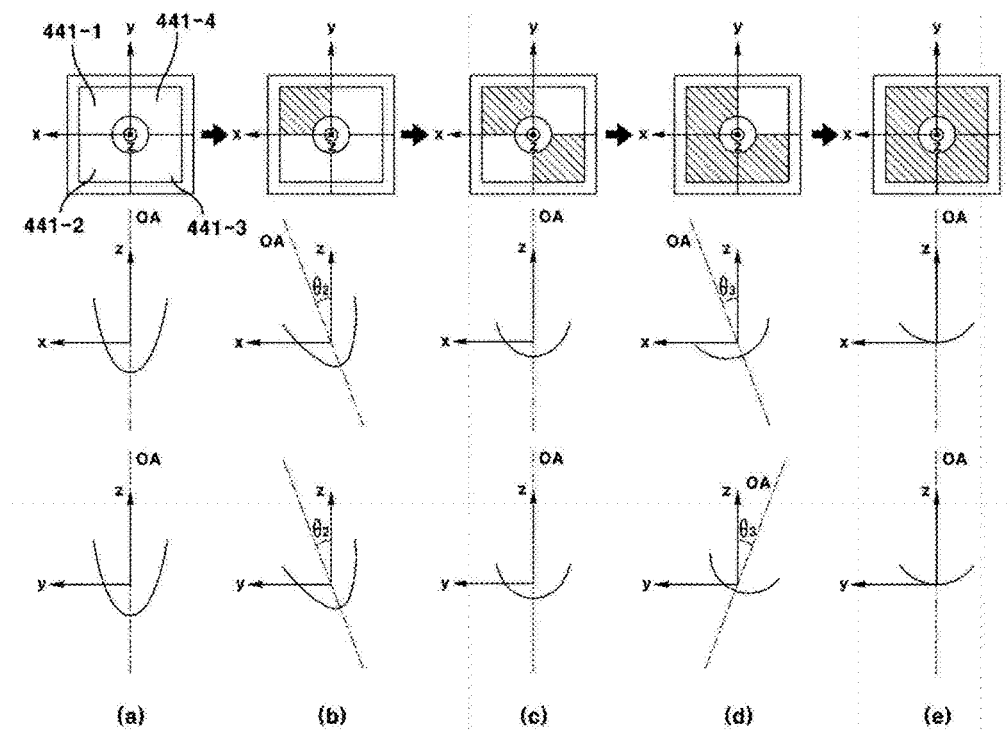
FIG. 10 is a conceptual view showing the liquid lens moving method according to the first embodiment.
Figure 11:
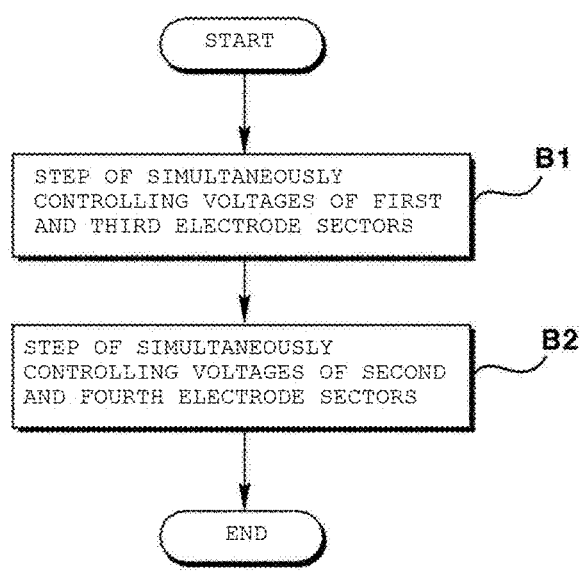
FIG. 11 is a flowchart showing a liquid lens moving method according to a second embodiment.
Figure 12:
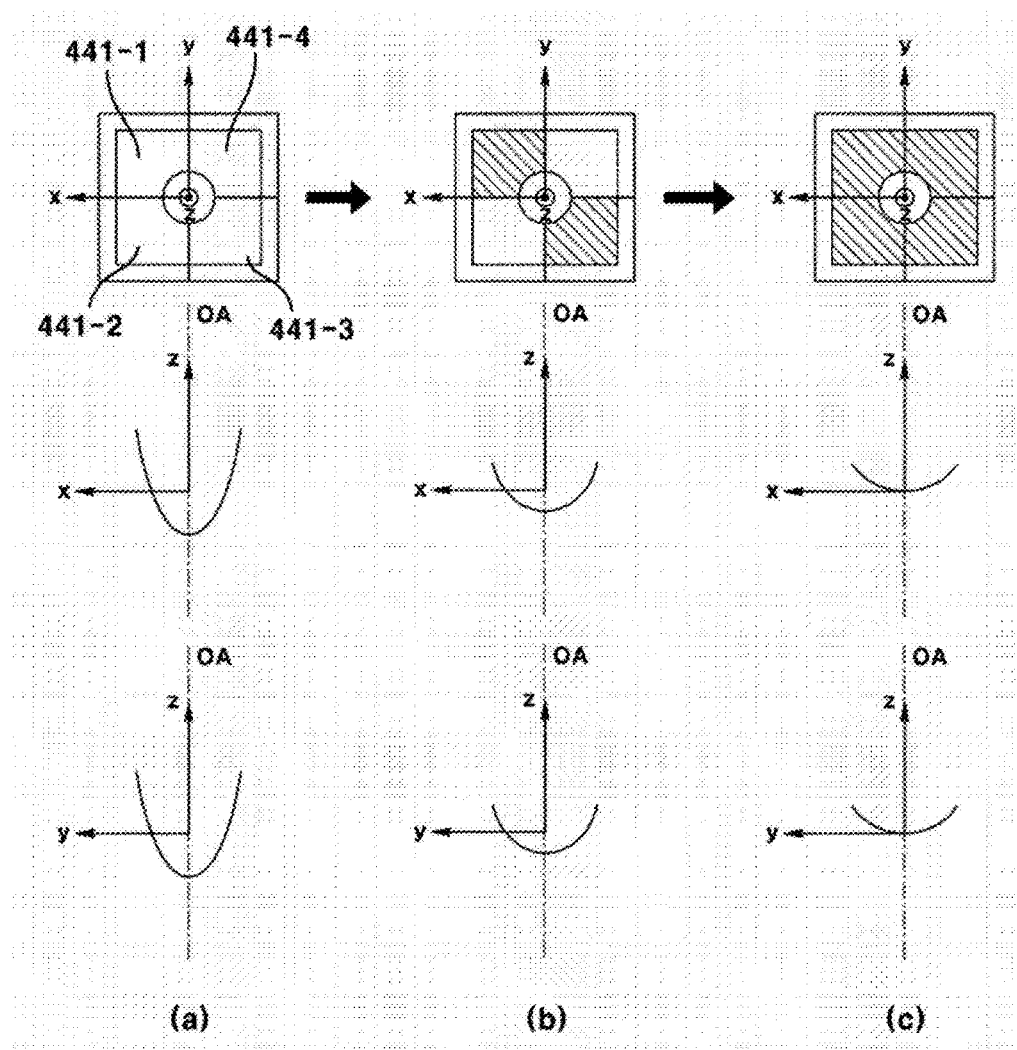
FIG. 12 is a conceptual view showing the liquid lens moving method according to the second embodiment.
Figure 13A:
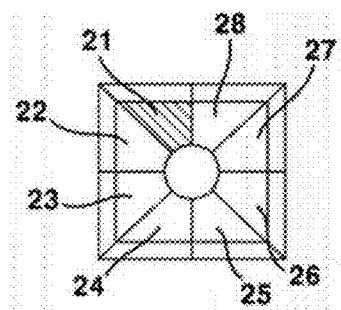
FIGS. 13(a)-13(h) are conceptual views showing the liquid lens moving method in the case in which an electrode unit is divided into 8 electrode sectors.
Figure 13B:
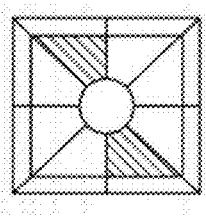
Figure 13C:
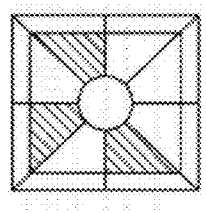
Figure 13D:
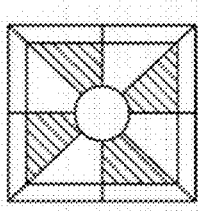
Figure 13E:
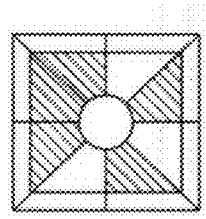
Figure 13F:
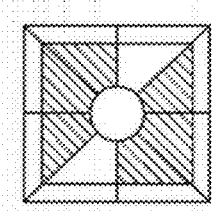
Figure 13G:
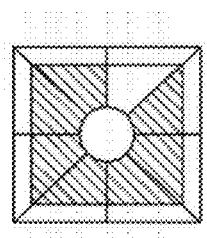
Figure 13H:
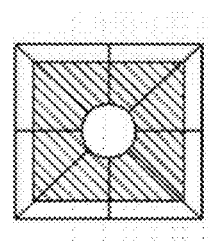
Figure 14A:
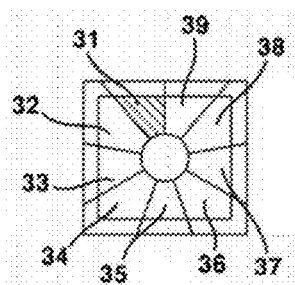
FIGS. 14(a)-14(i) are conceptual views showing the liquid lens moving method in the case in which an electrode unit is divided into 9 electrode sectors.
Figure 14B:
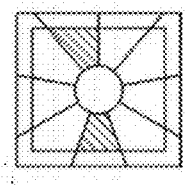
Figure 14C:
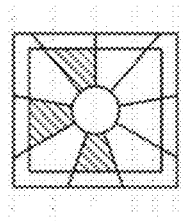
Figure 14D:
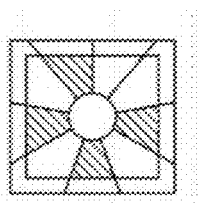
Figure 14E:
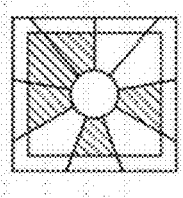
Figure 14F:
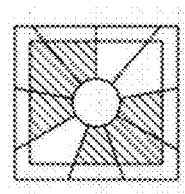
Figure 14G:
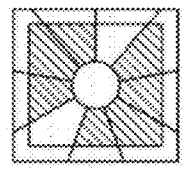
Figure 14H:
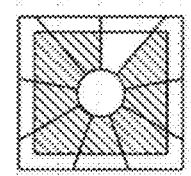
Figure 14I:
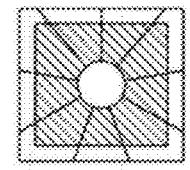
Figure 15:
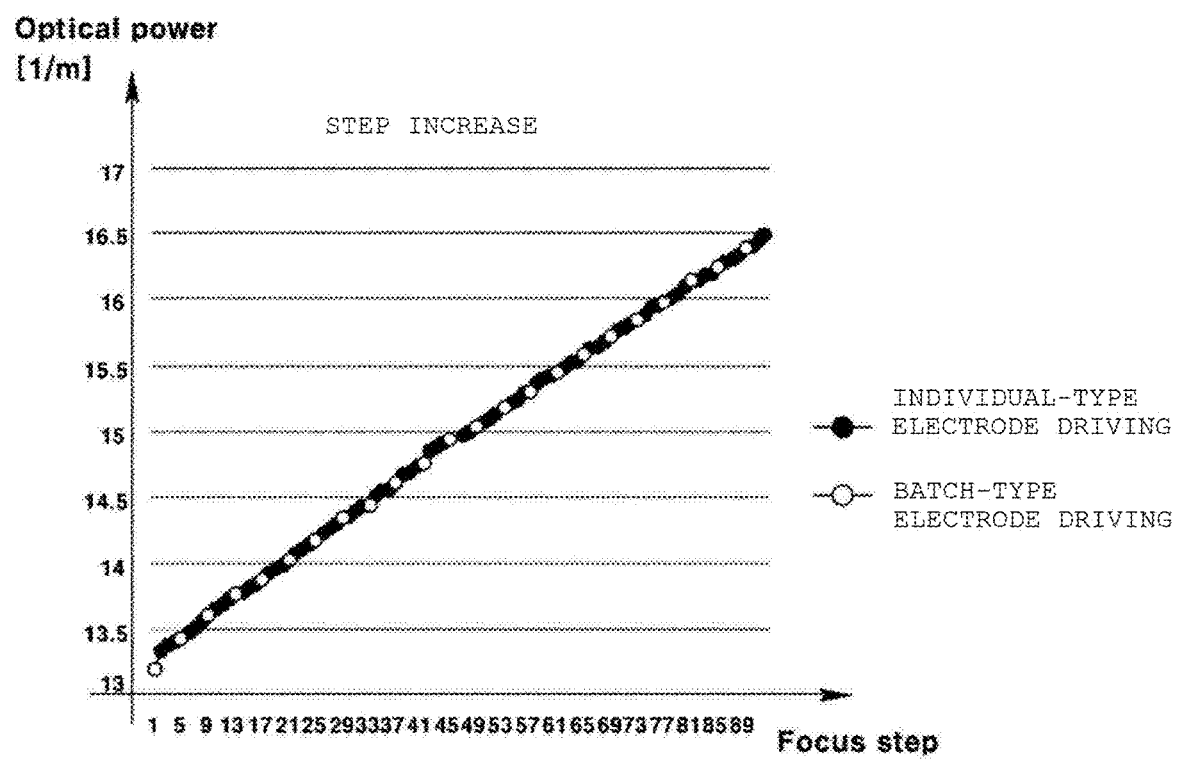
FIG. 15 is a graph showing optical power meter based on focus step in the present embodiment and the comparative example.

Hereinafter, liquid lens moving methods according to the first and second embodiments will be described with reference to the drawings. FIG. 8 is a conceptual view showing AF operation according to a comparative example, FIG. 9 is a flowchart showing a liquid lens moving method according to a first embodiment, FIG. 10 is a conceptual view showing the liquid lens moving method according to the first embodiment, FIG. 11 is a flowchart showing a liquid lens moving method according to a second embodiment, FIG. 12 is a conceptual view showing the liquid lens moving method according to the second embodiment, FIGS. 13(*a*)-13(*h*) are conceptual views showing the liquid lens moving method in the case in which the electrode unit is divided into 8 electrode sectors, FIGS. 14(*a*)-14(*i*) are conceptual views showing the liquid lens moving method in the case in which the electrode unit is divided into 9 electrode sectors, and FIG. 15 is a graph showing optical power meter (the curvature of the interface I) based on focus step in the present embodiment and the comparative example.

The liquid lens moving method may be performed by applying direct-current voltage or alternating-current voltage to the electrode unit 440. In the case in which direct-current voltage is applied to the electrode unit 440, the first electrode 441 and the second electrode 442 may have opposite polarities. In this case, the first electrode sector 441-1 and the fifth electrode sector 442-1 may form a pair and electromagnetically interact with each other, the second electrode sector 441-2 and the sixth electrode sector 442-2 may form a pair and electromagnetically interact with each other, the third electrode sector 441-3 and the seventh electrode sector 442-3 may form a pair and electromagnetically interact with each other, and the fourth electrode sector 441-4 and the eighth electrode sector 442-4 may form a pair and electromagnetically interact with each other to form an electromagnetic system. In the case in which alternating-current voltage is applied to the electrode unit 440, the fifth, sixth, seventh, and eighth electrode sectors 442-1, 442-2, 442-3, and 442-4 may be a common electrode, and the frequencies applied to the first, second, third, and fourth electrode sectors 441-1, 441-2, 441-3, and 441-4 may be controlled such that each of the pair of the first electrode sector 441-1 and the fifth electrode sector 442-1, the pair of the second electrode sector 441-2 and the sixth electrode sector 442-2, the pair of the third electrode sector 441-3 and the seventh electrode sector 442-3, and the pair of the fourth electrode sector 441-4 and the eighth electrode sector 442-4 performs electromagnetic interaction. This may be expressed as "the voltages applied to the first, second, third, and fourth electrode sectors 441-1, 441-2, 441-3, and 441-4 being controlled." Hereinafter, the case in which alternating-current voltage is applied to the liquid lens 400 will be described by way of example.

Hereinafter, a liquid lens moving method according to a comparative example will be described with reference to FIG. 8.

Hereinafter, AF operation according to a comparative example will be described. In a normal state, no voltages or base voltages are applied to first, second, third, and fourth electrode sectors 11, 12, 13, and 14, whereby the interface I is convex downwards (concave lens; negative power) (see FIG. 8(*a*)). When voltages are applied to all of the first, second, third, and fourth electrode sectors 11, 12, 13, and 14, the conductive liquid moves to the surface of the cavity according to an electrowetting phenomenon in the conductive liquid, whereby the curvature of the interface I is reduced (see FIG. 8(*b*)). When the magnitude of the unit voltage applied to each of the first, second, third, and fourth electrode sectors 11, 12, 13, and 14 is increased, the curvature of the interface I may be convex upwards (convex lens; positive power). At the time of AF operation, the electrowetting phenomenon may uniformly occur in the conductive liquid, since voltages are applied to the first, second, third, and fourth electrode sectors 11, 12, 13, and 14 in a batch fashion. Consequently, a phenomenon in which the interface I is inclined, which occurs in the case in which voltages are partially biasedly applied to the first, second, third, and fourth electrode sectors 11, 12, 13, and 14, does not occur.

In the comparative example, the focus step (the focus degree) of the AF operation is adjusted by the multiple of the unit voltage. That is, the unit voltages may be applied to the first, second, third, and fourth electrode sectors 11, 12, 13, and 14 in a batch fashion, and the multiple of the unit voltage may be adjusted to gradually increase or decrease the curvature of the interface I, thereby adjusting the focus step. That is, the number of focus steps that are adjustable from the initial voltage to the final voltage is (final voltage-initial voltage)/unit voltage. However, there is a limitation in adjusting the focus step using the multiple of the unit voltage in order to subdivide the focus step. In the AF operation according to the comparative example, therefore, it is not possible to accurately perform focusing.

Hereinafter, a liquid lens moving method according to a first embodiment will be described with reference to FIGS. 9 and 10. The liquid lens moving method according to the first embodiment may be a liquid lens moving method for AF operation.

The liquid lens moving method according to the first embodiment may include a step of controlling the voltages of the first and third electrode sectors 441-1 and 441-3 in a randomized sequence (A1) and a step of controlling the voltages of the second and fourth electrode sectors 441-2 and 441-4 in a randomized sequence (A2).

At the step of controlling the voltages of the first and third electrode sectors 441-1 and 441-3 in the randomized sequence (A1), the voltage of the first electrode sector 441-1 may be controlled, and then the voltage of the third electrode sector 441-3 may be controlled. Alternatively, the voltage of the third electrode sector 441-3 may be controlled, and then the voltage of the first electrode sector 441-1 may be controlled. That is, voltage may be applied to the first electrode sector 441-1, and then voltage may be applied to the third electrode sector 441-3. Alternatively, voltage may be applied to the third electrode sector 441-3, and then voltage may be applied to the first electrode sector 441-1. FIG. 10 shows the case in which voltage is applied to the first electrode sector 441-1 and then voltage is applied to the third electrode sector 441-3 by way of example.

In a normal state, no voltages or base voltages are applied to the first, second, third, and fourth electrode sectors 441-1, 441-2, 441-3, and 441-4, whereby the interface I is convex downwards (concave lens; negative power) (see FIG. 10(*a*)).

When the voltage of the first electrode sector 441-1 is controlled and the voltage is applied to the first electrode sector 441-1, the curvature of the interface I may be reduced, whereby the interface I may be inclined to the first electrode sector 441-1 (the front right side) (see FIG. 10(b)). More specifically, an electrowetting phenomenon occurs in the conductive liquid disposed on the first electrode sector 441-1 (the front right side), whereby the conductive liquid moves to the first electrode sector 441-1 of the cavity 431. Consequently, the curvature of the interface I may be reduced, and at the same time, the interface I may be inclined to the first electrode sector 441-1 side. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltage of the first electrode sector 441-1. Since only the first electrode sector 441-1 is partially and in a biased (asymmetric) manner driven, however, the interface I may be inclined to the first electrode sector 441-1 (the front right side). However, the inclination is slight. That is, this inclination is more slight than in the case in which voltages are applied to the first and second electrode sectors 411-1 and 411-2, whereby the interface I is inclined to the first and second electrode sectors 411-1 and 411-2 (the front side). In addition, a problem in which taken video or images are cropped or shake due to slight inclination of the optical axis OA of the liquid lens 40 does not occur, since the image sensor is designed so as to be wide while having a sufficient safety rate. In the first embodiment, the voltage of the first electrode sector 441-1 may be controlled, whereby the focus step may be primarily adjusted.

When the voltage of the third electrode sector 441-3 is controlled and the voltage is applied to the third electrode sector 441-3, the curvature of the interface I may be reduced, and the inclination of the interface I may be restored, whereby the optical axis OA of the liquid lens 400 may be aligned with the optical axis of the lens module 300 (see FIG. 10(c)). More specifically, an electrowetting phenomenon occurs in the conductive liquid disposed on the first electrode sector 441-1 (the front right side) and the third electrode sector 441-3 (the rear left side), whereby the conductive liquid moves to the first and third electrode sectors 441-1 and 441-3 of the cavity 431. Consequently, the curvature of the interface I is further reduced compared to the case in which only the first electrode sector 441-1 is controlled. In addition, since the inclination of the interface I due to control of the voltage of the first electrode sector 441-1 is offset with the inclination of the interface I due to control of the voltage of the third electrode sector 441-3, inclination of the interface I does not occur. The reason for this is that the first electrode sector 441-1 and the third electrode sector 441-3 are disposed so as to be symmetric with respect to the optical axis of the lens module 300. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltage of the third electrode sector 441-3. In the first embodiment, the voltage of the third electrode sector 441-3 may be controlled, whereby the focus step may be secondarily adjusted.

At the step of controlling the voltages of the second and fourth electrode sectors 441-2 and 441-4 in the randomized sequence (A2), the control unit may control the voltage of the second electrode sector 441-2, and may then control the voltage of the fourth electrode sector 441-4. Alternatively, the control unit may control the voltage of the fourth electrode sector 441-4, and may then control the voltage of the second electrode sector 441-2. That is, voltage may be applied to the second electrode sector 441-2, and then voltage may be applied to the fourth electrode sector 441-4. Alternatively, voltage may be applied to the fourth electrode sector 441-4, and then voltage may be applied to the second electrode sector 441-2. FIG. 10 shows the case in which voltage is applied to the second electrode sector 441-2 and then voltage is applied to the fourth electrode sector 441-4 by way of example.

When the voltage of the second electrode sector 441-2 is controlled and the voltage is applied to the second electrode sector 441-2, the curvature of the interface I may be reduced, whereby the interface I may be inclined to the second electrode sector 441-2 (the front left side) (see FIG. 10(d)). More specifically, an electrowetting phenomenon occurs in the conductive liquid disposed on the first electrode sector 441-1 (the front right side), the second electrode sector 441-2 (the front left side), and the third electrode sector 441-2 (the rear left side), whereby the conductive liquid moves to the first electrode sector 441-1 (the front right side), the second electrode sector 441-2 (the front left side), and the third electrode sector 441-2 (the rear left side) of the cavity 431. Consequently, the curvature of the interface I is further reduced compared to the case in which only the first and second electrode sectors 441-1 and 441-2 are controlled. Furthermore, the inclination of the interface I due to control of the voltages of the first and third electrode sectors 441-1 and 441-3 is offset; however, the interface I is inclined to the second electrode sector 441-2 (the front left side) due to control of the voltage of the second electrode sector 441-2. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltage of the second electrode sector 441-2. Since the second electrode sector 441-2 is biasedly driven, however, the interface I may be inclined to the second electrode sector 441-2 (the front left side). However, the inclination is slight. That is, a problem in which taken video or images are cut or shake due to slight inclination of the optical axis OA of the liquid lens 40 does not occur, since the image sensor is designed so as to be wide while having a sufficient safety rate. In the first embodiment, the voltage of the second electrode sector 441-2 may be controlled, whereby the focus step may be tertiarily adjusted.

When the voltage of the fourth electrode sector 441-4 is controlled and the voltage is applied to the fourth electrode sector 441-4, the curvature of the interface I may be reduced, and the inclination of the interface I may be restored, whereby the optical axis OA of the liquid lens 400 may be aligned with the optical axis of the lens module 300 (see FIG. 10(e)). More specifically, an electrowetting phenomenon occurs in the conductive liquid disposed on the first, second, third, and fourth electrode sectors 441-1, 441-2, 441-3, and 441-4, whereby the conductive liquid moves to the first electrode sector 441-1 of the cavity 431. Consequently, the curvature of the interface I is further reduced compared to the case in which only the first, second, and third electrode sectors 441-1, 441-2, and 441-3 are controlled. In addition, since the inclination of the interface I due to control of the voltage of the second electrode sector 441-2 is offset with the inclination of the interface I due to control of the voltage of the fourth electrode sector 441-4, the inclination of the interface I does not occur. The reason for this is that the second electrode sector 441-2 and the fourth electrode sector 441-4 are disposed so as to be symmetric with respect to the optical axis of the lens module 300. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltage of the fourth electrode sector 441-4. In the first embodiment, the voltage of the fourth electrode sector 441-4 may be controlled, whereby the focus step may be quartically adjusted.

In the first embodiment, the curvature of the interface I when the focus step is quartically adjusted is identical to the curvature of the interface when the focus step is primarily adjusted in the comparative example. Consequently, the liquid lens moving method according to the first embodiment is capable of adjusting the focus step through four times as many subdivisions as the liquid lens moving method according to the comparative example. Furthermore, the first and third electrode sectors 441-1 and 441-3, which are symmetric with respect to the optical axis, are controlled in the state of forming a pair, and the second and fourth electrode sectors 441-2 and 441-4, which are symmetric with respect to the optical axis, are controlled in the state of forming a pair, whereby it is possible to minimize the inclination of the interface I due to individual control of the electrode sectors.

In the first embodiment, the control unit may adjust the multiple of the unit voltage to repeatedly perform the step of controlling the voltages of the first and third electrode sectors 441-1 and 441-3 in the randomized sequence (A1) and the step of controlling the voltages of the second and fourth electrode sectors 441-2 and 441-4 in the randomized sequence (A2). That is, the step of controlling the voltages of the first and third electrode sectors 441-1 and 441-3 in the randomized sequence (A1) and the step of controlling the voltages of the second and fourth electrode sectors 441-2 and 441-4 in the randomized sequence (A2) may be performed using one-multiple unit voltage, and then the step of controlling the voltages of the first and third electrode sectors 441-1 and 441-3 in the randomized sequence (A1) and the step of controlling the voltages of the second and fourth electrode sectors 441-2 and 441-4 in the randomized sequence (A2) may be performed using two-multiple unit voltage. As a result, in the first embodiment, the focus step may be subdivided based on two factors, such as individual control of the first, second, third, and fourth electrode sectors 441-1, 441-2, 441-3, and 441-4 and adjustment of the multiple of the unit voltage, whereby the AF function may be performed.

Hereinafter, a liquid lens moving method according to a second embodiment will be described with reference to FIGS. 11 and 12. The liquid lens moving method according to the second embodiment may be a liquid lens moving method for AF operation.

The liquid lens moving method according to the second embodiment may include a step of simultaneously controlling the voltages of the first and third electrode sectors 441-1 and 441-3 (B1) and a step of simultaneously controlling the voltages of the second and fourth electrode sectors 441-2 and 441-4 (B2). That is, the liquid lens moving method according to the second embodiment is different from the liquid lens moving method according to the first embodiment in that the voltages of the first and third electrode sectors 441-1 and 441-3 are simultaneously controlled at the step of controlling the voltages of the first and third electrode sectors 441-1 and 441-3 in the randomized sequence (A1). In addition, the liquid lens moving method according to the second embodiment is different from the liquid lens moving method according to the first embodiment in that the voltages of the second and fourth electrode sectors 441-2 and 441-4 are simultaneously controlled at the step of controlling the voltages of the second and fourth electrode sectors 441-2 and 441-4 in the randomized sequence (A2). As a result, a problem in which the optical axis OA of the liquid lens 400 is inclined, which occurs at the primary and tertiarily focus-step adjustment step of the first embodiment, does not occur.

At the step of simultaneously controlling the voltages of the first and third electrode sectors 441-1 and 441-3 (B1), the control unit may simultaneously control the voltages of the first and third electrode sectors 441-1 and 441-3. That is, voltages may be simultaneously applied to the first and third electrode sectors 441-1 and 441-3.

In a normal state, no voltages or base voltages are applied to the first, second, third, and fourth electrode sectors 441-1, 441-2, 441-3, and 441-4, whereby the interface I is convex downwards (concave lens; negative power) (see FIG. 12(a)).

When the voltages of the first and third electrode sectors 441-1 and 441-3 are controlled and the voltages are applied to the first and third electrode sectors 441-1 and 441-3, the curvature of the interface I may be reduced (see FIG. 12(b)). More specifically, an electrowetting phenomenon occurs in the conductive liquid disposed on the first electrode sector 441-1 (the front right side) and the third electrode sector 441-3 (the rear left side), whereby the conductive liquid moves to the first and third electrode sectors 441-1 and 441-3 of the cavity 431. Consequently, the curvature of the interface I may be reduced. In addition, since the inclination of the interface I due to control of the voltage of the first electrode sector 441-1 is offset with the inclination of the interface I due to control of the voltage of the third electrode sector 441-3, the inclination of the interface I does not occur. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltages of the first and third electrode sectors 441-1 and 441-3. In the second embodiment, the voltages of the first and third electrode sectors 441-1 and 441-3 may be controlled, whereby the focus step may be primarily adjusted.

At the step of simultaneously controlling the voltages of the second and fourth electrode sectors 441-2 and 441-4 (B2), the control unit may simultaneously control the voltages of the second and fourth electrode sectors 441-2 and 441-4. That is, voltages may be simultaneously applied to the second and fourth electrode sectors 441-2 and 441-4.

When the voltages of the second and fourth electrode sectors 441-2 and 441-4 are controlled and the voltages are applied to the second and fourth electrode sectors 441-2 and 441-4, the curvature of the interface I may be reduced (see FIG. 12(c)). More specifically, an electrowetting phenomenon occurs in the conductive liquid disposed on the first electrode sector 441-1 (the front right side), the second electrode sector 441-2 (the front left side), the third electrode sector 441-3 (the rear left side), and the fourth electrode sector 441-4 (the rear right side), whereby the conductive liquid moves to the first, second, third, and fourth electrode sectors 441-1, 441-2, 441-3, and 441-4 of the cavity 431. Consequently, the curvature of the interface I is further reduced compared to the case in which only the first and third electrode sectors 441-1 and 441-3 are controlled. In addition, since the inclination of the interface I due to control of the voltage of the second electrode sector 441-2 is offset with the inclination of the interface I due to control of the voltage of the fourth electrode sector 441-4, inclination of the interface I does not occur. Variation in the curvature of the interface I is less than in the case in which the voltages of the first, second, third, and fourth electrode sectors 11, 12, 13, and 14 are controlled in a batch fashion, as in the comparative example, since the variation in the curvature of the interface I is generated only by controlling the voltages of the second and fourth electrode sectors 441-2 and 441-4. In the second embodiment, the voltages of the second and fourth electrode sectors 441-2 and 441-4 may be controlled, whereby the focus step may be secondarily adjusted.

In the second embodiment, the curvature of the interface I when the focus step is secondarily adjusted is identical to the curvature of the interface when the focus step is primarily adjusted in the comparative example. Consequently, the liquid lens moving method according to the second embodiment is capable of adjusting the focus step through two times as many subdivisions as the liquid lens moving method according to the comparative example. Furthermore, the first and third electrode sectors 441-1 and 441-3, which are symmetric with respect to the optical axis, and the second and fourth electrode sectors 441-2 and 441-4, which are symmetric with respect to the optical axis, are simultaneously controlled in the state of forming pairs, whereby it is possible to inhibit the inclination of the interface I due to individual control of the electrode sectors. That is, in the second embodiment, the focus step is not subdivided into four steps, unlike the first embodiment; however, inclination of the interface I due to individual control of the electrode sectors does not occur.

In the second embodiment, the control unit may adjust the multiple of the unit voltage to repeatedly perform the step of simultaneously controlling the voltages of the first and third electrode sectors 441-1 and 441-3 (B1) and the step of simultaneously controlling the voltages of the second and fourth electrode sectors 441-2 and 441-4 (B2). That is, the step of simultaneously controlling the voltages of the first and third electrode sectors 441-1 and 441-3 (B1) and the step of simultaneously controlling the voltages of the second and fourth electrode sectors 441-2 and 441-4 (B2) may be performed using one-multiple unit voltage, and then the step of simultaneously controlling the voltages of the first and third electrode sectors 441-1 and 441-3 (B1) and the step of simultaneously controlling the voltages of the second and fourth electrode sectors 441-2 and 441-4 (B2) may be performed using two-multiple unit voltage. As a result, in the second embodiment, the focus step may be subdivided based on two factors, such as individual control of the first, second, third, and fourth electrode sectors 441-1, 441-2, 441-3, and 441-4 and adjustment of the multiple of the unit voltage, whereby the AF function may be performed.

The liquid lens moving method according to each of the first and second embodiments has a technical feature in that the electrode sectors are individually controlled to subdivide the focus step. As shown in FIG. 15, the individual-type electrode driving may have more subdivided focus step than the batch-type electrode driving according to the comparative example. Consequently, the optical power may be subdivided, whereby accurate AF operation may be performed.

Furthermore, the disclosure is technically characterized in that the electrode sectors are divided into electrode sector pairs, which are disposed so as to be symmetric with respect to the optical axis, and the voltages of the electrode sector pairs are sequentially controlled (the voltages are controlled in a randomized sequence or simultaneously for each of the electrode sector pairs). In the case in which the first electrode 441 is divided into four or more sectors, the electrode sector pairs must be controlled in the sequence in which the electrode sectors are symmetric with respect to the optical axis or in the sequence in which the electrode sectors are symmetric with respect to the optical axis if possible when the voltages of the electrode sector pairs are sequentially controlled. As a result, it is possible to minimize the inclination of the interface I due to the individual electrode driving.

The scope of rights of each of the first and second embodiments is not limited to the case in which the first electrode 441 is divided into four sectors but includes the case in which the first electrode 441 is divided into n sectors (n being a natural number of 4 or more), as long as the above technical idea is included. That is, the first, second, third, and fourth electrode sectors 441-1, 441-2, 441-3, and 441-4 of each of the first and second embodiments may not be disposed so as to neighbor each other, or other electrode sectors may be disposed between the first, second, third, and fourth electrode sectors 441-1, 441-2, 441-3, and 441-4, which are spaced apart from each other.

The case in which the first electrode is divided into 8 sectors will be described with reference to FIGS. 13(*a*)-13(*h*). The first electrode of the liquid lens of FIGS. 13(*a*)-13(*h*) may be divided into first, second, third, fourth, fifth, sixth, seventh, and eighth electrode sectors 21, 22, 23, 24, 25, 26, 27, and 28. When time sequentially elapses from (a) to (h), as shown in FIGS. 13(*a*)-13(*h*), voltages may be sequentially applied to the first electrode sector 21, the fifth electrode sector 25, the third electrode sector 23, the seventh electrode sector 27, the second electrode sector 22, the sixth electrode sector 26, the fourth electrode sector 24, and the eighth electrode sector 28 in that order. In this case, the first electrode sector 21 of the first electrode, which is divided into 8 sectors, may correspond to the first electrode sector 441-1 of the first embodiment, the fifth electrode sector 25 may correspond to the third electrode sector 441-3 of the first embodiment, the third electrode sector 23 may correspond to the second electrode sector 441-2 of the first embodiment, and the seventh electrode sector 27 may correspond to the fourth electrode sector 441-4 of the first embodiment. Consequently, the operation of the liquid lens including the first electrode divided into 8 sectors as shown in FIGS. 13(*a*)-13(*h*) falls within the scope of rights of the first embodiment.

In addition, the case in which the first electrode is divided into 9 sectors will be described with reference to FIGS. 14(*a*)-14(*i*). The first electrode of the liquid lens of FIGS. 14(*a*)-14(*i*) may be divided into first, second, third, fourth, fifth, sixth, seventh, eighth, and ninth electrode sectors 31, 32, 33, 34, 35, 36, 37, 38, and 39. When time sequentially elapses from (a) to (i), as shown in FIGS. 14(*a*)-14(*i*), voltages may be sequentially applied to the first electrode sector 31, the fifth electrode sector 35, the third electrode sector 33, the seventh electrode sector 37, the second electrode sector 32, the sixth electrode sector 36, the eighth electrode sector 38, the fourth electrode sector 34, and the ninth electrode sector 39 in that order. In this case, the first electrode sector 31 of the first electrode, which is divided into 9 sectors, may correspond to the first electrode sector 441-1 of the first embodiment, the fifth electrode sector 35 may correspond to the third electrode sector 441-3 of the first embodiment, the third electrode sector 33 may correspond to the second electrode sector 441-2 of the first embodiment, and the seventh electrode sector 37 may correspond to the fourth electrode sector 441-4 of the first embodiment. Consequently, the operation of the liquid lens including the first electrode divided into 9 sectors as shown in FIGS. 14(a)-14(i) falls within the scope of rights of the first embodiment.

Figure 16:
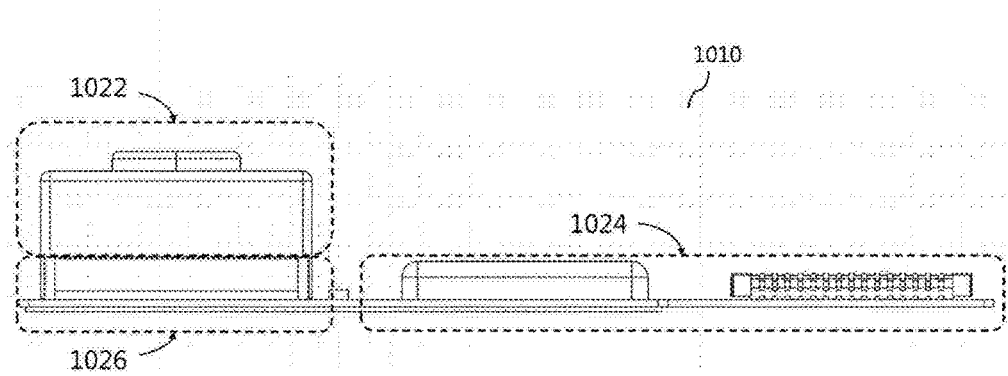
FIG. 16 illustrates an example of a camera module according to an embodiment.

FIG. 16 illustrates an example of a camera module according to an embodiment.

Referring to FIG. 16, the camera module 1010 may include a lens assembly 1022 including a liquid lens and a plurality of lenses, a control circuit 1024, and an image sensor 1026.

The liquid lens may include a conductive liquid, a nonconductive liquid, a first plate, and an electrode unit. The first plate may include a cavity for receiving the conductive liquid and the nonconductive liquid. An external power source may be connected to the electrode unit, which changes the interface between the conductive liquid and the nonconductive liquid when voltage is applied to the electrode unit. The liquid lens may further include an insulation layer disposed at the electrode unit for inhibiting contact between an electrode and the nonconductive liquid.

The camera module having the liquid lens applied thereto may include a control unit for controlling the voltage that is applied to the electrode unit. The electrode unit may include a first electrode and a second electrode. Each of the first electrode and the second electrode may include one or more electrode sectors. The first electrode and the second electrode may electromagnetically interact with each other to change the interface between the conductive liquid and the nonconductive liquid.

The lens assembly 1022 may include a plurality of lenses. The lens assembly 1022 may be constituted by a plurality of lenses including a liquid lens, and the focal distance of the liquid lens may be adjusted in response to the drive voltages applied to the first electrode and the second electrode. The camera module 1010 may further include a control circuit 1024 for supplying drive voltage to the liquid lens. The first electrode may be an individual electrode. The second electrode may be a conductive metal plate, and may be a common electrode.

The camera module 1010 may include a lens assembly 1022 including a plurality of circuits 1024 and 1026 disposed on a single printed circuit board (PCB) and a plurality of lenses. However, this is merely an example, and does not limit the scope of the disclosure. The construction of the control circuit 1024 may be designed differently depending on the specifications required by an optical device. In particular, the control circuit 1024 may be realized as a single chip in order to reduce the magnitude of the voltage that is applied to the lens assembly 1022. As a result, the size of a camera device mounted in a portable device may be further reduced.

Figure 17:
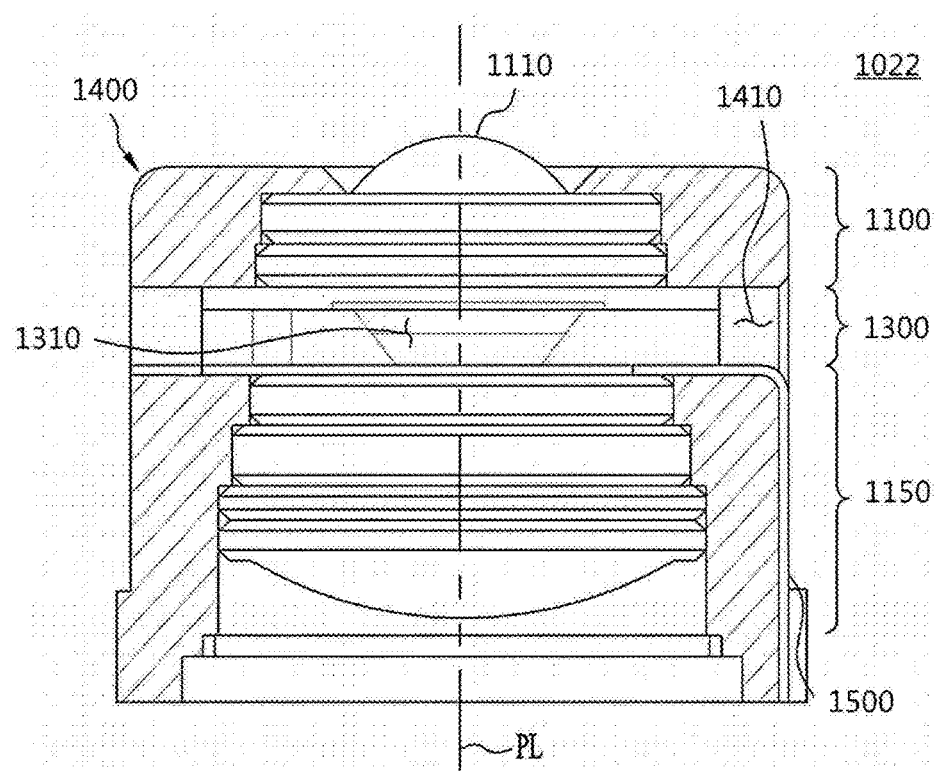
FIG. 17 illustrates an example of a lens assembly included in the camera module.

FIG. 17 illustrates an example of the lens assembly 1022 included in the camera module 1010.

The camera module 1010 may be included in an optical device. The optical device may include a housing, in which at least one of a camera module, a display unit, a communication module, a memory, or a battery is mounted.

Referring to FIG. 17, the lens assembly 1022 may include a first lens unit 1100, a second lens unit 1150, a liquid lens 1300, a holder 1400, and a connection unit 1500.

One or more connection units 1500 may be provided. For example, in the case in which one connection unit is provided, a portion of the connection unit may be disposed at the upper portion or the lower portion of the liquid lens 1300 so as to be connected to the liquid lens 1300. In the case in which two connection units are provided, a first connection unit, connected to the upper portion of the liquid lens 1300, and a second connection unit, connected to the lower portion of the liquid lens 1300, may be provided. One end of the connection unit may be disposed under the lens assembly 1022, and may be connected to the board on which the image sensor 1026 is mounted. The structure of the lens assembly 1022 that is shown is merely an example, and the structure of the lens assembly 1022 may be changed depending on the specifications required by the optical device. For example, in the example that is shown, the liquid lens 1300 is located between the first lens unit 1100 and the second lens unit 1150; however, in another example, the first lens unit or the second lens unit may be omitted. In addition, the liquid lens 1300 may be located above (in front of) the first lens unit 1100, or the liquid lens 1300 may be located under the second lens unit 1150. The liquid lens 1300 includes a cavity defined by an opening region. In another example, the liquid lens 1300 may be disposed such that the cavity 1310 is inclined in the opposite direction. This may mean that the opening area of the cavity 1310 in the direction in which light is incident is smaller than the opening area of the cavity 1310 in the opposite direction, unlike FIG. 17. In the case in which the liquid lens 1300 is disposed such that the cavity 1310 is inclined in the opposite direction, the disposition of the components of the liquid lens, such as the electrodes and the liquids, may be entirely or partially changed depending on the direction in which the cavity 1310 is inclined. Alternatively, only the direction in which the cavity 1310 is inclined may be changed, but the disposition of the other components may not be changed.

The first lens unit 1100 is a component which is disposed in front of the lens assembly 1022 and on which light is incident from outside the lens assembly 1022. The first lens unit 1100 may be constituted by at least one lens. Alternatively, two or more lenses may be aligned along the central axis PL to constitute an optical system.

The first lens unit 1100 and the second lens unit 1150 may be mounted in the holder 1400. A through-hole may be formed in the holder 1400, and the first lens unit 1100 and the second lens unit 1150 may be disposed in the through-hole. In addition, the liquid lens 1300 may be inserted into a space between the first lens unit 1100 and the second lens unit 1150 in the holder 1400.

Meanwhile, the first lens unit 1100 may include an exposure lens 1110. The exposure lens 1110 is a lens that protrudes out of the holder 1400 and thus is exposed to the outside. Since the exposure lens 1110 is exposed to the outside, the surface of the lens may be damaged. In the case in which the surface of the lens is damaged, the quality of the images taken by the camera module may be deteriorated. In order to inhibit damage to the surface of the exposure lens 1110, a cover glass may be disposed, a coating layer may be formed, or the exposure lens 1110 may be made of a wear-resistant material for inhibiting damage to the surface of the exposure lens.

The second lens unit 1150 may be disposed at the rear of the first lens unit 1100 and the liquid lens 1300. The light incident on the first lens unit 1100 from the outside may be transmitted through the liquid lens 1300, and may then be incident on the second lens unit 1150. The second lens unit 1150 may be disposed in the through-hole formed in the holder 1400 in the state of being spaced apart from the first lens unit 1100.

Meanwhile, the second lens unit 1150 may be constituted by at least one lens. Alternatively, two or more lenses may be aligned along the central axis PL to constitute an optical system.

The liquid lens 1300 may be disposed between the first lens unit 1100 and the second lens unit 1150, and may be inserted into an insertion port 1410 formed in the holder 1400. In the same manner as the first lens unit 1100 and the second lens unit 1150, the liquid lens 1300 may also be aligned along the central axis PL. A single insertion port 1410 or at least two insertion ports 1410 may be formed in the lateral surface of the holder 1400. The liquid lens may be disposed in the insertion port 1410. The liquid lens may be disposed so as to protrude out of the insertion port 1410.

The liquid lens 1300 may include a cavity 1310. The cavity 1310 may be a region, through which the light that has passed through the first lens unit 1110 is transmitted, and at least a portion of the cavity 1310 may receive a liquid. For example, two kinds of liquid, i.e. a conductive liquid and a nonconductive liquid (or an insulating liquid), may be received in the cavity 1310. The conductive liquid and the nonconductive liquid may not be mixed with each other, and an interface may be formed between the conductive liquid and the nonconductive liquid. The interface between the conductive liquid and the nonconductive liquid may be deformed by the drive voltage that is applied through the connection unit 1500, whereby the curvature and/or the focal distance of the liquid lens 1300 may be changed. In the case in which the deformation of the interface and the change of the curvature are controlled, the liquid lens 1300 and the lens assembly 1022 and the optical device including the same may perform an auto-focusing (AF) function and a handshake compensation or optical image stabilization (OIS) function.

Figure 18:
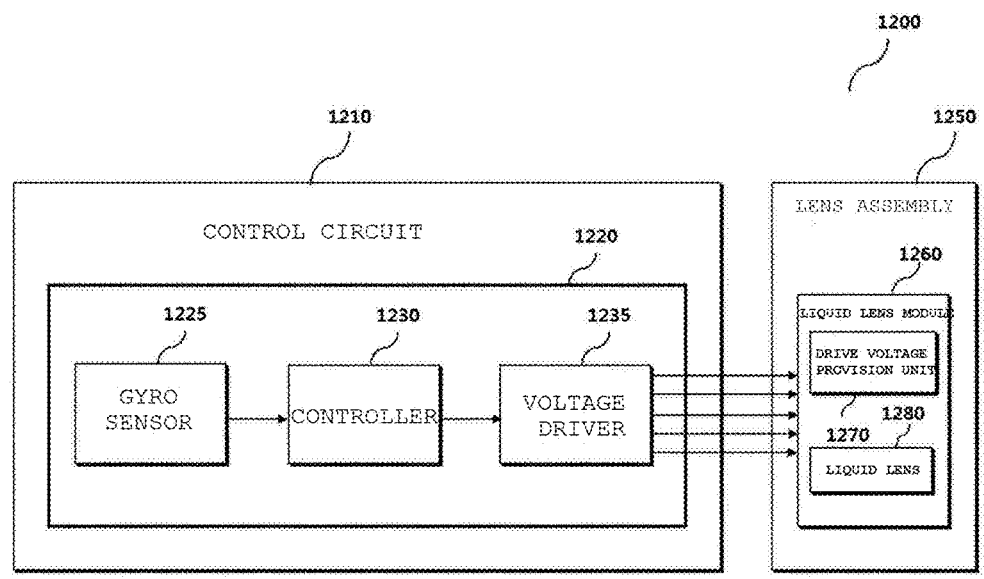
FIG. 18 is a block diagram schematically showing the camera module shown in FIG. 16.

FIG. 18 is a block diagram schematically showing the camera module shown in FIG. 16.

Referring to FIG. 18, a control circuit 1210 and a lens assembly 1250 included in a camera module 1200 are shown. The control circuit 1210 and the lens assembly 1250 may correspond to the control circuit 1024 and the lens assembly 1022 of FIG. 16, respectively.

The control circuit 1210 may include a control unit 1220.

The control unit 1220 may be a component for performing an AF function and an OIS function, and may control a liquid lens module 1260 included in the lens assembly 1250 in response to a user's request or a sensing result (for example, a motion signal of a gyro sensor 1225).

The control unit 1220 may include a controller 1230 and a voltage driver 1235. The gyro sensor 1225 may be an independent component that is not included in the control unit 1220, or the control unit 1220 may further include the gyro sensor 1225.

The gyro sensor 1225 may sense the angular velocities of motions in the yaw-axis direction and the pitch-axis direction in order to compensate for upward-downward and leftward-rightward handshake of the optical device 1200. The gyro sensor 1225 may generate a motion signal corresponding to the sensed angular velocities, and may provide the same to the controller 1230.

In order to realize the OIS function, the controller 1230 may remove a high-frequency noise component from the motion signal using a low pass filter (LPF) to extract only a desired band, may calculate the amount of handshake using the motion signal from which noise has been removed, and may calculate drive voltage corresponding to the desired shape of a liquid lens 1280 of the liquid lens module 1260 to compensate for the calculated amount of handshake.

The controller 1230 may receive information for the AF function (i.e. information about the distance from an object) from the interior of the optical device or the camera module 1200 (for example, an image sensor) or the exterior of the optical device or the camera module 1200 (for example, a distance sensor or an application processor), and may calculate drive voltage corresponding to the desired shape of the liquid lens 1280 based on the focal distance for focusing the object through the distance information.

The controller 1230 may store a drive voltage table in which drive voltage is mapped with drive voltage code necessary for the voltage driver 1235 to generate the drive voltage, and may acquire drive voltage code corresponding to the calculated drive voltage with reference to the drive voltage table.

The voltage driver 1235 may generate analog-type drive voltage corresponding to the drive voltage code based on the digital-type drive voltage code, provided from the controller 1230, and may provide the same to the lens assembly 1250.

The voltage driver 1235 may include a voltage booster for receiving supply voltage (for example, voltage supplied from a separate power supply circuit) and increasing the level of the voltage, a voltage stabilizer for stabilizing the output of the voltage booster, and a switching unit for selectively supplying the output of the voltage booster to respective terminals of the liquid lens 1280.

Here, the switching unit may include a circuit called an H bridge. The high voltage output from the voltage booster is applied to the switching unit as power supply voltage. The switching unit may selectively supply the power supply voltage applied thereto and ground voltage to both ends of the liquid lens 1280. Here, for operation, the liquid lens 1280 may include a first electrode including four electrode sectors and a second electrode including a single electrode sector. The two ends of the liquid lens 1280 may be the first electrode and the second electrode. In addition, the two ends of the liquid lens 1280 may be one of the four electrode sectors of the first electrode and the single electrode sector of the second electrode.

Pulse-type voltage having a predetermined width may be applied to each electrode sector of the liquid lens 1280. The drive voltage applied to the liquid lens 1280 is the difference between the voltages applied to the first electrode and the second electrode. Here, the voltage applied to the first electrode may be defined as individual voltage, and the voltage applied to each electrode sensor of the second electrode may be defined as common voltage.

That is, in order to control the drive voltage that is applied to the liquid lens 1280 according to the digital-type drive voltage code, provided from the controller 1230, the voltage booster controls the level of the voltage that is increased, and the switching unit controls the phase of the pulse voltage applied to the common electrode and the individual electrode, whereby the voltage driver 1235 generates analog-type drive voltage corresponding to the drive voltage code.

That is, the control unit 1220 may control the voltages applied to the first electrode and the second electrode.

The control circuit 1210 may further include a connector (not shown) for performing a communication or interface function of the control circuit 1210. For example, the connector may perform communication protocol conversion for communication between a control circuit 1210 using an inter-integrated circuit ($I^2C$) communication scheme and a lens assembly 1250 using a mobile industry processor interface (MIPI) communication scheme.

In addition, the connector may receive power from the outside (for example, a battery), and may supply the power necessary to operate the control unit 1220 and the lens assembly 1250.

The lens assembly 1250 may include a liquid lens module 1260, and the liquid lens module 1260 may include a drive voltage provision unit 1270 and a liquid lens 1280.

The drive voltage provision unit 1270 may receive drive voltage (i.e. analog voltage applied between one of the four individual electrodes and the single common electrode) from the voltage driver 1235, and may provide the drive voltage to the liquid lens 1280. The drive voltage provision unit 1270 may include a voltage adjustment circuit or a noise removal circuit for compensating for loss due to terminal connection between the control circuit 1210 and the lens assembly 1250, or may bypass the output voltage.

The drive voltage provision unit 1270 may be disposed on a flexible printed circuit board (FPCB) or a first board constituting at least a portion of the connection unit 1500 of FIG. 17. However, the disclosure is not limited thereto. The connection unit 1500 may include the drive voltage provision unit 1270.

The interface between the conductive liquid and the nonconductive liquid may be deformed depending on the drive voltage, whereby the liquid lens 1280 may perform the AF function or the OIS function.

FIGS. 19(*a*) and 19(*b*) illustrate a liquid lens, and the interface of which is adjusted in response to drive voltage. Specifically, FIG. 19(*a*) illustrates a liquid lens 1028 included in the lens assembly 1250 (see FIG. 18), and FIG. 19(*b*) illustrates an equivalent circuit of the liquid lens 1028. Here, the liquid lens 1028 means the liquid lens 1280 of FIG. 18.

Referring first to FIG. 19(*a*), drive voltage may be applied to the liquid lens 1028, the interface of which is adjusted in response to the drive voltage, through a plurality of electrode sectors L1, L2, L3, and L4 disposed in four different directions while having the same angular distance therebetween to constitute a first electrode and an electrode sector C0 of a second electrode. When drive voltage is applied through the electrode sectors L1, L2, L3, and L4 constituting the first electrode and the electrode sector C0 constituting the second electrode, the interface between the conductive liquid and the nonconductive liquid in the cavity 1310 may be deformed. The degree and shape of deformation of the interface between the conductive liquid and the nonconductive liquid may be controlled by the controller 1230 in order to realize the AF function or the OIS function.

In addition, referring to FIG. 19(*b*), the lens 1028 may include a plurality of capacitors 1030, to one side of each of which voltage is applied from a corresponding one of the different electrode sectors L1, L2, L3, and L4 of the first electrode and to the other side of each of which voltage is applied from the electrode sector C0 of the second electrode.

In this specification, the case in which the number of electrode sectors is 4 is described by way of example. However, the disclosure is not limited thereto.

FIG. 20 is a view illustrating an embodiment of voltage supplied to both ends of the liquid lens.

Referring to FIG. 20, pulse-type voltages, each having a predetermined width, may be applied to the respective electrode sectors C0 and L1 to L4 of the liquid lens 1280, and the difference between the voltage of each of the electrode sectors L1 to L4 of the first electrode and the voltage of the electrode sector C0 of the second electrode becomes drive voltage.

The voltage driver 1235 may control drive voltage corresponding to each individual electrode by controlling the phases of the pulse voltages applied to the common electrode sector and the individual electrode sectors.

In FIG. 20, the voltage driver 1235 may shift the phase of pulse voltage according to an operation clock provided from the outside. First pulse voltage A and second pulse voltage B, which are applied to the individual electrode sector L1, are shown. The second pulse voltage B is voltage obtained by delaying the first pulse voltage A by the minimum phase.

It can be seen that drive voltage 2 when the second pulse voltage B is applied to the individual electrode sector L1 is higher than drive voltage 1 when the first pulse voltage A is applied to the individual electrode sector L1. Here, the root mean square (RMS) value of the drive voltage directly contributes to control of the interface of the liquid lens 1280.

The minimum phase is set by the frequency of the operation clock provided to the voltage driver 1235. The minimum phase may determine the resolution of the output voltage of the voltage driver 1235. The smaller the minimum phase, the higher the resolution of the output voltage of the voltage driver 1235.

In order to double the resolution of the output voltage of the voltage driver 1235, however, an operation clock having a doubled frequency must be provided to the voltage driver 1235. Consequently, a high-performance clock generator corresponding thereto is required. This causes a considerable cost increase and power consumption in terms of the overall system. For this reason, a plan for increasing the resolution of the output voltage of the voltage driver 1235 without a high-performance clock generator is required.

Figure 21:
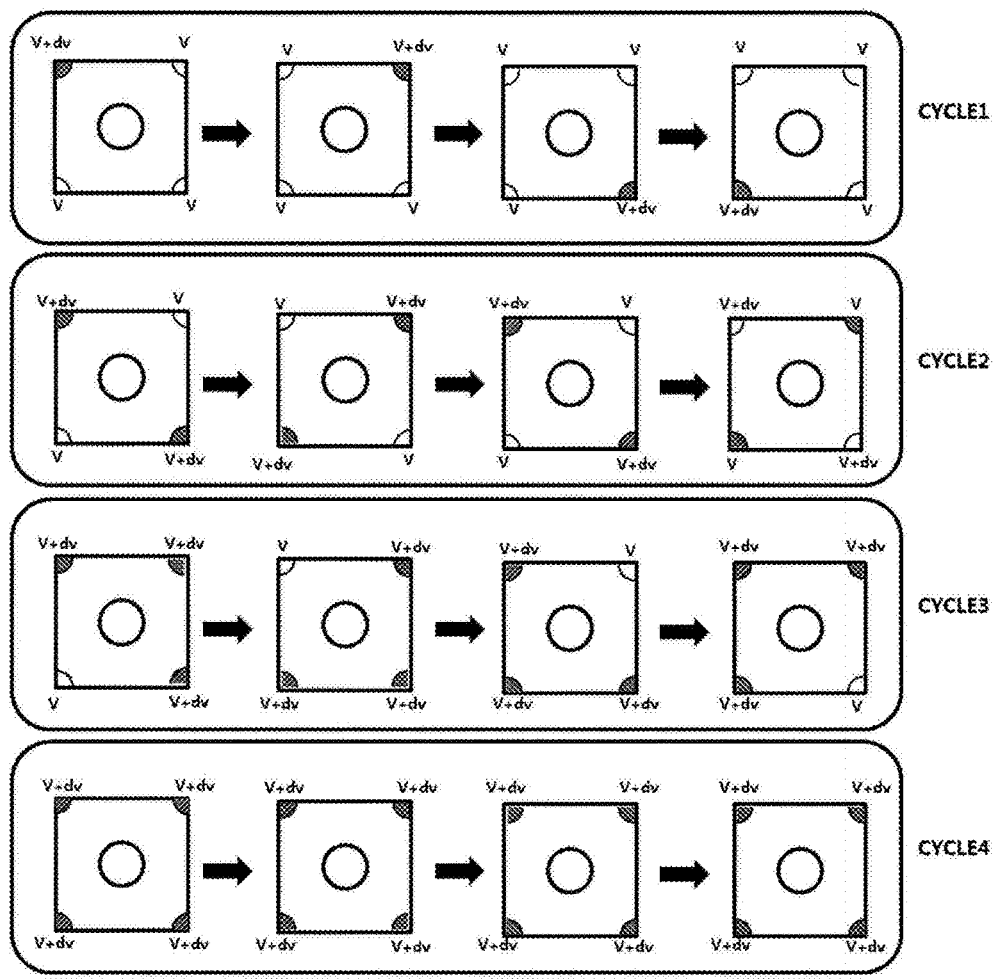
FIG. 21 is a view illustrating a method of applying voltage to a liquid lens according to an embodiment.

FIG. 21 is a view illustrating a method of applying voltage to a liquid lens according to an embodiment.

Referring to FIG. 21, a drive voltage application method will be described as being performed in order to perform an auto-focusing function in FIG. 21 and subsequent figures. However, the disclosure is not limited thereto, and the same technical idea may be applied even when an OIS function is provided. In addition, the level and timing of the voltage applied to the liquid lens described in FIG. 21 and subsequent figures may be controlled by drive voltage code generated by the controller 1230.

Four liquid lenses are shown for each of the cycles CYCLE1 to CYCLE4. An upper left electrode sector of a first electrode of one liquid lens is defined as a first electrode sector, and electrode sectors sequentially located from the first electrode sector about the center of the liquid lens (or the optical axis or the circumference) in the clockwise direction are defined as a second electrode sector, a third electrode sector, and a fourth electrode sector.

In addition, each of first to fourth drive electrodes means a pair of a corresponding individual electrode sector of the first to fourth electrode sectors and the common electrode sector of the second electrode, and drive voltages that are applied to the first to fourth drive electrodes are defined as first to fourth drive voltages.

The first to fourth drive voltages correspond to the differences between the voltages applied to the first to fourth electrode sectors and the voltage applied to the second electrode. The first to fourth drive voltages may mean the average value or RMS value of the voltage differences within a cycle.

In addition, unit cycles for deforming the interface of the liquid lens may be defined, and the first to fourth cycles CYCLE1 to CYCLE4 shown in FIG. 21 correspond thereto.

Time corresponding to each unit cycle may be set in consideration of auto-focusing response time, i.e. the time taken for the liquid lens to be deformed into a desired interface after the drive voltage is applied. Although the auto-focusing response time is changed depending on the specifications of the liquid lens, the auto-focusing response time may be about 50 ms. Consequently, the unit cycle may be set in consideration of the auto-focusing response time and the number of subcycles.

The controller 1230 of FIG. 18 calculates drive voltage and transmits drive voltage code to the voltage driver 1235. At this time, the drive voltage code may be transmitted through a bidirectional serial data port SDA and a clock port SCL in the I$^2$C scheme, and a maximum of 1 MHz may be supported.

The voltage driver 1235 generates drive voltage corresponding to the drive voltage code based on the drive voltage code received from the controller 1230. The drive voltage may include first to fourth drive voltages, which mean both-end voltages applied to the capacitors 1030 shown in FIGS. 19(*a*)-19(*b*). For application of the drive voltage, the voltages of the first to fourth electrode sectors of the first electrode and the voltage of the second electrode may be substantially generated.

Each of the first to fourth drive voltages has the maximum output voltage, the minimum output voltage, and uniform unit voltage depending on the structure of the voltage driver 1235. The maximum output voltage and the minimum output voltage are the maximum and minimum voltages that can be output by the voltage driver 1235, and the unit voltage is the minimum voltage increment for increasing or decreasing each of the first to fourth drive voltages. The unit voltage may be set by the minimum phase, determined by the frequency of the operation clock, when the voltage driver 1235 adjusts output voltage in a scheme of shifting the phase of pulse voltage according to the operation clock.

However, each of the first to fourth drive voltages is not necessarily increased or decreased by 1V. For example, each of the first to fourth drive voltages may be increased or decreased by 10V.

For example, when the maximum output voltage is 70V, the minimum output voltage is 41V, and the unit voltage is 1V, each of the first to fourth drive voltages may have 30 voltage values within the range of 41V to 70V.

That is, on the assumption that the same drive voltage is applied to the first to fourth drive electrodes for an auto-focusing function, 30-step auto-focusing resolution may be realized.

In this case, k-th (k being an integer between 1 and N; N being an integer of 2 or more) drive voltage Vk is expressed by Equation 1 below. Here, the k-th drive voltage is an arbitrary drive voltage when the minimum output voltage is first drive voltage and the maximum output voltage is N-th drive voltage.

$$Vk = Vi + dv * k \quad \text{[Equation 1]}$$

Where Vi indicates the minimum output voltage, and dv indicates the unit voltage.

When the same drive voltage is applied to the first to fourth drive electrodes within a uniform output voltage range (the range between the maximum output voltage and the minimum output voltage), therefore, the unit voltage for the drive voltage becomes equal to the unit voltage of the voltage driver 1235, and auto-focusing resolution may depend on the unit voltage of the voltage driver 1235. Since the auto-focusing resolution is the criterion based on which the extent to which the auto-focusing function is finely adjusted is determined, the auto-focusing resolution is the most important factor that affects the performance of the auto-focusing function.

Hereinafter, a drive voltage application method capable of increasing the auto-focusing resolution within a uniform output voltage range will be described.

Although not shown in FIG. 21, it is assumed that each of the individual voltages applied to the first to fourth electrode sectors is V (V being an arbitrary voltage within the output voltage range; hereinafter, referred to as "initial voltage") in an initial cycle before the first cycle CYCLE.

As shown in FIG. 21, each of the cycles CYCLE1 to CYCLE4 may be divided into a total of 4 subcycles. The durations of the subcycles may be equal to each other, or may be different from each other. In an embodiment in which the durations of the subcycles are equal to each other, when each of the cycles CYCLE1 to CYCLE4 has a durations of 50 ms, the durations of each subcycle may be 12.5 ms. The voltage that is applied to each drive electrode in a subcycle may be maintained. In another embodiment, the voltage that is applied to each drive electrode in a subcycle may be changed. For example, in the second cycle CYCLE2, the first and second subcycles may constitute a single subcycle, and the third and fourth subcycles may constitute a single subcycle. In this case, the time of each subcycle may be 25 ms.

(V+dv, V, V, V) may be applied in the first subcycle of the first cycle CYCLE1, (V, V+dv, V, V) may be applied in the second subcycle thereof, (V, V, V+dv, V) may be applied in the third subcycle thereof, and (V, V, V, V+dv) may be applied in the fourth subcycle thereof. Here, a, b, c, and d of (a, b, c, d) mean first to fourth drive voltages, respectively.

That is, in the first subcycle of the first cycle CYCLE1, one of the first to fourth drive voltages may be applied as voltage V+dv (hereinafter, referred to as "second voltage") obtained by increasing the initial voltage by the unit voltage, and each of the other drive voltages may be applied as the initial voltage V (hereinafter, referred to as "first voltage"). In subsequent subcycles, the position to which the second voltage is applied may be sequentially changed in the clockwise direction. Here, the drive voltage to which the second voltage is applied is shown as shaded. The clockwise direction is merely an embodiment. The counterclockwise direction or the zigzag direction may also be possible.

However, the positions to which the second voltage is applied in the respective subcycles must be set so as to be different from each other. The reason for this is that, if the second voltage is continuously applied to one position, the interface of the liquid lens may be distorted.

The drive voltage applied to one drive electrode in one cycle means the average of the drive voltages applied in four subcycles.

Consequently, the first to fourth drive voltages applied in the first cycle CYCLE1 correspond to (4V+dv)/4=V+dv/4.

(V+dv, V, V+dv, V) may be applied in the first subcycle of the second cycle CYCLE2, (V, V+dv, V, V+dv) may be applied in the second subcycle thereof, (V+dv, V, V+dv, V) may be applied in the third subcycle thereof, and (V, V+dv, V, V+dv) may be applied in the fourth subcycle thereof.

That is, in the first subcycle of the second cycle CYCLE2, two of the first to fourth drive voltages may be applied as the second voltage, and the other drive voltages may be applied as the first voltage. In the second subcycle, the second voltage may be applied to the positions to which the first voltage was applied, and the first voltage may be applied to the positions to which the second voltage was applied. In subsequent subcycles, the drive voltage application method in the first subcycle and the second subcycle may be repeated. In the same manner as the subcycles of the first cycle CYCLE1, voltage application positions in the second cycle CYCLE2 may also be changed in the clockwise direction or the counterclockwise direction.

As shown in FIG. 21, the drive voltages that are applied to diagonally opposite positions must be set so as to be equal to each other, and the positions to which the second voltage is applied in adjacent subcycles must be set so as to be different from each other. In this case, the interface of the liquid lens is inhibited from being distorted. In addition, although not shown in the figure, the first voltage may be applied to two adjacent ones of the four electrode sectors, the second voltage may be applied to the other electrode sectors, and voltage application may be controlled in the clockwise direction or the counterclockwise direction.

The first to fourth drive voltages applied in the second cycle CYCLE2 correspond to (4V+2 dv)/4=V+dv/2.

(V+dv, V+dv, V+dv, V) may be applied in the first subcycle of the third cycle CYCLE3, (V, V+dv, V+dv, V+dv) may be applied in the second subcycle thereof, (V+dv, V, V+dv, V+dv) may be applied in the third subcycle thereof, and (V+dv, V+dv, V, V+dv) may be applied in the fourth subcycle thereof.

That is, in the first subcycle of the third cycle CYCLE3, three of the first to fourth drive voltages may be applied as the second voltage, and the other drive voltage may be applied as the first voltage. In subsequent subcycles, the position to which the first voltage is applied may be sequentially changed in the clockwise direction. Here, the clockwise direction is merely an embodiment. The counterclockwise direction or the zigzag direction may also be possible.

However, the positions to which the first voltage is applied in the respective subcycles must be set so as to be different from each other. The reason for this is that, if the first voltage is continuously applied to one position, the interface of the liquid lens may be distorted.

Consequently, the first to fourth drive voltages applied in the third cycle CYCLE3 correspond to (4V+3 dv)/4=V+3 dv/4.

(V+dv, V+dv, V+dv, V+dv) may be applied in the first subcycle of the fourth cycle CYCLE4, (V+dv, V+dv, V+dv, V+dv) may be applied in the second subcycle thereof, (V+dv, V+dv, V+dv, V+dv) may be applied in the third subcycle thereof, and (V+dv, V+dv, V+dv, V+dv) may be applied in the fourth subcycle thereof.

That is, in the first to fourth subcycles of the fourth cycle CYCLE4, all of the first to fourth drive voltages may be applied as the second voltage.

Consequently, the first to fourth drive voltages applied in the fourth cycle CYCLE4 correspond to (4V+4 dv)/4=V+dv.

At this time, the sum of the first to fourth drive voltages applied in the subcycles included in the same cycle may be maintained uniform. The reason for this is that, only in the case in which the sum of the first to fourth drive voltages applied in one cycle is maintained uniform, a specific focal distance can be maintained in the cycle.

In the drive voltage application method according to the embodiment, the k-th individual voltage V'k is expressed by Equation 2 below.

$$V'k = Vi + dv/4 * k \quad \text{[Equation 2]}$$

Where Vi indicates the minimum output voltage, and dv indicates the unit voltage.

After a cycle in which the first to fourth drive voltages are not applied as the same drive voltage and all of the first to fourth drive voltages are set to the first voltage within a uniform output voltage range, therefore, a cycle in which only one of the first to fourth drive voltages is set to the second voltage and the drive voltage set as the second voltage is rotated, a cycle in which only two of the first to fourth drive voltages are set to the second voltage and the drive voltages set as the second voltage are rotated, and a cycle in which only three of the first to fourth drive voltages are set to the second voltage and the drive voltages set as the second voltage are rotated, may be further inserted to change the unit voltage, based on which the auto-focusing resolution is determined, from dv to dv/4.

That is, that the unit voltage is reduced to ¼ may mean that the auto-focusing resolution is increased 4 times, whereby the performance of the auto-focusing function may be remarkably improved.

For example, the maximum output voltage may be 70V, the minimum output voltage may be 41V, and the unit voltage may be 0.25V, whereby each of the first to fourth drive voltages may have 120 voltage values within the range of 41V to 70V.

In another embodiment, only some of the cycles shown in FIG. 20 may be used. For example, in the case in which only the voltage application scheme according to the second cycle CYCLE2, among the first to third cycles CYCLE1 to CYCLE3, is used, the resolution of the auto-focusing function may be increased twice.

Figure 22:
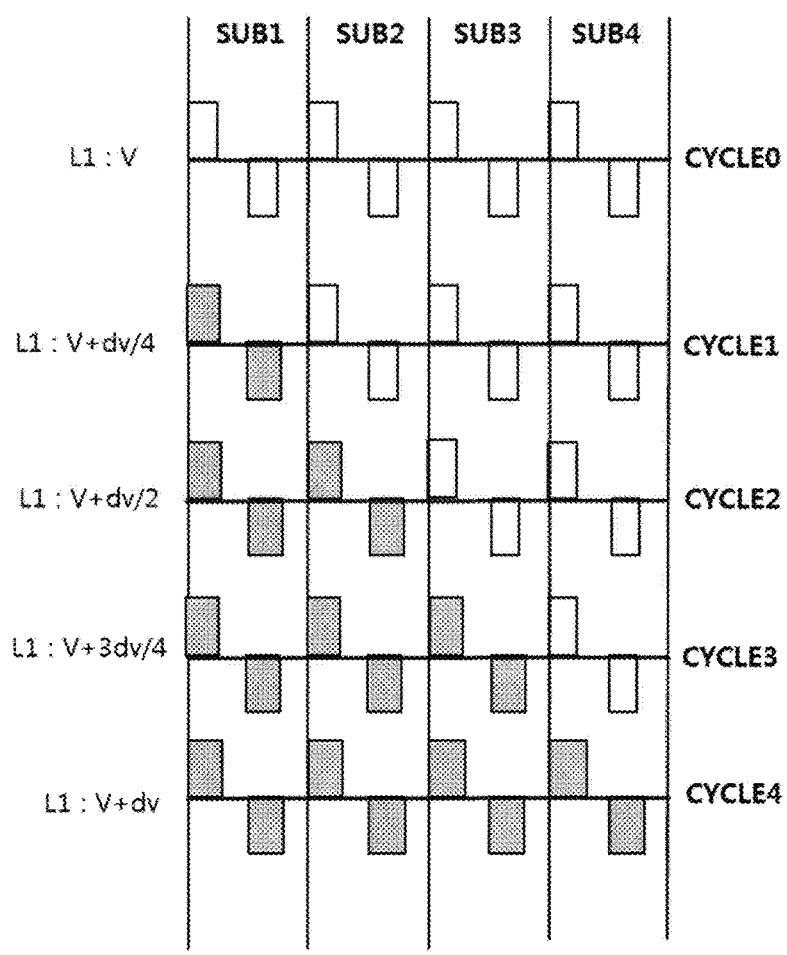
FIG. 22 is a view illustrating the method of applying voltage to the liquid lens according to the embodiment shown in FIG. 21 in the aspect of one drive electrode.

FIG. 22 is a view illustrating the method of applying voltage to the liquid lens according to the embodiment shown in FIG. 21 in the aspect of one drive electrode.

Referring to FIG. 22, the drive voltage that is applied to the drive electrode corresponding to the first electrode sector L1 in each of the cycles CYCLE0 to CYCLE4 is shown.

The drive voltage shown in white means a period during which the first voltage V is applied, and the drive voltage shaded in gray means a period during which the second voltage V+dv, which is obtained by shifting the voltage applied to the first electrode sector L1 by the minimum phase and thus is higher than the first voltage V by the unit voltage, is applied.

Each of the cycles CYCLE0 to CYCLE4 may be divided into four subcycles SUB1 to SUB4.

In the initial cycle CYCLE0, the first voltage V may be applied to the first drive electrode over the subcycles SUB1 to SUB4. Consequently, the first drive voltage applied to the first drive electrode in the initial cycle CYCLE0 corresponds to V.

In the first cycle CYCLE1, the second voltage V+dv may be applied to the first drive electrode in one subcycle SUB1, among the subcycles SUB1 to SUB4, and the first voltage V may be applied in the other subcycles SUB2 to SUB4. Consequently, the first drive voltage applied to the first drive electrode in the first cycle CYCLE1 corresponds to V+dv/4.

In the second cycle CYCLE2, the second voltage V+dv may be applied to the first drive electrode in two subcycles SUB1 and SUB2, among the subcycles SUB1 to SUB4, and the first voltage V may be applied in the other subcycles SUB3 and SUB4. Consequently, the first drive voltage applied to the first drive electrode in the second cycle CYCLE2 corresponds to V+dv/2.

In the third cycle CYCLE3, the second voltage V+dv may be applied to the first drive electrode in three subcycles SUB1 to SUB3, among the subcycles SUB1 to SUB4, and the first voltage V may be applied in the other subcycle SUB4. Consequently, the first drive voltage applied to the first drive electrode in the third cycle CYCLE3 corresponds to V+3 dv/4.

In the fourth cycle CYCLE4, the second voltage V+dv may be applied to the first drive electrode over the subcycles SUB1 to SUB4. Consequently, the first drive voltage applied to the first drive electrode in the fourth cycle CYCLE4 corresponds to V+dv.

Here, in the cycles CYCLE1 to CYCLE3, in which different drive voltages are applied to the respective drive electrodes, the number of subcycles in which the first voltage and the second voltage are applied to one drive electrode must be uniform for all drive electrodes. However, the subcycle in which the first voltage and the second voltage are applied to one drive electrode may be set using various methods.

For example, the position of the drive electrode to which the first voltage or the second voltage is applied in adjacent subcycles may move in the clockwise direction, the counterclockwise direction, or the zigzag direction, as illustrated in FIG. 21.

In addition, the position of the subcycle in which the second voltage is applied to the first drive electrode is slightly different from FIG. 21. However, this is for the convenience of description, and does not deviate from the scope of the technical idea of the disclosure.

Figure 23:
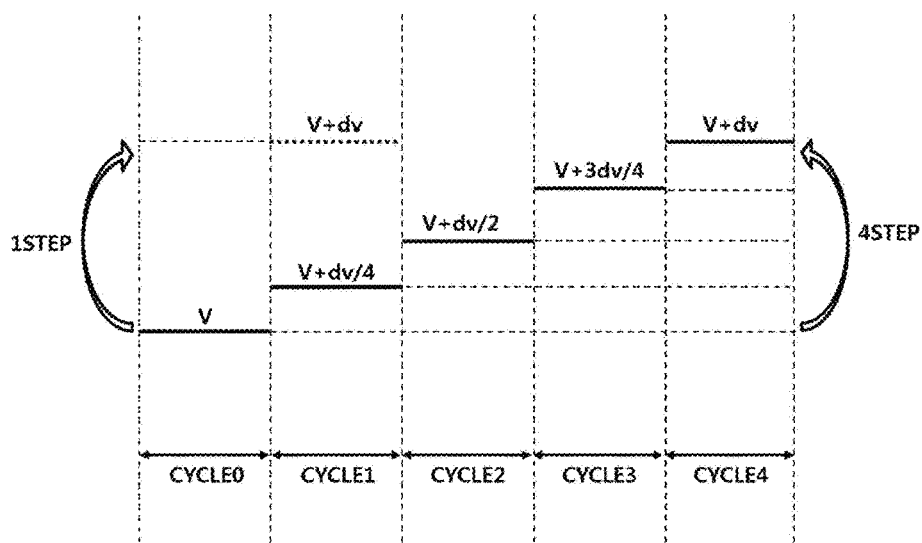
FIG. 23 is a view illustrating the effects of a drive voltage application method according to an embodiment.

FIG. 23 is a view illustrating the effects of the drive voltage application method according to the embodiment.

Referring to FIG. 23, the average voltage applied to the electrode sectors in each of the cycles CYCLE0 to CYCLE4 illustrated in FIGS. 21 and 22 are shown.

In the initial cycle CYCLE0, the average voltage applied to the first to fourth drive electrodes is V. In the first cycle CYCLE1, the average voltage applied to the first to fourth drive electrodes is V+dv/4. In the second cycle CYCLE2, the average voltage applied to the first to fourth drive electrodes is V+dv/2. In the third cycle CYCLE3, the average voltage applied to the first to fourth drive electrodes is V+3 dv/4. In the fourth cycle CYCLE4, the average voltage applied to the first to fourth drive electrodes is V+dv.

That is, when the drive voltage is sequentially increased in each cycle, the drive voltage may be increased by dv/4, which is the unit voltage, which corresponds to a value that is ¼ of dv, which is the unit voltage of the voltage driver 1235.

That is, in the case in which the same drive voltage is applied to the first to fourth drive electrodes, the unit voltage of the drive voltage, based on which auto-focusing resolution is determined, becomes identical to the unit voltage of the voltage driver 1235, and only the application of the drive voltage V+dv is possible in order to sequentially increase the drive voltage at the time of transition from the initial cycle CYCLE0, in which the drive voltage V is applied, to the first cycle CYCLE1, as shown in FIG. 23. Consequently, only one step is possible.

In the drive voltage application method shown in FIGS. 21 and 22, the unit voltage of the drive voltage, based on which auto-focusing resolution is determined, becomes ¼ of the unit voltage of the voltage driver 1235, and the drive voltage V+dv/4 may be directly applied in order to sequentially increase the drive voltage at the time of transition from the initial cycle CYCLE0, in which the drive voltage V is applied, to the first cycle CYCLE1, as shown in FIG. 23. Consequently, four steps may be performed in order to apply the drive voltage V+dv. That is, the method according to the embodiment may have auto-focusing resolution four times higher.

In this specification, the case in which the liquid lens has four individual electrodes is described. However, the disclosure is not limited thereto, and may also be applied to the case in which the liquid lens has 8 or 16 individual electrodes.

For example, in the case in which the liquid lens has 8 individual electrodes, one cycle may be divided into 8 subcycles, and the drive voltage may be applied in a manner in which the number of individual electrodes to which the second voltages is applied is sequentially increased. At this time, the unit voltage of the drive voltage may be ⅛ of the unit voltage of the voltage driver 1235, whereby the auto-focusing resolution may be increased 8 times.

When generalizing the drive voltage application method, in addition to a cycle in which first to p-th (p being an integer of 2 or more) drive voltages corresponding to first to p-th drive electrodes are applied as the first voltage or the second voltage, p−1 cycles in which q (q being an integer between 1 and p−1) drive voltages, among the first to p-th drive voltages, are applied as the second voltage may be added in order to increase the auto-focusing resolution.

In addition, in the cycles in which q drive voltages, among the first to p-th drive voltages, are applied as the second voltage, the second voltage may be applied to one drive electrode in q subcycles.

In the drive voltage application method according to the embodiment, as described above, the unit voltage of the drive voltage may be reduced within a uniform output voltage range of the voltage driver in order to increase the auto-focusing resolution.

In addition, it is not necessary to increase the output voltage range of the voltage driver even though the auto-focusing resolution is increased, whereby it is possible to reduce the power consumption of the optical device.

Figure 24:
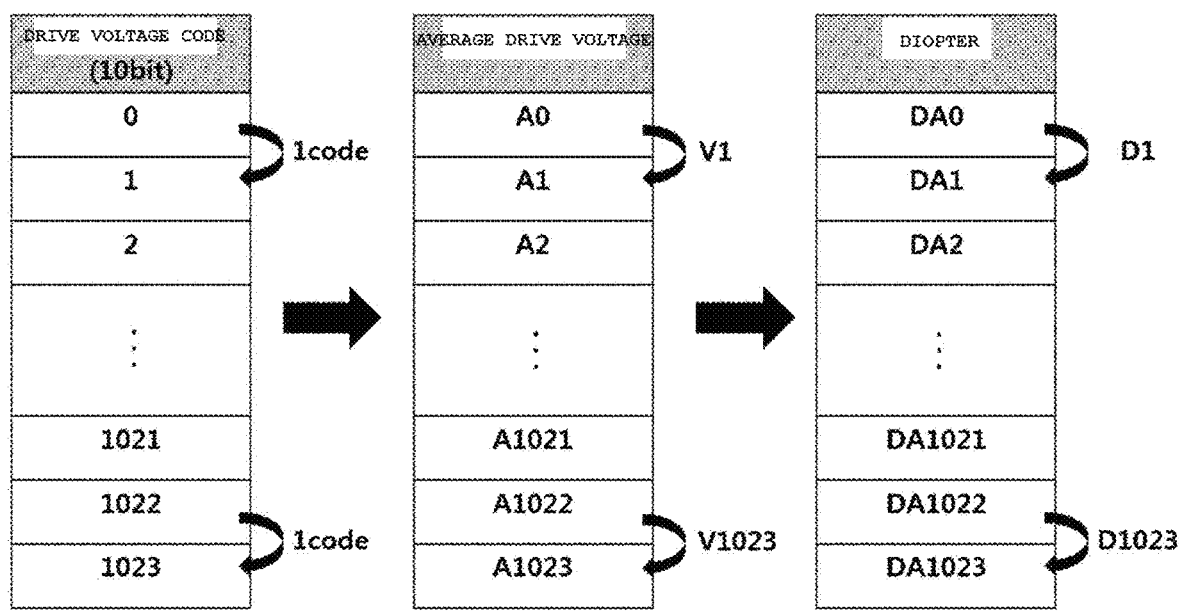
FIGS. 24 and 25 are views illustrating an embodiment of the method of applying voltage to the liquid lens.
Figure 25:
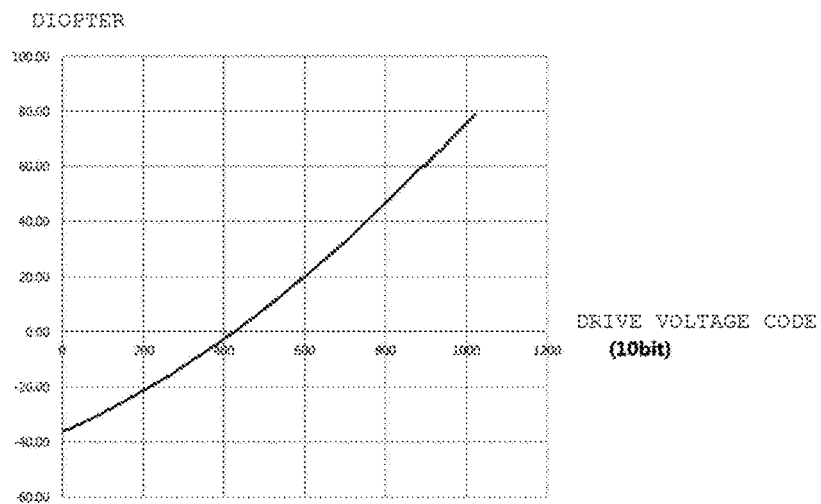

FIGS. 24 and 25 are views illustrating an embodiment of the method of applying voltage to the liquid lens.

Referring to FIG. 24, it is assumed that the drive voltage code acquired by the controller 1230 has 10-bit resolution. Consequently, the drive voltage code has a range from 0 to 1023, and one drive voltage code selected from among 0 to 1023 may be transmitted to the voltage driver 1235. The voltage driver 1235 may generate the drive voltage of the first to fourth drive electrode corresponding to the selected drive voltage code, and the drive voltage may have a voltage value of A0 to A1023 corresponding to the drive voltage code of 0 to 1023.

Here, the variation V1 (V1=A1−A0) of the drive voltage when the drive voltage code is increased from 0 to 1 may be uniform over the entire range of the drive voltage code. Consequently, the variation V1023 (V1023=A1023−A1022) of the drive voltage when the drive voltage code is increased from 1022 to 1023 may be equal to V1. For example, the variation of the drive voltage when the drive voltage code is increased by 1 may be 0.045, which is uniform.

Meanwhile, the drive voltage output by the voltage driver 1235 may be applied to the first to fourth drive electrodes of the liquid lens 1280, and the interface between the conductive liquid and the nonconductive liquid (i.e. the liquid interface) may be deformed. At this time, on the assumption that the same drive voltage is applied to the first to fourth drive electrodes of the liquid lens 1280, the average of the drive voltages applied to the first to fourth drive electrodes (i.e. the average drive voltage) and the drive voltage applied to one drive electrode are the same, and the diopter of the deformed interface and the average drive voltage have the relationship shown in Equation 3 below. When generalizing the average drive voltage, the average drive voltage may be the average of the drive voltages applied between the common electrode and n (n being an integer of 2 or more)

individual electrodes. First drive voltage code and second drive voltage code may be values corresponding to specific average drive voltages. The diopter and the focal distance of the interface have a reciprocal relationship, and the diopter is a factor that directly indicates the focal distance.

Diopter of interface∝square of average drive voltage  [Equation 3]

For example, the diopter of the liquid interface deformed in response to drive voltage code 0 is not proportional to drive voltage A0 but is proportional to the square of A0.

That is, as the drive voltage code is uniformly increased (for example, increased by 1), the drive voltage may also be uniformly increased (for example, 0.045V); however, the diopter of the liquid interface is not uniformly increased, since the diopter of the liquid interface is proportional to the square of drive voltage. For example, the first diopter variation D1 and the last diopter variation D1023 may be quite different from each other.

In other words, when the drive voltage code is linearly increased, the drive voltage is also linearly increased; however, the diopter of the liquid interface is increased in a form corresponding to an exponential function due to the relationship between the drive voltage and the liquid interface.

Referring to FIG. 25, a graph of the diopter of the liquid interface changed in response to 10-bit drive voltage code 1 to 1023 is shown. As shown in FIG. 25, it can be seen that the diopter is increased from about −40 to about 80 in response to the 10-bit drive voltage code 1 to 1023 but is increased in the form of an exponential function even though the drive voltage code is linearly increased.

Consequently, it is difficult for the controller 1230 or an external controller that transmits the drive voltage code to the controller 1230 (for example, an application processor) to linearly control the diopter of the liquid interface through the drive voltage code.

Figure 26:
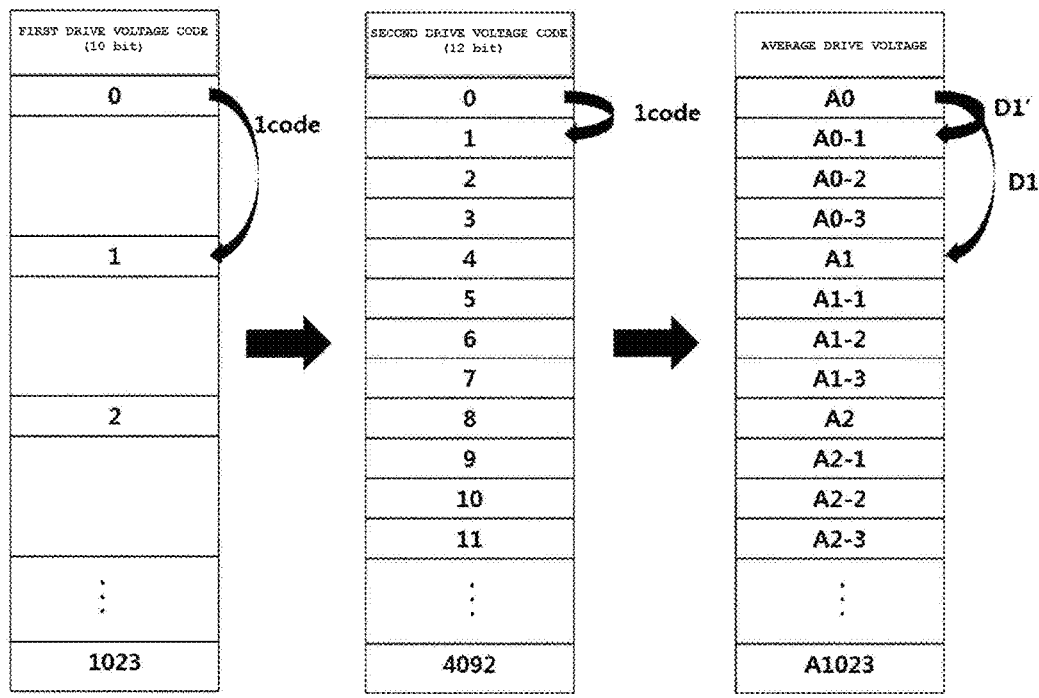
FIG. 26 is a view illustrating another embodiment of the method of applying voltage to the liquid lens.

FIG. 26 is a view illustrating another embodiment of the method of applying voltage to the liquid lens.

Referring to FIG. 26, first drive voltage code has 10-bit resolution and a range from 0 to 1023, in the same manner as the drive voltage code shown in FIG. 24. Second drive voltage code means drive voltage code having 12-bit resolution, corresponding to 4 times the auto-focusing resolution, by reducing the unit voltage of the voltage driver having a uniform output voltage range according to the drive voltage application method illustrated in FIGS. 21 to 23 (i.e. the method of differently applying at least two drive voltage codes for respective electrodes, among drive voltage codes for respective electrodes corresponding to n individual electrodes).

That is, the scheme in which the drive voltage applied to at least one drive electrode and the drive voltages applied to the other drive electrodes are different from each other (individual-type electrode driving), rather than the scheme in which the same drive voltage is applied to all of the four drive electrodes (batch-type electrode driving), may be adopted, whereby the average drive voltage output by the voltage driver 1235 may have resolution four times higher, and the second drive voltage code corresponding to the average drive voltage may have 12-bit resolution (0 to 4092).

As shown in FIG. 26, on the assumption that the average drive voltages corresponding to first drive voltage codes 0, 1, and 2 are A0, A1, and A2, second drive voltage codes may correspond to 0, 4, and 8, and the second drive voltage codes 1 to 3 and 5 to 7 may correspond to the average drive voltages A0-1 to A0-3 and A1-1 to A1-3, respectively.

When the first drive voltage code is increased by 1 code, the average drive voltage is increased by D1 (for example, 0.045V). When the second drive voltage code is increased by 1 code, on the other hand, the average drive voltage is increased by D1', which is ¼ of D1 (for example, 0.01125V).

That is, it is possible to more minutely control the voltage driver 1235 according to the second drive voltage code using the drive voltage application method of FIGS. 21 to 23. Hereinafter, a method of linearly controlling the diopter of the liquid interface using the relationship between the first drive voltage code, the second drive voltage code, and the average drive voltage will be described.

Figure 27:
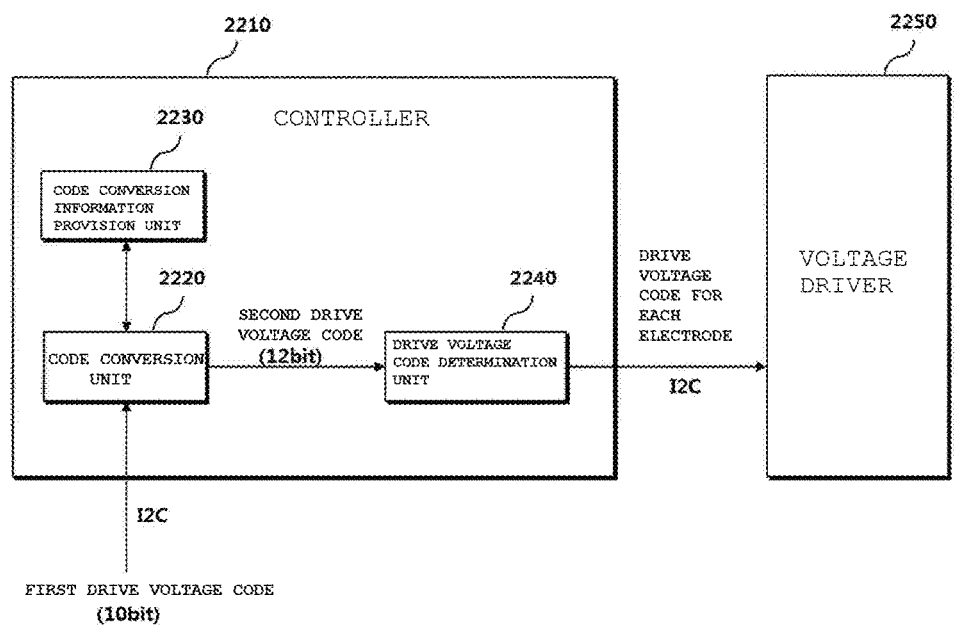
FIG. 27 is a block diagram more specifically showing a controller shown in FIG. 18.

FIG. 27 is a block diagram more specifically showing the controller shown in FIG. 18.

Referring to FIG. 27, a controller 2210 and a voltage driver 2250 may correspond respectively to the controller 1230 and the voltage driver 1235 of FIG. 18.

In the same manner as those that have been illustrated in FIG. 18, the controller 2210 may calculate drive voltage corresponding to the desired shape of the liquid lens according to the request of the gyro sensor or the image sensor, and may acquire first drive voltage code for the same using a table. Hereinafter, however, the controller 2210 will be described as receiving first drive voltage code from an external component (for example, an application processor). The following method may also be applied to the case in which the controller 2210 directly generates first drive voltage code.

The controller 2210 may receive first drive voltage code from the outside through inter-integrated circuit (I²C) communication, may determine drive voltage code for respective electrodes (drive voltage code that determines the drive voltages to be applied to the first to fourth drive electrodes), and may transmit the same to the voltage driver 2250 through I²C communication.

The controller 2210 may include a code conversion unit 2220, a code conversion information provision unit 2230, and a drive voltage code determination unit 2240.

The code conversion unit 2220 may convert 10-bit first drive voltage code into 12-bit second drive voltage code, and at this time, may perform a conversion operation using a conversion table or a conversion algorithm provided from the code conversion information provision unit 2230.

The code conversion information provision unit 2230 may have the conversion table or the conversion algorithm, and may provide the conversion table or the conversion algorithm to the code conversion unit 2220. The conversion table or the conversion algorithm corresponds to information capable of acquiring second drive voltage code, by which the diopter of the liquid interface is increased linearly, from first drive voltage code, which increases linearly. The conversion table or the conversion algorithm will be described below in detail with reference to FIGS. 28 to 33.

The drive voltage code determination unit 2240 may determine drive voltage codes corresponding to the drive voltages to be applied to the first to fourth drive electrodes using the second drive voltage code. The drive voltage code determination unit 2240 may sequentially transmit the drive voltage codes for respective electrodes corresponding to the first to fourth drive electrodes to the voltage driver 2250 in a predetermined sequence.

In another embodiment, the drive voltage code determination unit 2240 may be omitted depending on the conversion table (the conversion table of FIG. 33) or the conversion algorithm provided by the code conversion information provision unit 2230.

FIGS. 28 to 31 are views showing an embodiment capable of acquiring second drive voltage code, by which the diopter of the liquid interface is increased linearly, from first drive voltage code, which increases linearly.

Referring to FIGS. 28 to 31, the left-side graph is a graph showing the relationship between 10-bit first drive voltage code and the diopter of the liquid interface, as shown in FIG. 25, and has a shape that is approximate to an exponential function according to the relationship of Equation 3, as described above.

This graph may be acquired by manufacturing a specific liquid lens and sequentially applying drive voltages according to the first drive voltage codes 0 to 1023 to the liquid lens to actually measure the focal distance or diopter of the liquid lens. That is, the graph of the first drive voltage code and the diopter shown in FIG. 28 corresponds to a specific liquid lens, and another graph may be acquired for the liquid lens. Even in this case, however, the graph of the first drive voltage code and the diopter has a shape that approximates an exponential function.

Figure 28:
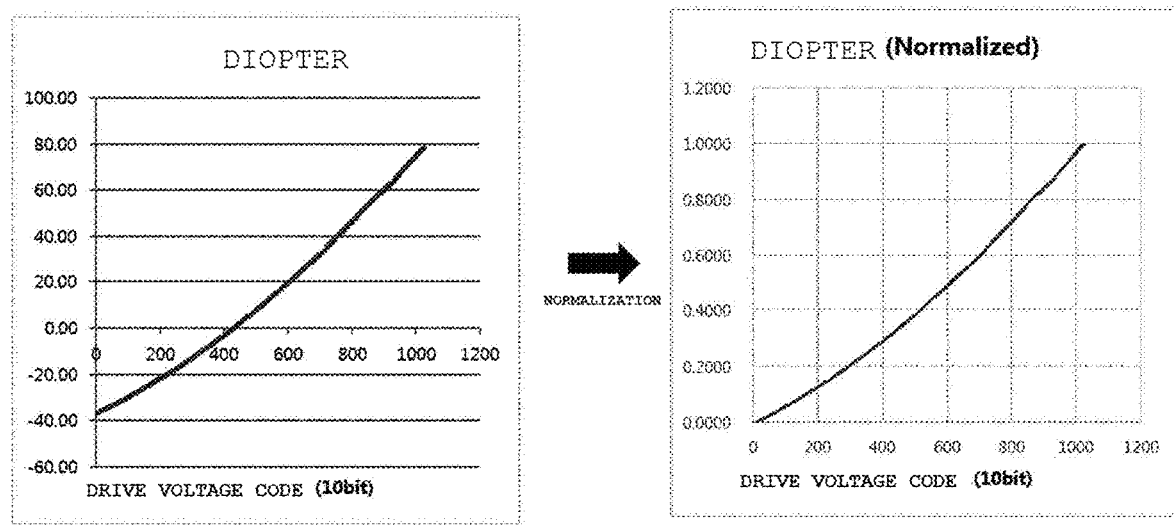
FIGS. 28 to 31 are views showing an embodiment capable of acquiring second drive voltage code, by which the diopter of a liquid interface is increased linearly, from first drive voltage code, which increases linearly.

The right-side graph of FIG. 28 is a graph obtained by normalizing the graph between the 10-bit first drive voltage code and the diopter of the liquid interface such that the diopter has a value ranging from 0 to 1. That is, the diopter corresponding to the 10-bit first drive voltage code may be normalized so as to have the same tendency as the left-side graph within a range of 0 to 1.

Figure 29:
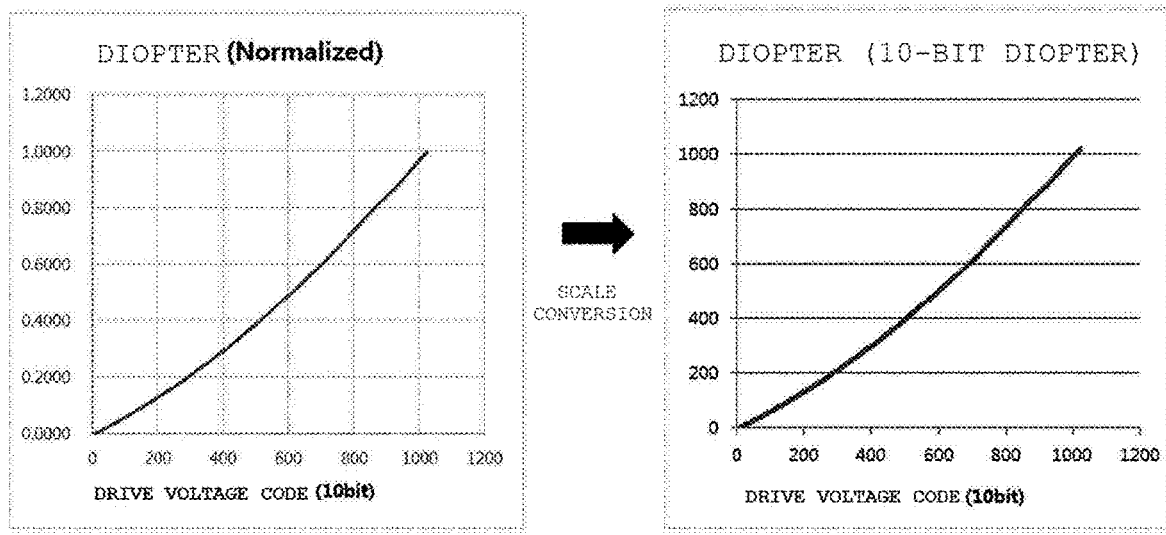

The left-side graph of FIG. 29 is a graph between the 10-bit first drive voltage code and the normalized diopter, which is the right-side graph of FIG. 28. As shown in the right-side graph of FIG. 29, the y-axis coordinate of the graph between the 10-bit first drive voltage code and the normalized diopter may be multiplied by 1023 in order to perform scale conversion. Here, by multiplying the normalized diopter by 1023, it is possible to obtain a graph between the first drive voltage code and 10-bit diopter having the same upper limit value and lower limit value as the first drive voltage code while maintaining the tendency between the first drive voltage code and the actual diopter.

The diopter measured within the range of about −40 to 80 through normalization and scale conversion of FIGS. 28 and 29 may be expressed as a 10-bit diopter, which is diopter having 10-bit resolution.

Figure 30:
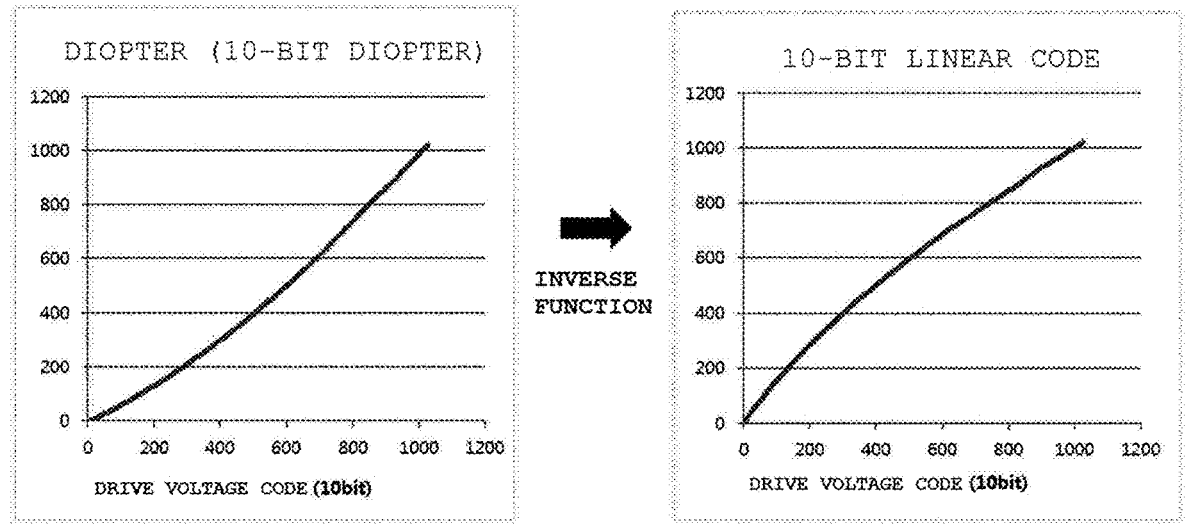

The left-side graph of FIG. 30 is a graph between the first drive voltage code and the 10-bit diopter. In the case in which, as shown in the right-side graph, the x axis and the y axis of the graph between the first drive voltage code and the 10-bit diopter are exchanged with each other to obtain a graph having an inverse function relationship and then the x axis is expressed as the first drive voltage code, it is possible to obtain 10-bit linear code having 10-bit resolution, by which the relationship between the first drive voltage code and the diopter, which has a relationship that approximates an exponential function, is compensated for with respect to the first drive voltage code such that the first drive voltage code and the diopter have a linear relationship therebetween. Here, the linear relationship is a relationship in which, when the first drive voltage code increases linearly, the diopter also increases linearly in response thereto.

Figures 31, 32:
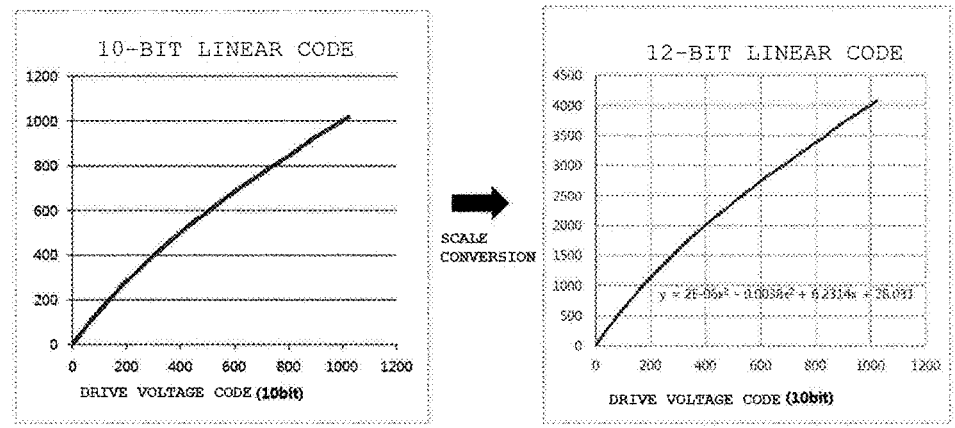
FIG. 32 is a view showing an embodiment of a conversion table according to an embodiment.

The left-side graph of FIG. 31 is a graph between the first drive voltage code and the 10-bit linear code. As shown in the right-side graph of FIG. 31, the y-axis coordinate of the graph between the first drive voltage code and the 10-bit linear code may be multiplied by 4 in order to perform scale conversion. Here, by multiplying the 10-bit linear code by 4, it is possible to obtain a graph between the first drive voltage code and 12-bit linear code having the same upper limit value and lower limit value as second drive voltage code while maintaining the tendency between the first drive voltage code and the 10-bit linear code.

That is, as shown in the right-side graph of FIG. 31, it is possible to obtain second drive voltage code 0 to 4092, by which the first drive voltage code and the diopter have a linear relationship with respect to the first drive voltage code 0 to 1023.

The code conversion information provision unit 2230 may store a conversion table in which the first drive voltage code and the second drive voltage code, by which the first drive voltage code and the diopter have a linear relationship, are matched using the same.

In another embodiment, when expressing the right-side graph of FIG. 31 as an approximated function, y=2E−06× 3−0.0038×2+6.2314x+28.031. This conversion function may be stored in the code conversion information provision unit 2230 as a conversion algorithm. That is, this conversion function is an approximated conversion function between the first drive voltage code and the second drive voltage code.

Here, a plurality of conversion functions, obtained by dividing the first drive voltage code of the right-side graph into a plurality of sections and performing approximation for each section, may be stored in the code conversion information provision unit 2230.

In addition, a conversion function having a coefficient simplified by multiplying the y axis by a specific value (for example, 1,000,000) in order to adjust the coefficient value of the conversion function may be stored, calculation may be performed using the conversion function, and the specific value may be divided in order to obtain second drive voltage code.

The conversion table or the conversion function may correspond to a conversion table or a conversion function for the conversion operation of the code conversion unit 2220 described with reference to FIG. 27.

The conversion table or the conversion function may be acquired by a separate tester, and may be stored in the controller 2210. Alternatively, the controller 2210 may measure, calculate, and store the conversion table or the conversion function.

Figures 33, 34:
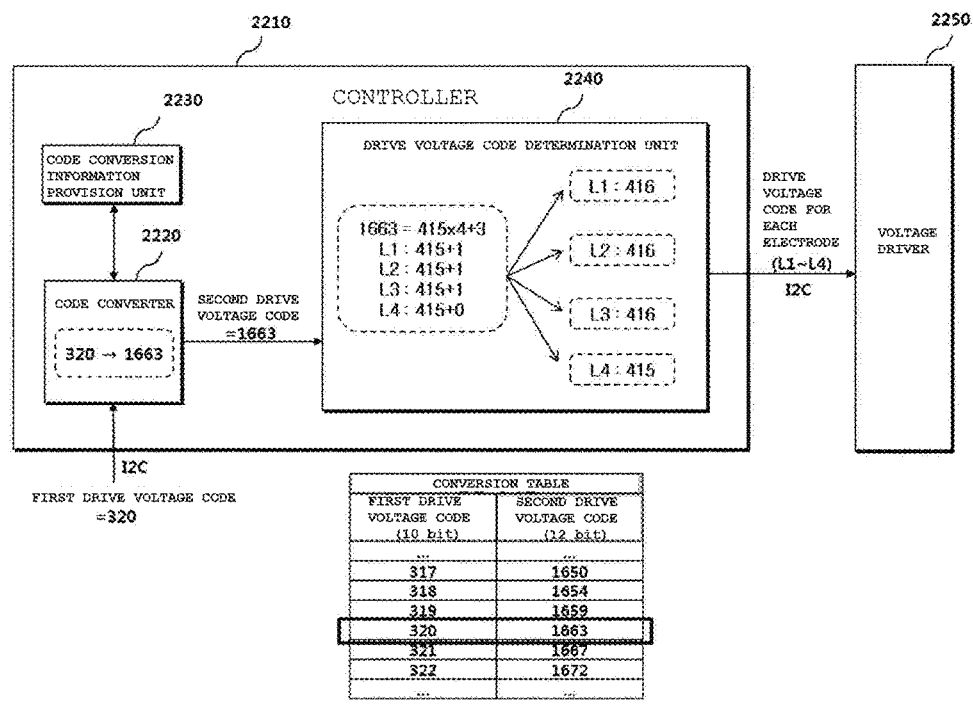
FIG. 33 is a view showing another embodiment of a conversion table according to another embodiment.
FIG. 34 is a view illustrating an application example of the drive voltage application method according to the embodiment.

FIG. 32 is a view showing an embodiment of a conversion table according to an embodiment. FIG. 33 is a view showing another embodiment of a conversion table according to another embodiment.

Referring to FIG. 32, an embodiment of a conversion table in which the first drive voltage code, acquired based on the right-side graph of FIG. 31, and the second drive voltage code, by which the first drive voltage code and the diopter have a linear relationship, are matched with each other is shown.

As shown in FIG. 26, the second drive voltage code exhibits the same drive voltage or diopter as first drive voltage code (0, 1, 2) is (0, 4, 8). In the conversion table of FIG. 32, however, the first drive voltage code (0, 1, 2) is matched with the second drive voltage code (0, 6, 12).

In addition, the interval of the second drive voltage code in section 0 to 5 of the first drive voltage code may be 6 or 7, whereas the interval of the second drive voltage code in section 1018 to 1023 of the first drive voltage code may be 3 or 4.

The diopter of the liquid interface may be proportional to the square of the drive voltage, and the conversion table may match the first drive voltage code and the second drive voltage code using this relationship such that, as the first drive voltage code increases, variation of the second drive voltage code is reduced, whereby it is possible to perform control such that the first drive voltage code and the diopter of the liquid interface have a linear relationship therebetween.

In other words, the variation of the average drive voltage within a first range of the first drive voltage code may be greater than the variation of the average drive voltage within a second range of the first drive voltage code. Here, the second range may have a lower limit value (or the minimum value) greater than the upper limit value (or the maximum value) of the first range. In addition, the second range may have the same code range as the first range (i.e. the size of the code obtained by subtracting the lower limit value from the upper limit value of each of the first range and the second range).

For example, as shown in FIG. 32, the variation of the average drive voltage in the first range 0 to 5 of the first drive voltage code (6.2 (variation of average drive voltage code)* 0.01125 (variation of average drive voltage for each code)= 0.06975) may be greater than the variation of the average drive voltage in the second range 1018 to 1023 of the first drive voltage code (5.2*0.01125=0.0585).

In the case in which the second range is a code range that is not identical to the first range, the value obtained by subtracting the variation of the average drive voltage in the first range by the first range may be greater than the value obtained by subtracting the variation of the average drive voltage in the second range by the second range.

Referring to FIG. 33, another embodiment of a conversion table in which the first drive voltage code, acquired based on the right-side graph of FIG. 31, and the drive voltage code for the first to fourth drive electrodes (i.e. drive voltage code for each electrode that corresponds to one of the four individual electrodes), by which the first drive voltage code and the diopter have a linear relationship, are matched with each other is shown.

In the conversion table of FIG. 32, the first drive voltage code and the second drive voltage code are matched with each other, whereas in the conversion table of FIG. 33, the first drive voltage code and the drive voltage code (10-bit resolution) for each electrode with respect to the first to fourth drive electrodes are directly matched with each other.

In principle, the drive voltage code determination unit 2240 determines drive voltage code corresponding to each drive electrode based on the second drive voltage code. According to the conversion table of FIG. 33, this process may be omitted.

The conversion tables of FIGS. 32 and 33 are merely illustrative, and a conversion table capable of obtaining drive voltage code for each electrode with respect to the first to fourth drive electrodes that compensates for the first drive voltage code and the diopter of the liquid interface such that the first drive voltage code and the diopter of the liquid interface have a linear relationship from the first drive voltage code is sufficient.

FIG. 34 is a view illustrating an application example of the drive voltage application method according to the embodiment.

Referring to FIG. 34, a process in which the controller 2210 receives first drive voltage code 320 and transmits drive voltage code for each electrode to the voltage driver 2250 is shown.

Upon receiving first drive voltage code 320, the code conversion unit 2220 performs the conversion operation with reference to the code conversion information provision unit 2230. At this time, a conversion table or a conversion algorithm (or a conversion function) may be used. In the example of FIG. 34, it is assumed that the conversion table corresponding to FIG. 32 is used.

The code conversion unit 2220 may convert first drive voltage code 320 into second drive voltage code 1663 with reference to the conversion table, and may transmit the same to the drive voltage code determination unit 2240.

The drive voltage code determination unit 2240 may determine drive voltage code for each electrode based on the second drive voltage code. For example, as shown in FIG. 34, the drive voltage code determination unit 2240 may divide second drive voltage code 1663 by 4, that is, the number of electrodes, in order to calculate the share 415 and the remainder 3. Here, the share 415 is basic drive voltage code, and the remainder 3 is the number of electrodes to which drive voltage code higher than the basic drive voltage code by 1 is transmitted. The basic drive voltage code may be transmitted to the remaining electrode, excluding the above electrodes.

Consequently, the drive voltage code determination unit 2240 may determine drive voltage code 416 for the first to third drive electrodes and drive voltage code 415 for the fourth drive electrode, and may transmit the same to the voltage driver 2250. That is, the drive voltage codes for each electrode that corresponds to one of the first to fourth drive electrodes, determined according to above some codes, among the second drive voltage codes, may not be identical to each other.

In addition, in the case in which the position of each of the first to fourth drive electrodes to which higher drive voltage is applied is changed for each subcycle, as in the voltage application method of FIG. 21, the drive voltage code determination unit 2240 may perform control such that the position of the electrode to which drive voltage code 415 is applied is changed for each subcycle.

In the case in which the operation of the drive voltage code determination unit 2240 is performed in advance and the conversion table of FIG. 33 is stored in the code conversion information provision unit 2230, as described above, omission is possible.

In this specification, the case in which four drive electrodes are provided has been described. However, the disclosure is not limited thereto, and may also be applied to the case in which eight drive electrodes are provided. Of course, in this case, 10-bit first drive voltage code may be matched with 13-bit second drive voltage code, whereby it is possible to more minutely control the linear relationship between the first drive voltage code and the liquid interface.

Figure 35:
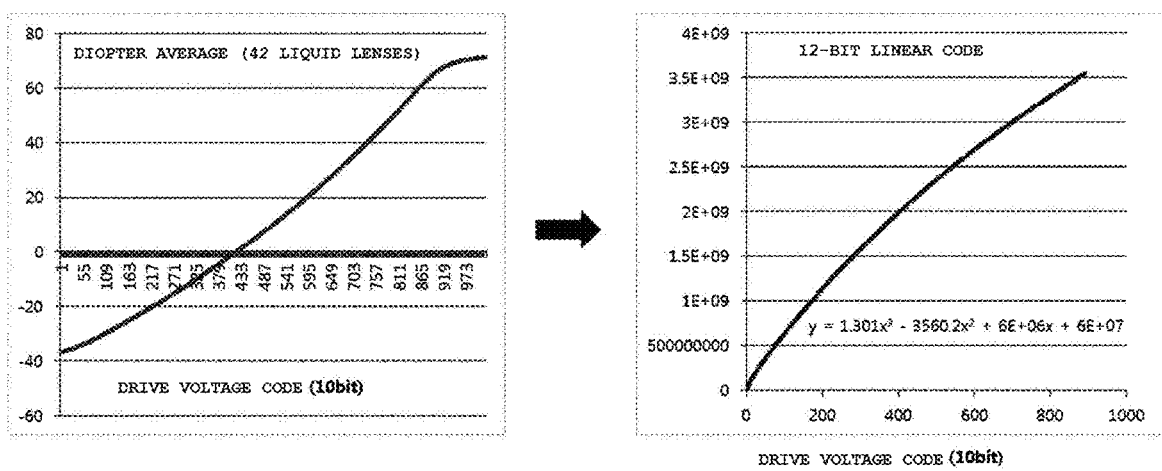
FIGS. 35 and 36 are views illustrating the effect of the drive voltage application method according to the embodiment.
Figure 36:
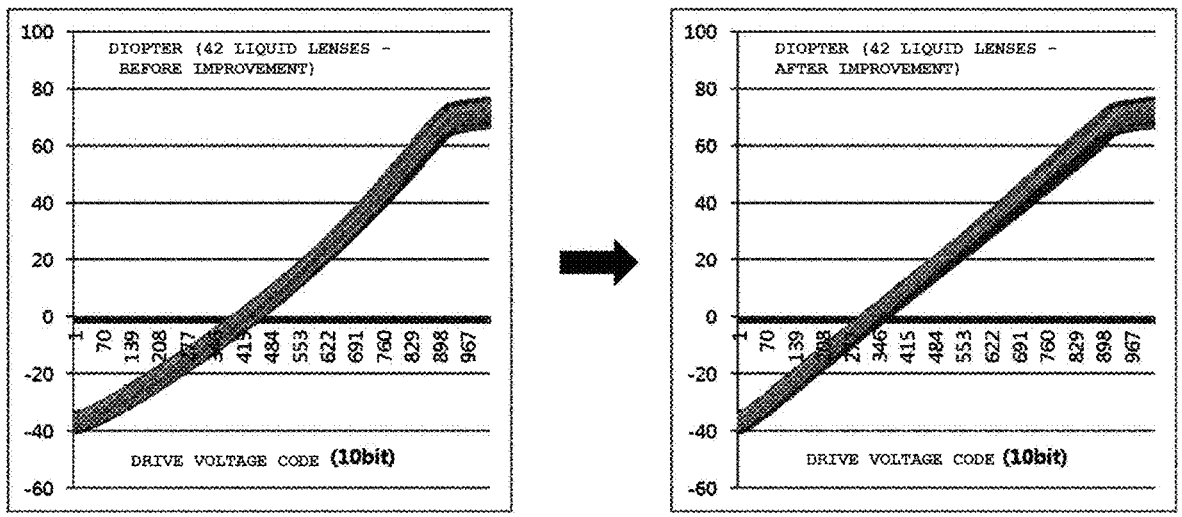

FIGS. 35 and 36 are views illustrating the effect of the drive voltage application method according to the embodiment.

Referring to FIG. 35, the left-side graph shows the diopter average of 42 liquid lenses for 10-bit first drive voltage code when the controller 2210 does not perform the conversion of the first drive voltage code.

The right-side graph shows the results of obtaining 12-bit linear code, by which the first drive voltage code and the diopter have a linear relationship, from the first drive voltage code through normalization, scale conversion, inverse function conversion, scale conversion, and coefficient value adjustment using the graph between the first drive voltage code and the diopter average. Here, as can be seen from the left-side graph, only the relationship between only first drive voltage code 0 to 880 and the second drive voltage code is shown, since first drive voltage code of about 880 or more and first drive voltage code of less than 880 show different tendencies. The condition in which a diopter control range required by the system is satisfied even when only first drive voltage code 0 to 880 is used is set forth as a premise, and a description will be given on the assumption that this condition is adopted. In the case in which diopter control using first drive voltage code of about 880 or more is required, a plurality of conversion functions obtained by dividing the first drive voltage code into a plurality of sections and performing approximation for each section may be stored in the code conversion information provision unit 2230, as illustrated in FIG. 31.

A conversion function obtained by approximating the relationship between first drive voltage code 0 to 880 and 12-bit linear code may be y=1.301×3−3560.2×2+6E+06x+6E+07. This conversion function may be stored in the code conversion information provision unit 2230.

Referring to FIG. 36, the left-side graph is a graph showing the change of the diopter when the drive voltage is applied to the first to fourth drive electrodes while the controller 2210 does not perform the conversion of the first drive voltage code for 42 liquid lenses.

However, the right-side graph is a graph showing the change of the diopter when the drive voltage corresponding to second drive voltage code, obtained by the controller 2210 converting the first drive voltage code with reference to the code conversion information provision unit 2230 storing the conversion function for 42 liquid lenses, is applied to the first to fourth drive electrodes When comparing the left-side graph and the right-side graph with each other, it can be seen that the first drive voltage code and the diopter have a linear relationship for first drive voltage code 0 to 880.

Consequently, the controller 2210 or an external application processor may intuitively control the diopter using the linear relationship between the first drive voltage code and the diopter.

In the case in which this linear relationship is secured, it is possible to calculate the diopter value corresponding to an arbitrary code between the lower limit value and the upper limit value of the first drive voltage code using a simple linear function equation, as long as not only the lower limit value and the upper limit value of the first drive voltage code but also the diopter value matched with the lower limit value and the upper limit value are known in the application, whereby it is possible to greatly improve the optical performance of the liquid lens.

The linear relationship mentioned in this specification may be the linear relationship between the diopter of the liquid lens and the first drive voltage code. However, the disclosure is not limited thereto. The linear relationship may be the linear relationship between the diopter of the entirety of an optical system including the liquid lens and the first drive voltage code.

In the drive voltage application method according to the embodiment, drive voltage code may be converted using drive voltage code having higher resolution, whereby the linear relationship between the drive voltage code and the diopter of the interface of the liquid lens may be secured.

In other words, the liquid lens according to the embodiment may include a cavity, a conductive liquid and a nonconductive liquid received in the cavity, n individual electrodes (n being an integer of 2 or more), and a common electrode. An interface may be formed between the conductive liquid and the nonconductive liquid. First drive voltage code, which determines average drive voltage, and the diopter of the interface may have a linear relationship therebetween. As the first drive voltage code is sequentially changed, the average drive voltage may be changed irregularly. The average drive voltage may be the average of the drive voltages applied between the common electrode and the n individual electrodes.

Although only a few embodiments have been described above, various other embodiments may be provided. The above embodiments may be combined in various manners unless they are incompatible, and new embodiments may be realized therethrough.

The liquid lens may be included in a camera module. The camera module may include a liquid lens mounted in a housing, a lens assembly including at least one solid lens disposed in front or at the rear of the liquid lens, an image sensor for converting an optical signal transmitted through the lens assembly into an electrical signal, and a control circuit for supplying drive voltage to the liquid lens.

For example, it is possible to realize an optical device (optical instrument) including the camera module including the liquid lens described above. Here, the optical device may include a device capable of processing or analyzing an optical signal. Examples of the optical device may include a camera/video device, a telescope, a microscope, an interferometer, a photometer, a polarimeter, a spectrometer, a reflectometer, an autocollimator, and a lensmeter. The embodiments may be applied to an optical device that may include a liquid lens. In addition, the optical device may be realized as a portable device, such as a smartphone, a laptop computer, or a tablet PC. The optical device may include a camera module, a display unit for outputting images, and a main body housing, in which the camera module and the display unit are mounted. The optical device may further include a communication module mounted in the main body housing for communicating with other devices and a memory unit for storing data.

A camera module according to an embodiment may include both the technical features of the embodiments described with reference to FIGS. 1 to 15 (first features) and the technical features of the embodiments described with reference to FIGS. 16 to 36 (second features).

For example, the camera module may include all features, in which the camera module includes a first electrode and a second electrode that electromagnetically interact with each other to change the interface between a conductive liquid and a nonconductive liquid, the first electrode includes a plurality of electrode sectors sequentially disposed about the optical axis in the circumferential direction, the voltage applied to the electrode sectors is sequentially controlled, and the variation of the average drive voltage within a first range of the first drive voltage code for controlling the interface is set so as to be greater than the variation of the average drive voltage within a second range of the first drive voltage code.

That is, the camera module according to the embodiment may include one of the first feature and the second feature, or may include a combination of the first feature and the second feature.

While all elements constituting embodiments of the disclosure are described as being connected into one body or operating in connection with each other, the disclosure is not limited thereto. That is, within the scope of the disclosure, one or more of the elements may be selectively connected to operate. In addition, the terms "include," "comprise" and "have" should be understood as not precluding the possibility of existence or addition of one or more other components unless otherwise stated. All terms, including technical and scientific terms, have the same meanings as those commonly understood by one of ordinary skill in the art to which this disclosure pertains, unless otherwise defined.

Commonly used terms, such as those defined in typical dictionaries, should be interpreted as being consistent with the contextual meaning of the relevant art, and are not to be construed in an ideal or overly formal sense unless expressly defined to the contrary.

The above description has been made merely to illustrate the technical idea of the disclosure, and those skilled in the art will appreciate that various variations and modifications are possible without departing from the intrinsic features of the disclosure. Therefore, the embodiments disclosed in this specification are provided to describe the technical idea of the disclosure, rather than to limit the technical idea of the disclosure, and the scope of the disclosure is not limited by the embodiments. The scope of protection of the disclosure should be determined by the appended claims, and all technical ideas within the range equivalent to the appended claims should be understood to fall within the scope of rights of the disclosure.

It will be apparent to those skilled in the art that various modifications and variations can be made to the disclosure without departing from the spirit or scope of the disclosure. Consequently, the above detailed description is not to be construed as limiting the disclosure in any aspect, and is to be considered by way of example. The scope of the disclosure should be determined by reasonable interpretation of the accompanying claims, and all equivalent modifications made without departing from the scope of the disclosure should be understood to be included in the scope of the following claims.

INDUSTRIAL APPLICABILITY

Embodiments relate to a lens, and may be applied to a camera module including a liquid lens, an optical device, and a liquid lens moving method.

The invention claimed is:

1. A camera module, comprising:
a core plate having a cavity for receiving a conductive liquid and a nonconductive liquid formed therein;
an electrode unit disposed at the core plate, the electrode unit being electrically connected to the conductive liquid;
an insulation unit disposed at the electrode unit for inhibiting contact with the nonconductive liquid; and
a control unit controlling voltage applied to the electrode unit, wherein
the electrode unit comprises a first electrode and a second electrode electromagnetically interacting with each other to change an interface between the conductive liquid and the nonconductive liquid,
wherein the first electrode comprises first to N (wherein N is a positive integer greater than or equal to 4) electrode sectors sequentially disposed about an optical axis in a circumferential direction,
wherein the interface is inclined with respect to a $n^{th}$ ($1 \leq n \leq N$) electrode sector when a voltage is applied to the $n^{th}$ electrode sector,
wherein the control unit is configured to apply voltages to the first to $N^{th}$ electrode sectors, and wherein a focus step is subdivided into N steps,
wherein the first to N electrode sectors of the first electrode comprise two or more pairs of electrode sectors, each pair of electrode sectors comprising two electrode sectors symmetrically disposed with respect to the optical axis, and
wherein the control unit is configured to first simultaneously apply a first voltage to the first pair of the electrode sectors of the two or more pairs of electrode sectors such that a curvature of entirety of the interface is decreased, then simultaneously apply a second voltage to a different pair of electrode sectors of the two or more pairs of electrode sectors such that the curvature of entirety of the interface is further decreased.

2. The camera module according to claim 1, wherein the second electrode is a common electrode.

3. The camera module according to claim 1, wherein
the first electrode is disposed at an upper surface of the core plate so as to be electrically connected to the conductive liquid, and
the second electrode is disposed at the upper surface and a lower surface of the core plate and at an inner surface of the cavity, contact between the second electrode and the nonconductive liquid being inhibited by the insulation unit.

4. The camera module according to claim 1, comprising an upper cover plate and a lower cover plate disposed respectively above and under the cavity for closing the cavity.

5. The camera module according to claim 4, comprising:
a first board disposed above the upper cover plate, the first board being electrically connected to the first electrode; and
a second board disposed under the lower cover plate, the second board being electrically connected to the second electrode.

6. An optical device, comprising:
a camera module according to claim 1;
a display unit outputting an image;
a battery supplying power to the camera module; and
a housing in which the camera module, the display unit, and the battery are accommodated.

7. The camera module according to claim 1, wherein
the first electrode comprises first, second, third, and fourth electrode sectors (N=4) sequentially disposed in the circumferential direction, and
the control unit is configured to simultaneously apply the voltages to the first and third electrode sectors, and then simultaneously apply the voltages to the second and fourth electrode sectors after applying the voltages to the first and third electrodes sectors.

8. A camera module, comprising:
a core plate having a cavity for receiving a conductive liquid and a nonconductive liquid formed therein;
an electrode unit disposed at the core plate, the electrode unit being electrically connected to the conductive liquid;
an insulation unit disposed at the electrode unit for inhibiting contact with the nonconductive liquid; and
a control unit controlling voltage applied to the electrode unit, wherein
the electrode unit comprises a first electrode and a second electrode electromagnetically interacting with each other to change an interface between the conductive liquid and the nonconductive liquid,
wherein the first electrode comprises:
a first electrode sector;
a third electrode sector disposed in a direction in which the third electrode sector and the first electrode sector are symmetric with respect to an optical axis;
a second electrode sector disposed between the first and third electrode sectors in a circumferential direction; and a fourth electrode sector disposed in a direction in which the fourth electrode sector and the second electrode sector are symmetric with respect to the optical axis, wherein the interface is inclined with respect to a $n^{th}$ ($1 \leq n \leq 4$) electrode sector when a voltage is applied to the $n^{th}$ electrode sector, wherein the control unit is configured to apply voltages to the first, second, third, and fourth electrode sectors, and wherein a focus step is subdivided into four steps, and wherein the control unit is configured to first simultaneously apply a first voltage to the first and third electrode sectors such that a curvature of entirety of the interface is decreased, then simultaneously apply a second voltage to the second and fourth electrode sectors such that the curvature of entirety of the interface is further decreased.

9. The camera module according to claim 8, wherein the second electrode is a common electrode.

10. The camera module according to claim 8, wherein the first electrode is disposed at an upper surface of the core plate so as to be electrically connected to the conductive liquid, and wherein the second electrode is disposed at the upper surface and a lower surface of the core plate, and at an inner surface of the cavity, and contact of the second electrode with the nonconductive liquid is inhibited by the insulation unit.

11. The camera module according to claim 8, comprising: an upper cover plate and a lower cover plate disposed respectively above and under the cavity for closing the cavity.

12. A camera module, comprising:
a case;
a lens holder received in the case;
a lens module received in the lens holder, the lens module including at least one lens;
a liquid lens disposed above or under the lens module or in a middle of the lens module; and
a main board electrically connected to the liquid lens, the main board having a control unit mounted thereon,
wherein the liquid lens comprises:
a core plate having a cavity for receiving a conductive liquid and a nonconductive liquid formed therein;
an electrode unit disposed at the core plate, the electrode unit being electrically connected to the conductive liquid; and
an insulation unit disposed at the electrode unit for inhibiting contact with the nonconductive liquid,
wherein the electrode unit includes a first electrode and a second electrode electromagnetically interacting with each other to change an interface between the conductive liquid and the nonconductive liquid, wherein the first electrode includes first to N (where N is a positive integer greater than or equal to 4) electrode sectors sequentially disposed about an optical axis in a circumferential direction, wherein the interface is inclined with respect to a $n^{th}$ ($1 \leq n \leq N$) electrode sector when a voltage is applied to the $n^{th}$ electrode sector, wherein the control unit is configured to sequentially apply voltages to the first to $N^{th}$ electrode sectors, and wherein a focus step is subdivided into N steps, wherein the first to N electrode sectors of the first electrode comprise two or more pairs of electrode sectors, each pair of electrode sectors comprising two electrode sectors symmetrically disposed with respect to the optical axis, and wherein the control unit is configured to simultaneously apply a first voltage to the first pair of the electrode sectors of the two or more pairs of electrode sectors such that a curvature of entirety of the interface is decreased, then the control unit is configured to simultaneously apply a second voltage to a different pair of electrode sectors of the two or more pairs of electrode sectors such that the curvature of entirety of the interface is further decreased.

13. A method of controlling a liquid lens, configured such that an interface between a conductive liquid and a nonconductive liquid in a cavity is changed through electromagnetic interactions between first and second electrodes, the method comprising:
simultaneously applying a first voltage to first and third electrode sectors such that a curvature of entirety of the interface is decreased, the first electrode including the first electrode sector, a second electrode sector, the third electrode sector, and a fourth electrode sector sequentially disposed about an optical axis in a circumferential direction, wherein the first electrode sector and the third electrode sector symmetrically disposed with respect to the optical axis, wherein the second electrode sector and the four electrode sector symmetrically disposed with respect to the optical axis, wherein the interface is inclined with respect to a $n^{th}$ ($1 \leq n \leq 4$) electrode sector when a voltage is applied to the $n^{th}$ electrode sector; and
subsequently simultaneously applying a second voltage to the second and fourth electrode sectors such that the curvature of entirety of the interface is further decreased.

14. The method according to claim 13, wherein the first voltage is simultaneously applied to the first and third electrode sectors, and then the second voltage is simultaneously applied to the second and fourth electrode sectors after applying the voltages to the first and third electrode sectors.

* * * * *